(12) United States Patent
Gibson

(10) Patent No.: US 11,211,185 B2
(45) Date of Patent: Dec. 28, 2021

(54) ELECTRIFIED-CABLE SYSTEM FOR TRANSIT AND METHOD OF MAKING SAME

(71) Applicant: Airbornway Corporation, Stamford, CT (US)

(72) Inventor: Rodger L. Gibson, Stamford, CT (US)

(73) Assignee: Airbornway Corporation, Stamford, CT (US)

( * ) Notice: Subject to any disclaimer, the term of this patent is extended or adjusted under 35 U.S.C. 154(b) by 0 days.

(21) Appl. No.: 16/887,764

(22) Filed: May 29, 2020

(65) Prior Publication Data
US 2020/0395148 A1 Dec. 17, 2020

Related U.S. Application Data

(60) Continuation-in-part of application No. 16/355,889, filed on Mar. 18, 2019, now Pat. No. 10,672,542, (Continued)

(51) Int. Cl.
*B61B 7/02* (2006.01)
*H01B 17/56* (2006.01)
(Continued)

(52) U.S. Cl.
CPC .............. *H01B 17/56* (2013.01); *B61B 7/02* (2013.01); *D07B 1/147* (2013.01); *D07B 5/002* (2013.01);
(Continued)

(58) Field of Classification Search
CPC ...... H01B 17/56; H01B 7/02; H01B 13/0036; D07B 1/147; D07B 5/002;
(Continued)

(56) References Cited

U.S. PATENT DOCUMENTS 1,360,097 A 11/1920 Davino
3,769,914 A * 11/1973 Lorinet ................. B61B 12/105
104/287

(Continued)

FOREIGN PATENT DOCUMENTS

SK 288221 6/2011

OTHER PUBLICATIONS

ROPECON. "An innovative conveying system for difficult terrain." Doppelmayr website, https://www.doppelmayr.com/en/products/ropecon/. (printed Mar. 22, 2018, 2 pages).
(Continued)

*Primary Examiner* — Sherman Ng
(74) *Attorney, Agent, or Firm* — UConn IP Law Clinic; Thomas J. Kennedy, III; Emily Tkac

(57) ABSTRACT

Disclosed herein is a transport system, comprising an electrified static cable system, a carriage supported by a non-electrified static cable, an electrical drive system incorporated into the carriage—wherein the electrical drive system is utilized to move the carriage along the pair of parallel non-electrified cables, a transconnector configured to supply electrical power to the carriage, and a cabin mounted to the carriage. Corresponding methods of making and using the system also are disclosed.

17 Claims, 56 Drawing Sheets

Related U.S. Application Data which is a division of application No. 15/900,406, filed on Feb. 20, 2018, now Pat. No. 10,347,401.

(60) Provisional application No. 62/988,697, filed on Mar. 12, 2020, provisional application No. 62/462,119, filed on Feb. 22, 2017.

(51) Int. Cl.
| | | |
|---|---|---|
| *H01B 7/02* | (2006.01) | |
| *H01B 13/00* | (2006.01) | |
| *D07B 1/14* | (2006.01) | |
| *D07B 5/00* | (2006.01) | |
| *B60L 1/00* | (2006.01) | |

(52) U.S. Cl.
CPC ........... *H01B 7/02* (2013.01); *H01B 13/0036* (2013.01); *B60L 1/00* (2013.01); *D07B 2201/2001* (2013.01); *D07B 2201/2095* (2013.01); *D07B 2205/306* (2013.01); *D07B 2205/3025* (2013.01); *D07B 2401/2055* (2013.01); *D07B 2501/20* (2013.01)

(58) Field of Classification Search
CPC ..... D07B 2401/2055; B61B 7/02; B61B 7/06; B60L 1/00
USPC ........................................................ 174/70 R
See application file for complete search history.

(56) References Cited

U.S. PATENT DOCUMENTS

| | | | |
|---|---|---|---|
| 3,983,978 A | 10/1976 | Uchiyama | |
| 4,492,168 A | 1/1985 | Cellai | |
| 4,742,777 A * | 5/1988 | Tarassoff | B61B 7/045 |
| | | | 104/173.2 |
| 5,120,911 A | 6/1992 | Gazzola | |
| 5,937,977 A * | 8/1999 | Takasan | B60M 1/305 |
| | | | 191/10 |
| 6,202,566 B1 | 3/2001 | Hutchinson | |
| 7,156,686 B1 | 1/2007 | Sekela et al. | |
| 7,624,684 B2 | 12/2009 | Morris | |
| 8,375,865 B2 | 2/2013 | Zayas | |
| 8,494,694 B2 | 7/2013 | Dueck | |
| 8,707,869 B2 | 4/2014 | Blandon et al. | |
| 8,866,010 B2 | 10/2014 | Nonen et al. | |
| 9,119,292 B2 | 8/2015 | Gundel | |
| 9,145,148 B2 | 9/2015 | Tilley | |
| 2001/0045326 A1* | 11/2001 | Gottlieb | B64D 9/00 |
| | | | 187/254 |
| 2009/0288578 A1* | 11/2009 | Hepner | E01B 25/08 |
| | | | 105/141 |
| 2013/0079169 A1* | 3/2013 | Dietz | A63G 31/02 |
| | | | 472/137 |

OTHER PUBLICATIONS

Coxworth, Ben. "LineCam—a zipline for your video camera." Apr. 2, 2013. New Atlas website. https://newatlas.com/linecam-suspended-camera-system/26882/. (printed May 1, 2018, 3 pages).

Wier, Christopher. "Innovative Robot Rides To The Rescue At Margarita Adventures Zipline." Travel Paso website. http://www.travelpaso.com/media/press-release/innovative-robot-rides-rescue-margarita-adventures-zipline. (printed May 1, 2018, 4 pages).

Ximenes, Samuel. "Intelligent Zipline Deployment For Martian Cave Exploration." 2012. Lunar and Planetary Institute website. http://www.lpi.usra.edu/meetings/marsconcepts2012/pdf/4362.pdf. (printed Mar. 27, 2018, 2 pages).

"S. Idaho zip line planned for adventure park." Dec. 12, 2007. USA Today website. http://usatoday30.usatoday.com/travel/news/2007-12-12-idaho-zip-line_N.htm. (printed Apr. 19, 2018, 1 page).

Passport to the Parks. (Jul. 2, 2019). Disney Skyliner Gondola Features—Power Supply—Air Conditioning—What To Expect and How it Works [Video file], (16 pages). Retrieved from https://www.youtube.com/watch?v=IXQPRnIqNqU&feature=youtu.be.

* cited by examiner

240

Figure 58A
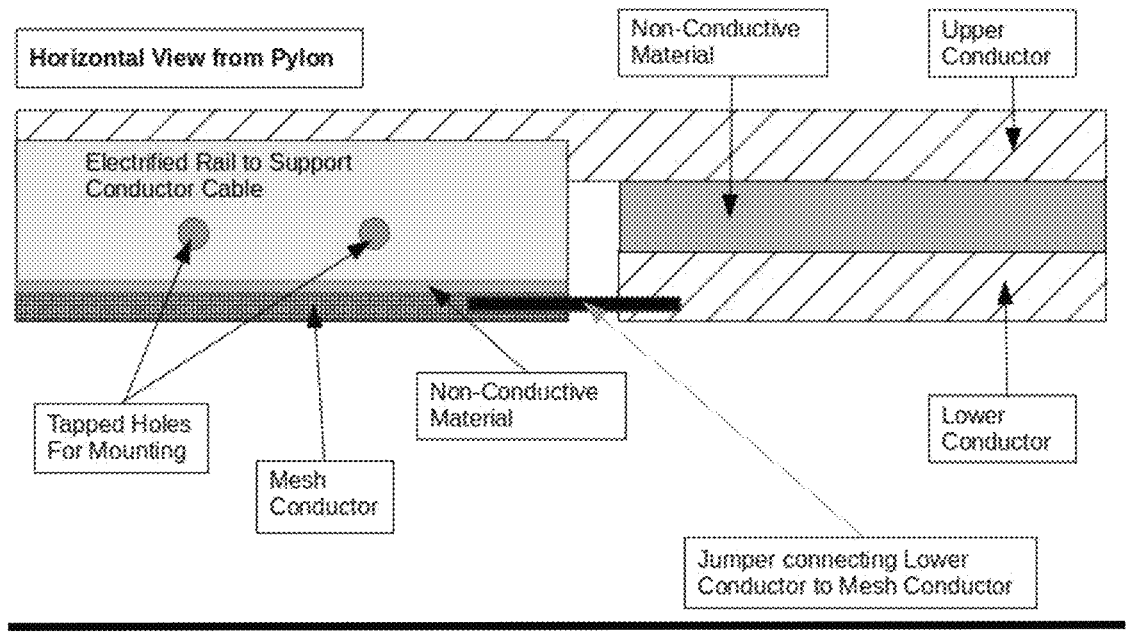
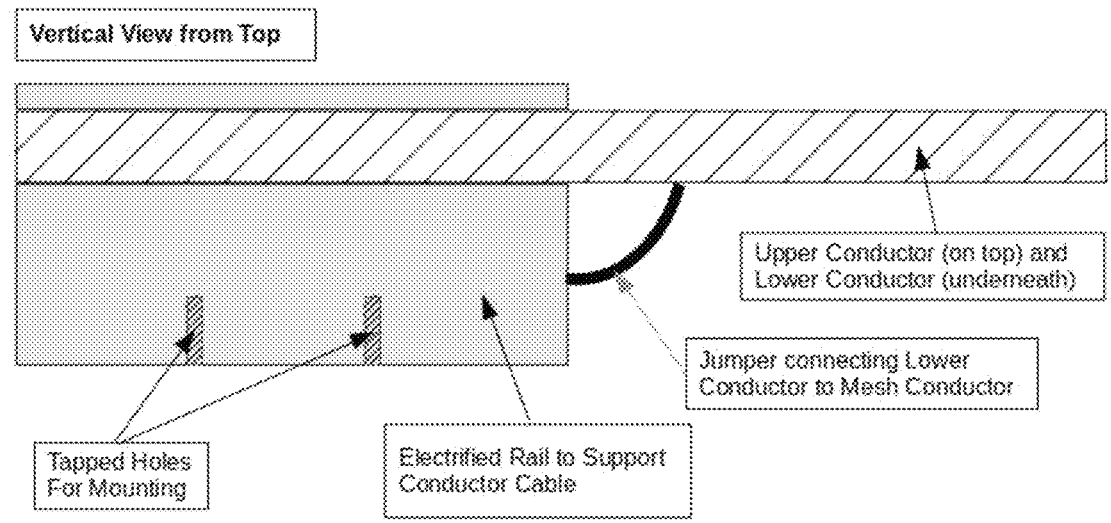
Figure 58B

ELECTRIFIED-CABLE SYSTEM FOR TRANSIT AND METHOD OF MAKING SAME

CROSS-REFERENCE TO RELATED APPLICATIONS

This patent application is a continuation-in-part of U.S. patent application Ser. No. 16/355,889 filed Mar. 18, 2019, the contents of which is incorporated by reference in its entirety, which claims priority from U.S. patent application Ser. No. 15/900,406 filed Feb. 20, 2018, which in turn claims priority to, and the benefit of, U.S. Provisional Patent Application No. 62/462,119, filed on Feb. 22, 2017, the disclosure of which is incorporated herein by reference in its entirety. This application also claims the benefit of US Provisional Patent Application No. 62/988,697 filed Mar. 12, 2020, the contents of which is incorporated by reference in its entirety.

BACKGROUND

Transporting goods and persons can be difficult and expensive. Presently known types of transportation present a myriad of concerns, such as pollution, congestion of streets, safety, efficiency, costs of road construction and repair, lack of available land for transportation infrastructure, maintenance, etc. It would be useful to develop a system for transportation of goods and persons which addressed the above concerns.

SUMMARY

According to aspects of the present disclosure, an electrified-cable system is provided. The system includes a first wire having a longitudinally-extending uninsulated region comprising at least a portion of the circumference of the first wire, and a longitudinally-extending insulated region comprising the remaining circumference of the first wire. A second wire having a longitudinally-extending uninsulated region comprising at least a portion of the circumference of the second wire, and a longitudinally-extending insulated region comprising the remaining circumference of the second wire. The second wire is substantially parallel to the first wire. An insulating connector couples the insulated region of the first wire to the insulated region of the second wire. The electrified-cable system is configured to form an electrical circuit from the first wire to the second wire through a carriage in electrical contact with the uninsulated region of the first wire and the uninsulated region of the second wire.

According to aspects of the present disclosure, a method for making an electrified-cable system is provided. The method includes providing a first wire and a second wire, each of the first wire and the second wire having a longitudinally-extending insulation enveloping the entire circumference of the respective wire. Removing insulation from the first wire to form a longitudinally-extending uninsulated region of at least a portion of the circumference of the first wire. Removing insulation from the second wire to form a longitudinally-extending uninsulated region of at least a portion of the circumference of the second wire and coupling the insulated region of the first wire to the insulated region of the second wire with an insulating connector.

Another embodiment described herein is a transport system comprising an electrified static cable system, a carriage supported by a pair of parallel non-electrified static cables, an electrical drive system incorporated into the carriage, wherein the electrical drive system is utilized to move the carriage along the pair of parallel non-electrified cables, a transconnector configured to supply electrical power to the carriage, and a cabin mounted to the carriage. In embodiments, the transport system further comprises an elevator system incorporated into the carriage, and the elevator system is configured to raise and lower the cabin.

BRIEF DESCRIPTION OF THE DRAWINGS

The foregoing aspects and other features of the disclosed embodiments are explained in the following description, taken in connection with the accompanying drawings, wherein:

FIG. 56 illustrates a view of the arm and the rail which supports the electrified cabling system for the transconnector to run on.

FIGS. 58A and 58B illustrate a jumper connecting the lower conductor of our electrified cable to the mesh lower conductor of our electrified rail to maintain electrical connectivity between the electrical power supplied from the local utility, the lower mesh conductor and the lower conductor.

DETAILED DESCRIPTION

The embodiments described herein disclose an electrified-cable system for carriage transportation of goods and persons. More specifically, the embodiments described herein may significantly reduce friction of transport and, thus, reduce the cost of moving goods and persons while improving safety. Additionally, the system provides for transportation of heavy loads (i.e., tons), rapidly and for extended durations. The electrified-cable system may be a single cable mounted between two points (e.g., towers) or can be mounted on more than two points in series allowing transit over greater distances. As will be described in greater detail below, a carriage 10 having one or more electric motors 110 is suspended from a cable 200, 250. The carriage 10 may be remotely controlled. In embodiments, a controller at a remote (nearby or far location) monitors the moving carriages on the elevated skyway. In some cases, the carriages only can be remotely controlled by emergency personnel, including police officers and firefighters.

A written description of the disclosed embodiments is provided below. The written description references the figures throughout. In specific figures, elements of the disclosure are identified with the reference numbers for each element as indicated below. This is for illustration proposes only. Due to the large number of specified elements and relatively large number of figures, each element is not identified in every figure.

As used herein, the term "carriage" refers to an apparatus configured for transit along a cable which may be internal or external to the carriage. The carriage may transit the cable alone or may carry passengers, goods, electronic equipment (such as video monitoring equipment, or any other physical objects requiring transport. The carriage may transit the cable aerially (i.e., without touching the ground) or, in some embodiments, may be in contact with the ground during all or a portion of the carriage's transit along the cable.

Figure 1:
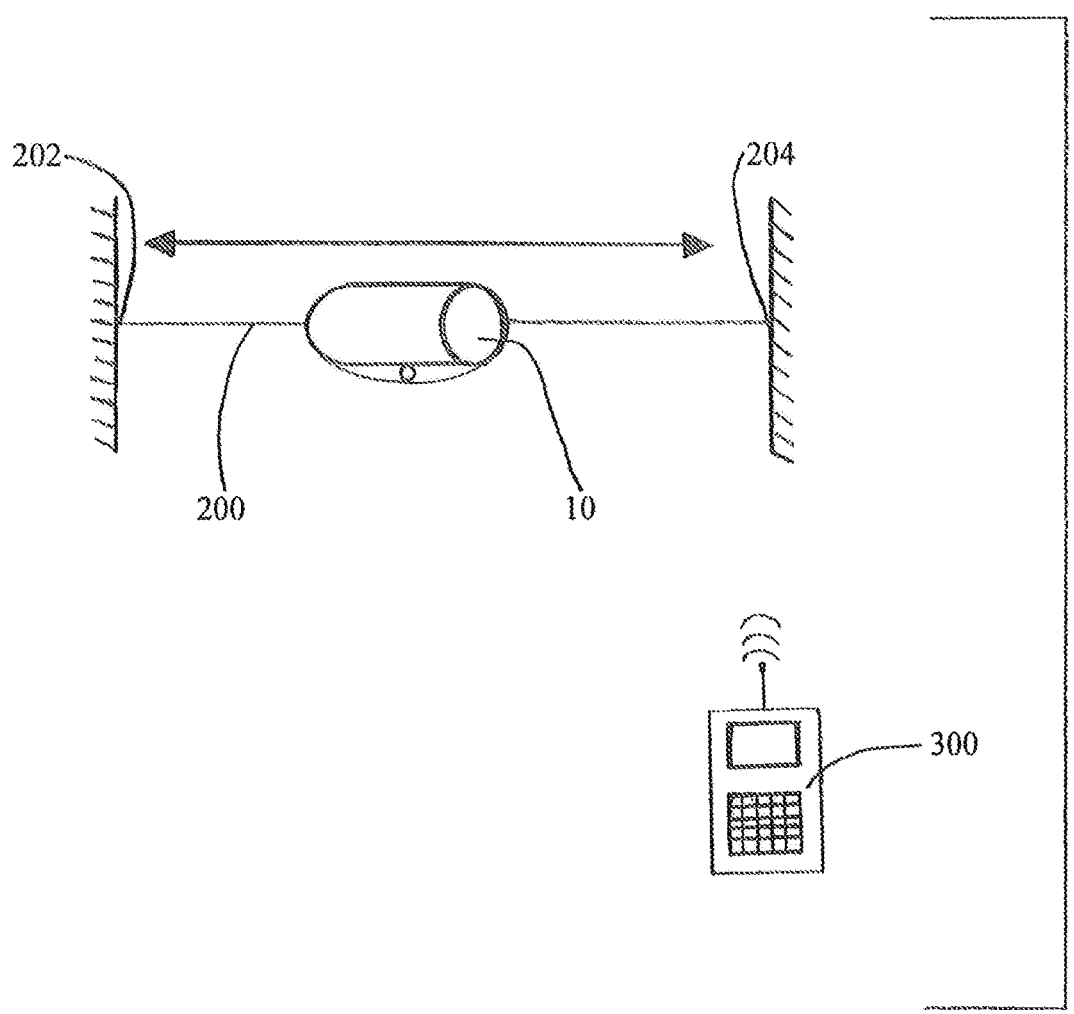
FIG. 1 illustrates an exemplary embodiment of a carriage supported by a cable, according to aspects of the present disclosure.

In reference to FIG. 1, at least one aspect of the embodiments described herein is generally disclosed. A carriage 10 is supported by a cable 200 extending between a first and second fixed point 202, 204. The carriage 10 is configured to traverse the axis of the cable 200 between the first and second points 202, 204. The carriage 10 conducts electrical power from the cable 200 to operate. Movement of the carriage 10 along the axis of the cable 200 is controllable from a control interface 300 remote from the carriage 10. The control interface 300 is in communication with the carriage 10 via a wireless connection or wired connection. An operator can input commands at the interface 300 to control the carriage 10. As is discussed in further detail bellow, the carriage 10, cable 200, provide an advantageous alternative to many known lifting and transporting systems currently being employed. The written description first describes the carriage 10. Second, the description describes the cable 200. Finally, this description identifies novel uses and configurations of the carriage 10 and cable 200 in accordance with the present disclosure.

Figure 2:
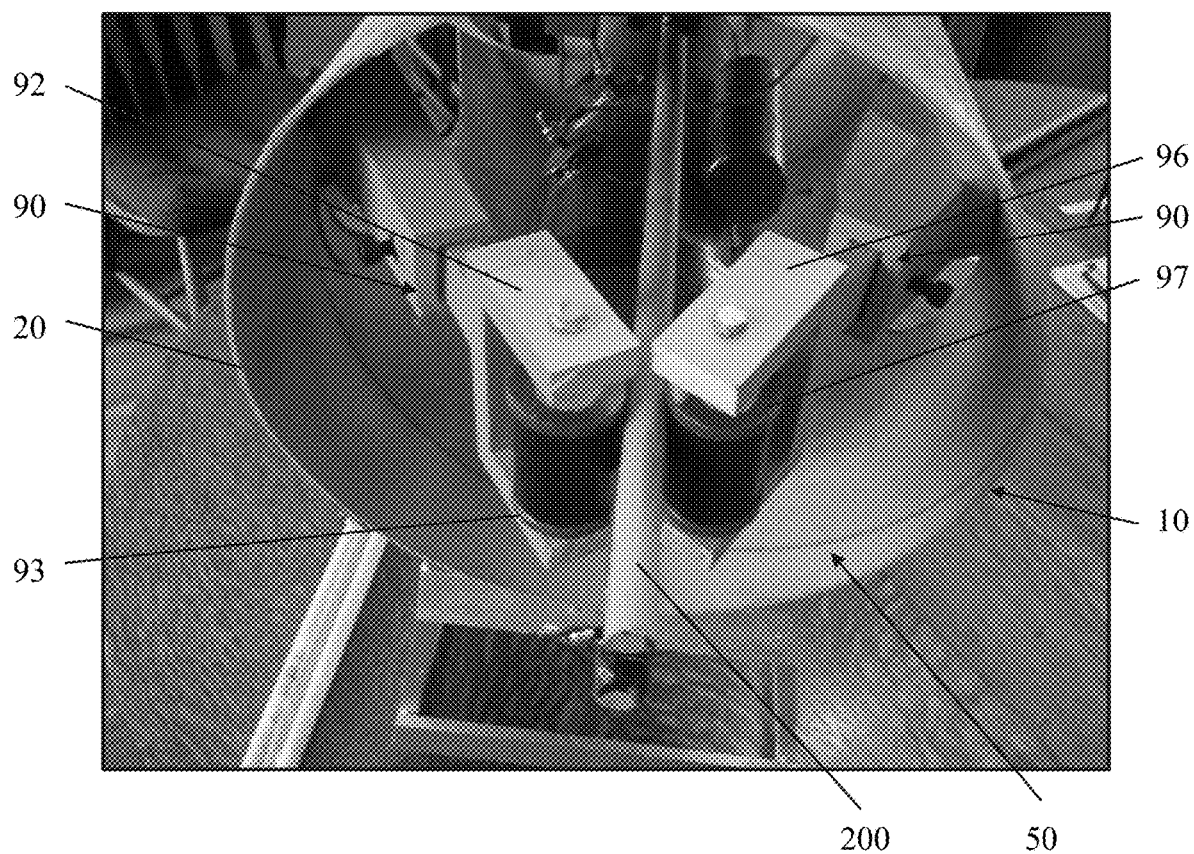
FIG. 2 illustrates a front view of an exemplary embodiment of a carriage, according to aspects of the present disclosure.
Figure 3:
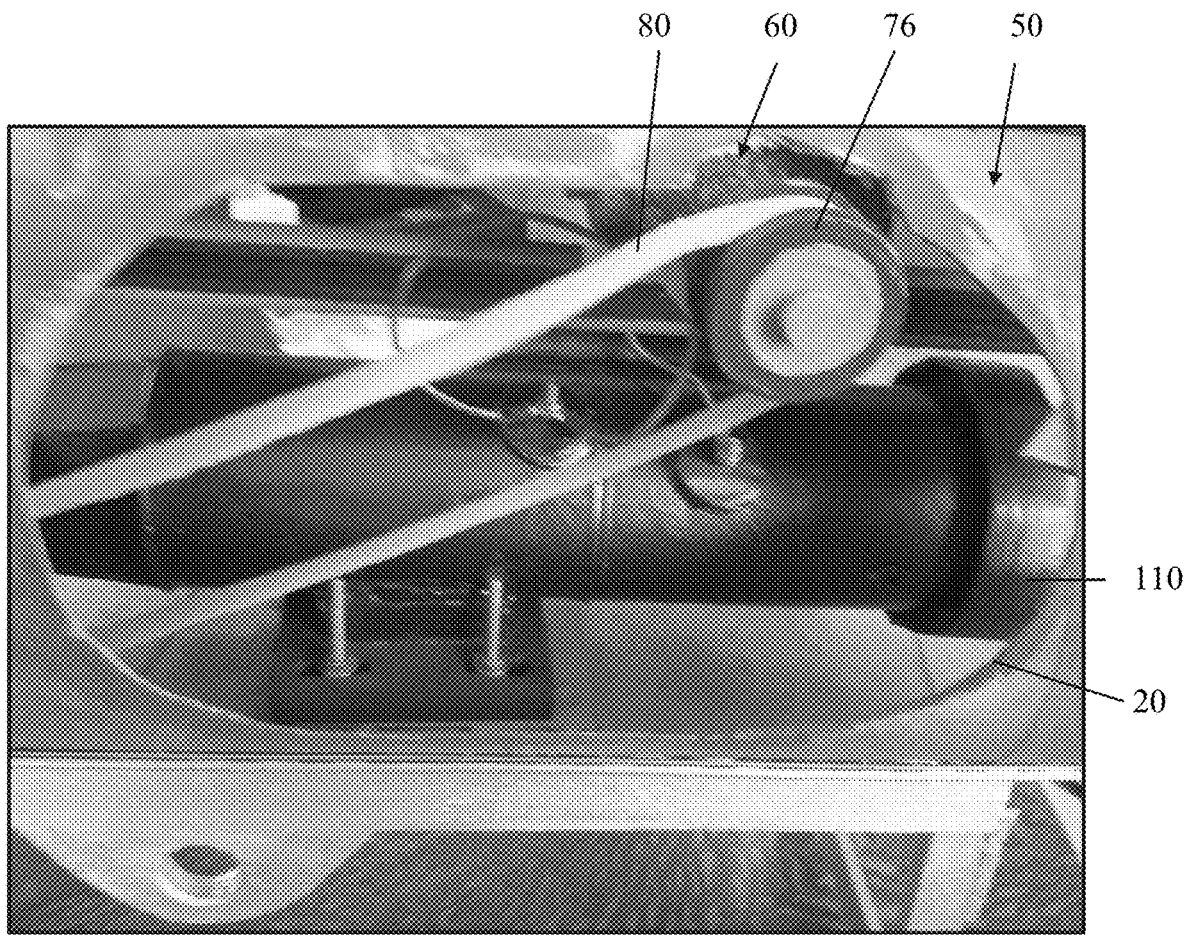
FIG. 3 illustrates a side view of the carriage shown in FIG. 2, according to aspects of the present disclosure.
Figure 4:
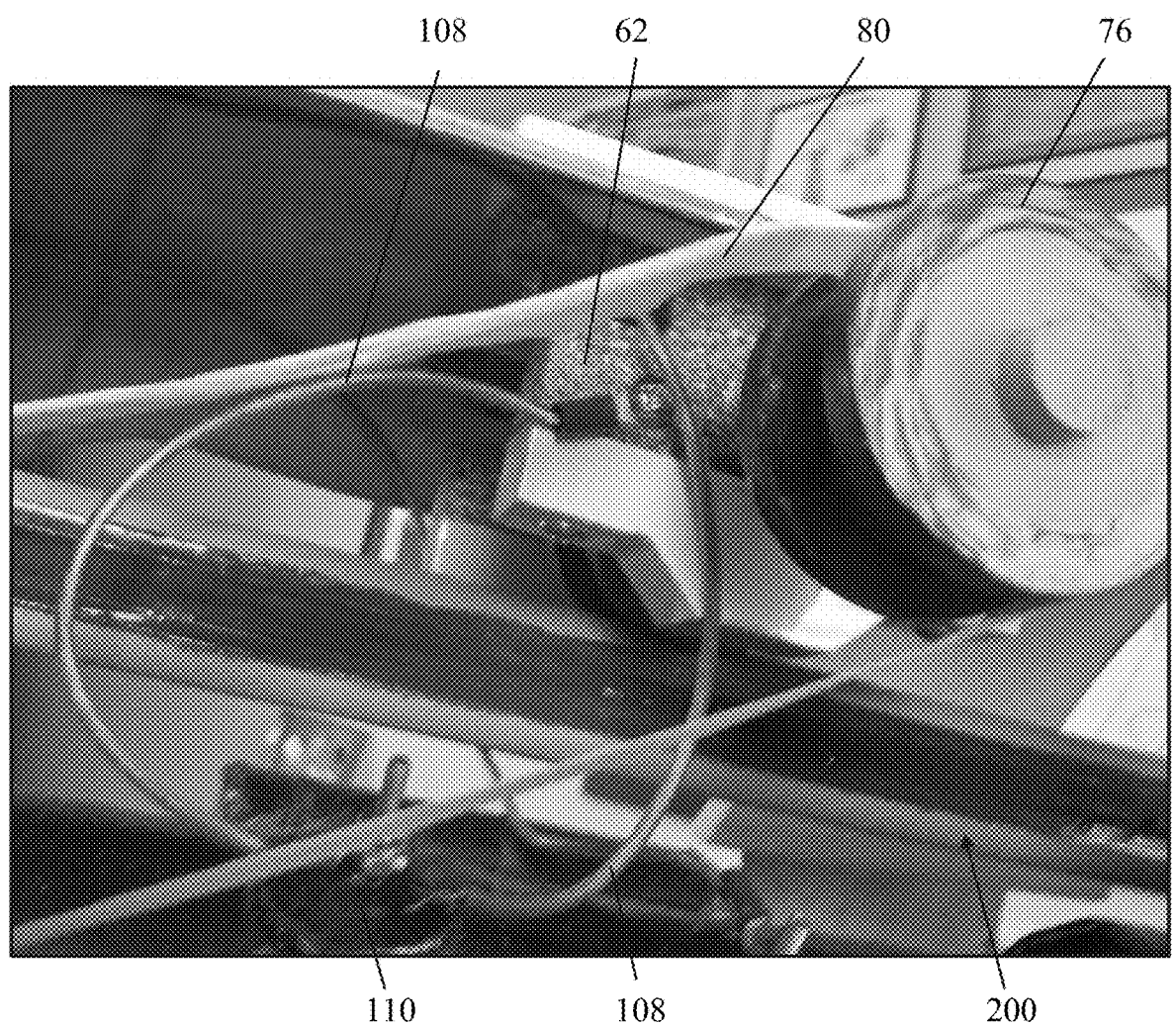
FIG. 4 illustrates another side view, showing details of the carriage shown in FIG. 2, according to aspects of the present disclosure.
Figure 5:
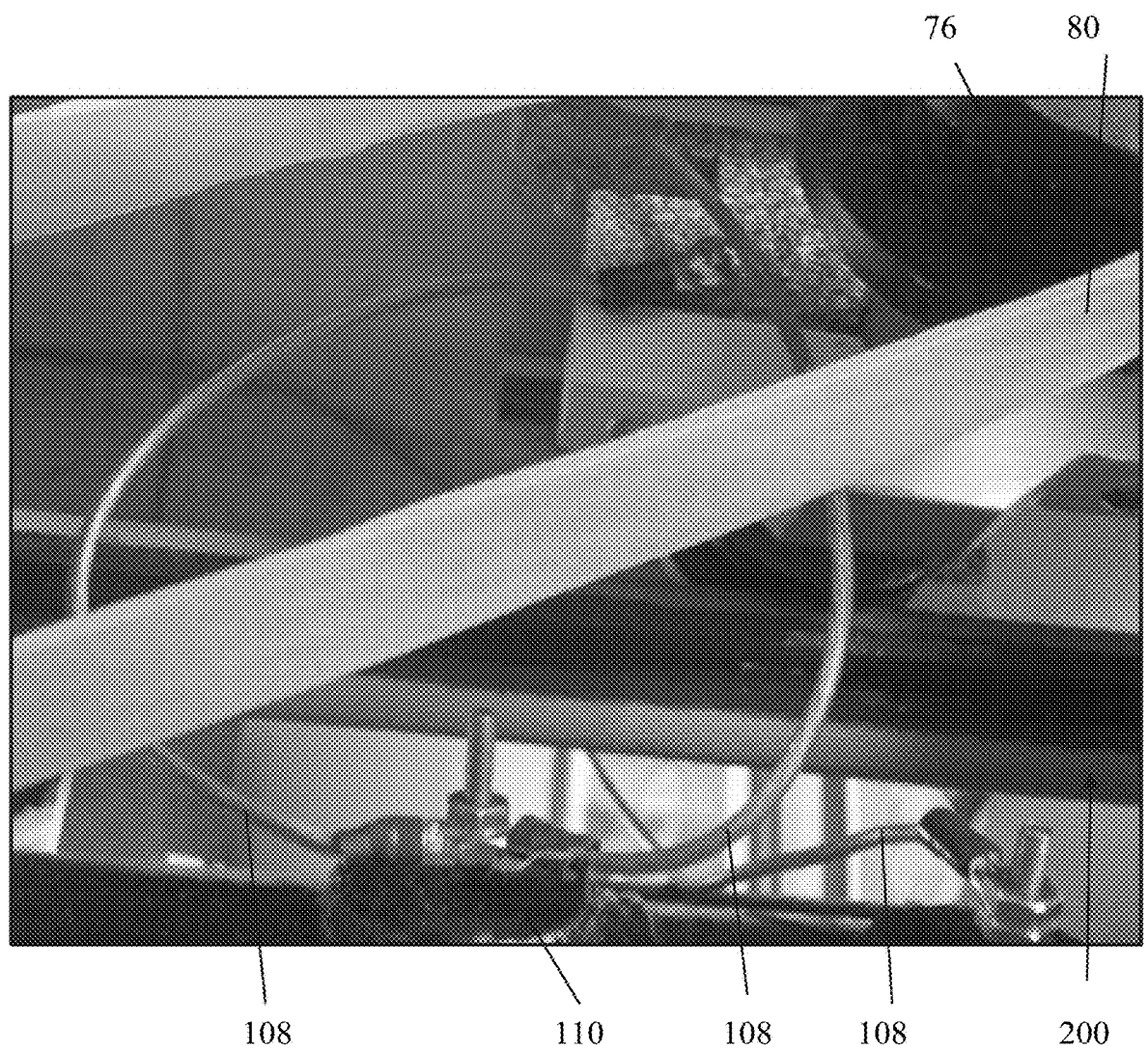
FIG. 5 illustrates another side view of the carriage shown in FIG. 2, according to aspects of the present disclosure.
Figure 6:
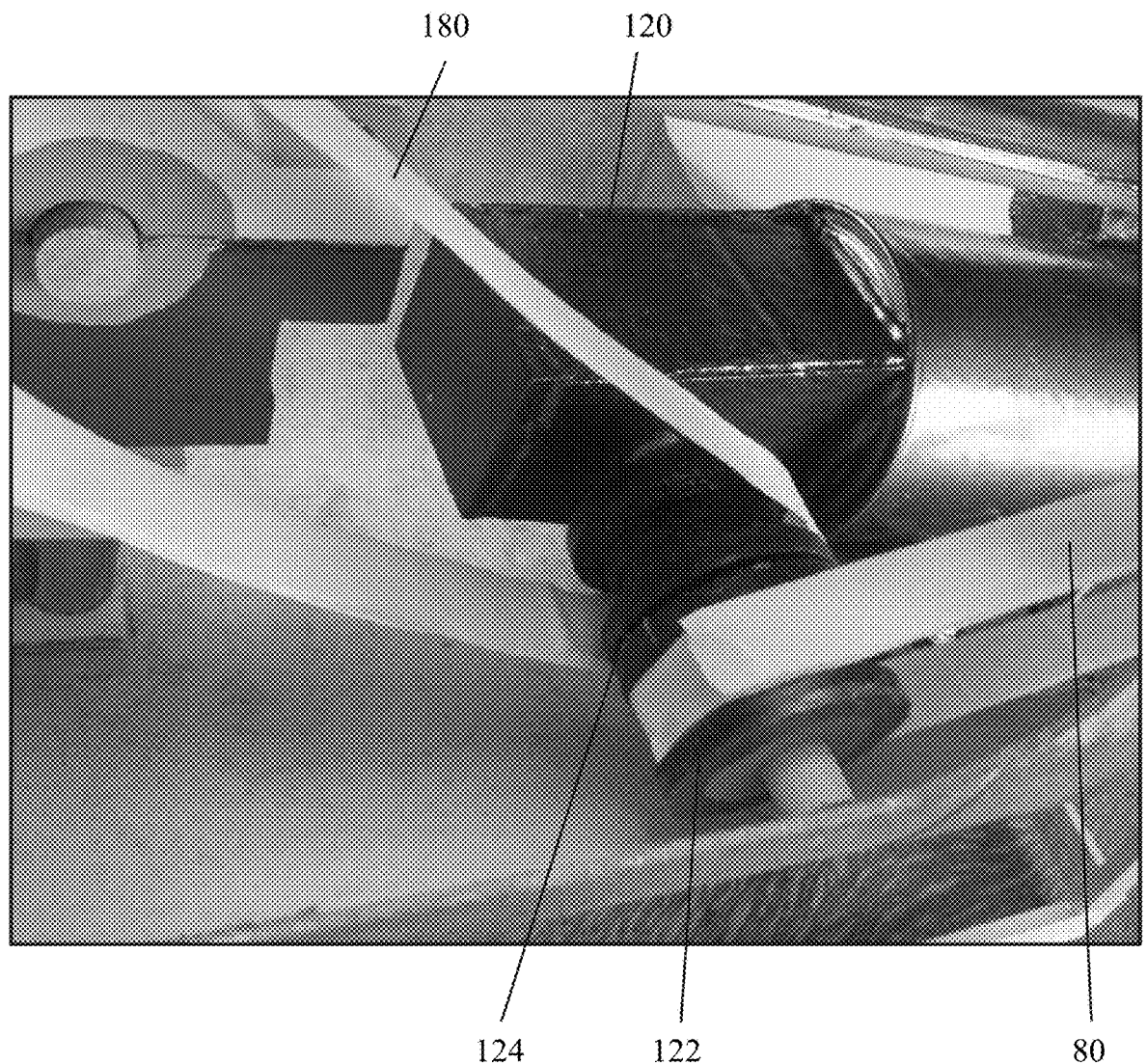
FIG. 6 illustrates a side view of a drive mechanism and a gear box of the carriage shown in FIG. 2, according to aspects of the present disclosure.
Figure 8:
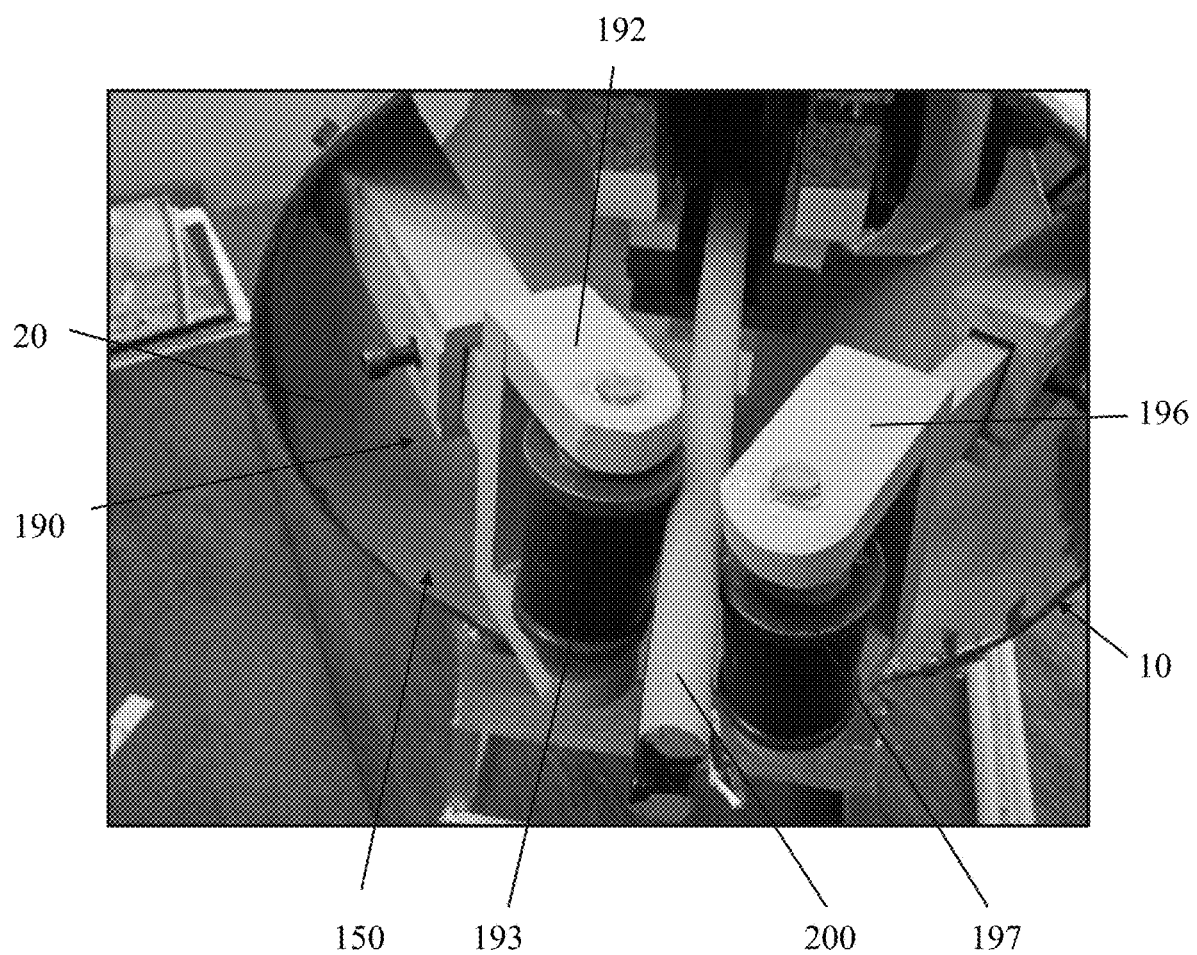
FIG. 8 illustrates a rear view of the carriage shown in FIG. 2, according to aspects of the present disclosure.

In general reference to FIGS. 2 and 8, a carriage 10 in accordance with one embodiment is shown. The carriage 10 comprises a housing 20 in which a plurality of components for driving the carriage 10 and suspending the carriage 10 are disposed. In the embodiment shown, the housing 20 is generally cylindrical and extends along an axis coaxial with or parallel to the axis of the cable 200. The housing 20 extends between a front end 50 of the carriage 10 and a rear end 150 of the carriage 10. The housing 20 is open at the front end 50 and the rear end 150 of the carriage 10 to allow the cable 200 to pass through the cavity defined by the housing 20. It will be understood by a person having ordinary skill in the art and being familiar with this disclosure that the housing 20 is not limited to the configuration disclosed in the FIGS. and that the housing 20 may have any number of sizes and configurations. For example, the motors could be installed on the axle for direct drive. Changing the position of the motor may configure the carriage to fit into many different spaces.

Figure 18:
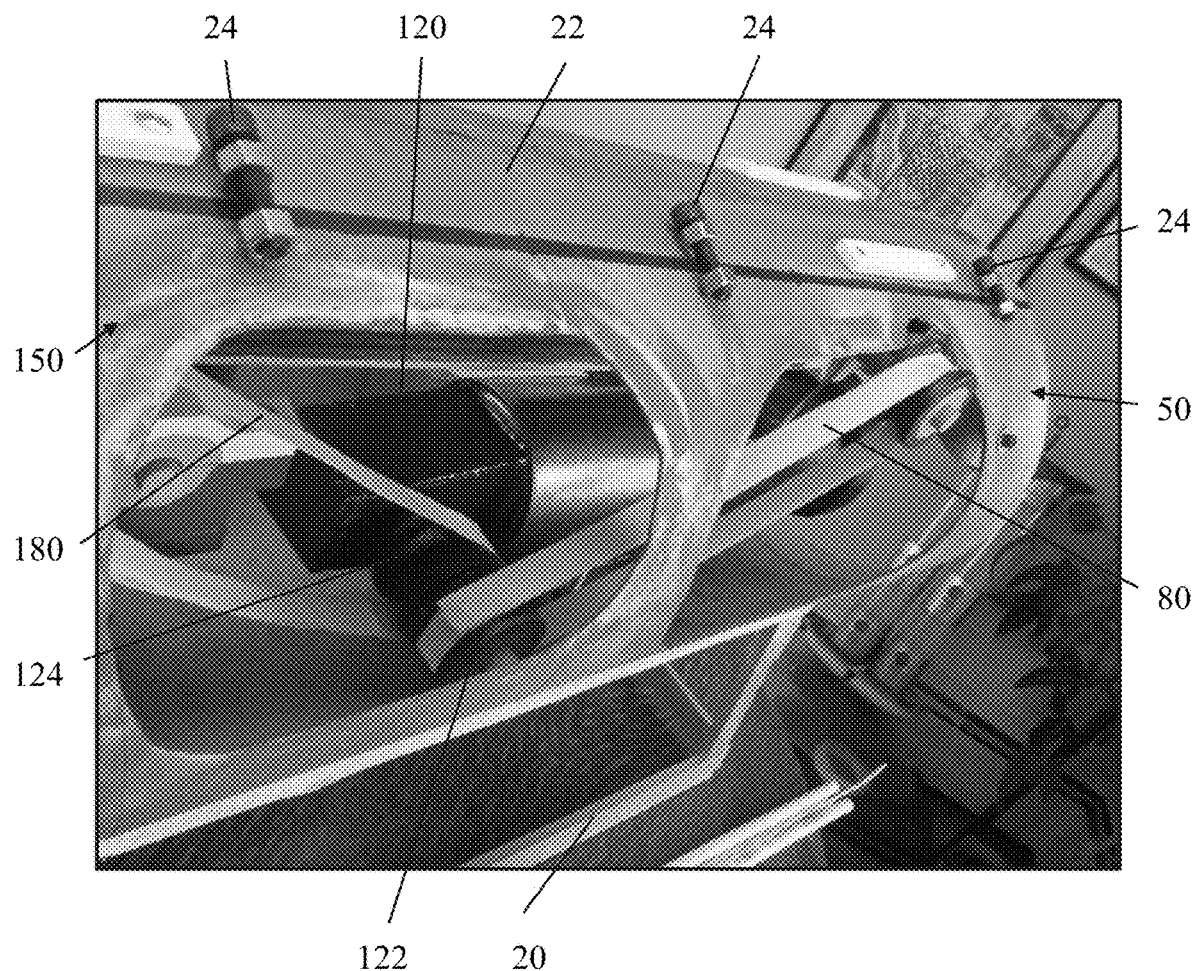
FIG. 18 illustrates a side view of the carriage shown in FIG. 2, according to aspects of the present disclosure.
Figure 19:
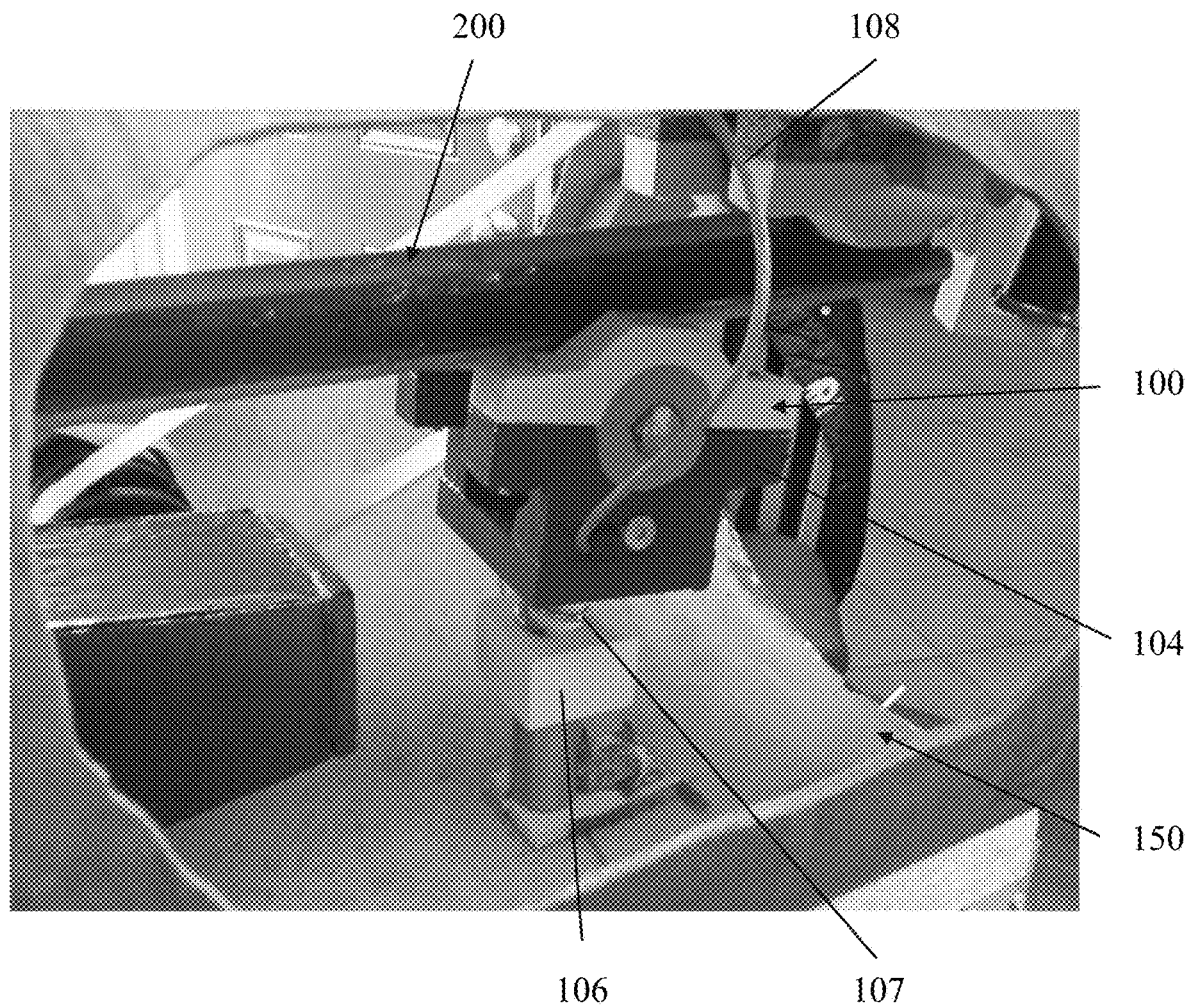
FIG. 19 illustrates another cross-sectional side view of the carriage shown in FIG. 2, according to aspects of the present disclosure.
Figure 20:
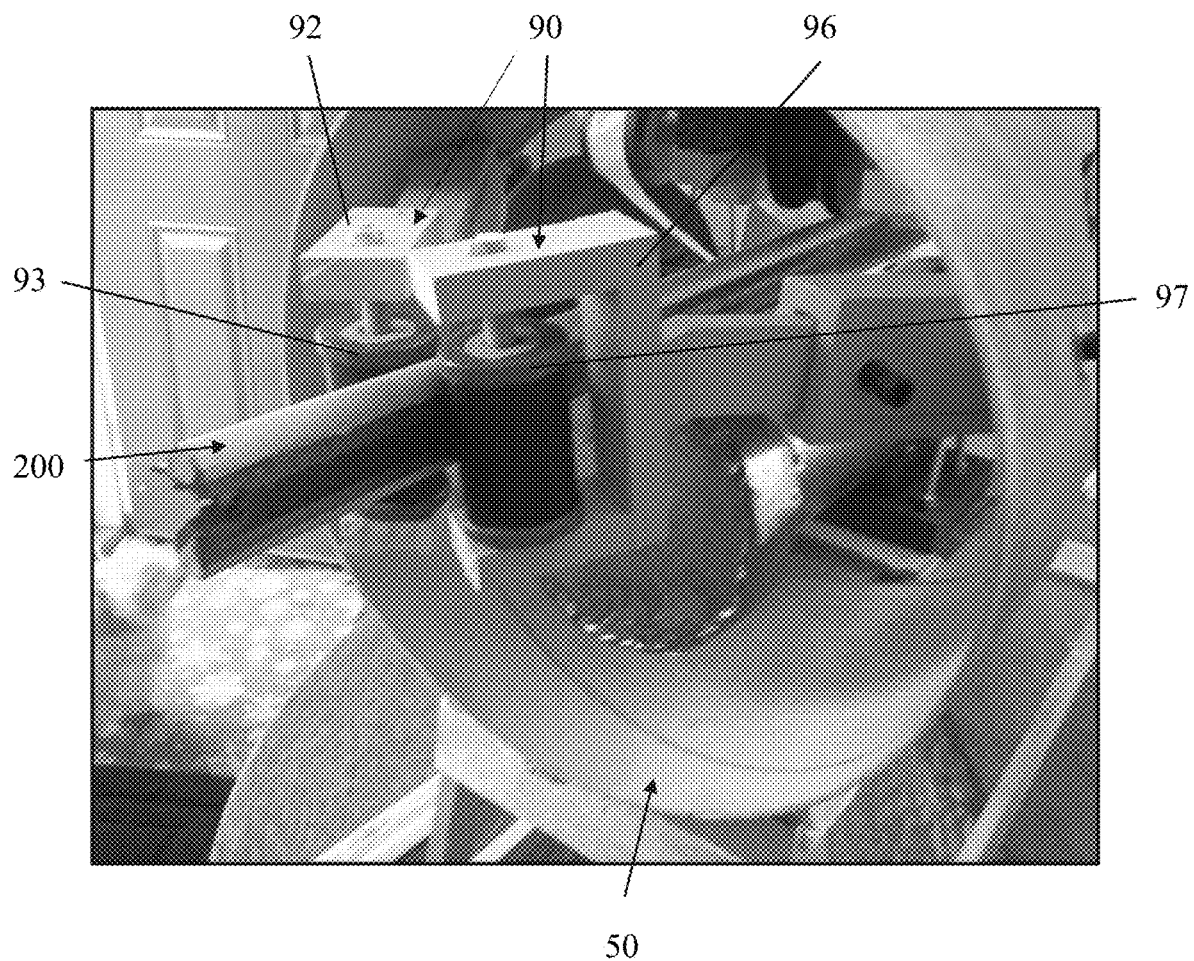
FIG. 20 illustrates a front view of the carriage shown in FIG. 2 engaging the cable shown in FIG. 12, according to aspects of the present disclosure.

Referring to FIGS. 2, 8, and 18, the components for driving and suspending the carriage 10 are disposed in the housing 20. Portions of the housing 20 may be cut away to allow access to the components disposed in the housing 20 and/or to reduce the weight of the carriage 10 (see, e.g., FIG. 18). Although the housing 20 is shown as having portions cut-away there from, the present disclosure is not limited in this regard, and the housing may be substantially uniform, or may have any other configuration. When repositioning the motors, the shape and configuration of the carriage may change as well, but still functions the same. In some embodiments, the carriage may be open like the letter C, allowing the carriage to change from one cable line to a second cable line. In other embodiments, the carriage may be like the letter O. For example, the carriage could be used on ships where the carriage may need to be explosion proof. In this example, the carriage may be configured with a C opening, with the addition of a door, but will still function the same.

In reference to FIG. 18, the housing 20 includes a door that extends along the length of the housing 20 disposed proximate an upper portion of the housing 20. The door 22 is moveable between an open position and a closed position (shown in closed position in FIG. 18). A plurality of bolts 24 fasten the door 22 in the closed position (as shown in FIG. 18.) The door 22 enables the cable 200 to be inserted through the carriage 10 when both ends of the cable are fixed. The carriage 10 is suspended on the cable 200 by at least one bogie 60, 160 (discussed in further detail below) disposed in the housing 20. After the carriage 10 is suspended on the cable 200, the door 22 can be moved to the closed position and fastened by the plurality of bolts 24. In addition to enabling the carriage 10 to be suspended on the cable 200, the door 22 provides access to the components disposed in the carriage for the purpose of assembly and service.

It will be understood by a person having ordinary skill in the art that the carriage 10, in accordance with the present disclosure, does not require a door. For example, the carriage 10 may be suspended on the cable 200 by passing one end of the cable 200 through the carriage 10 before that end of the cable 200 is fixed. It will also be understood by a person of ordinary skill in the art and familiar with this disclosure that although three bolts 24 are shown in the FIG. 18, embodiments of the present disclosure are not limited in this regard as the number of fasteners and type thereof may vary depending on the any number of factors, such as aesthetics and performance specifications. For example, specified speed and operating environment of the carriage 10 may determine the configuration of the carriage 10 and the number and type of fasteners for securing the door 22. In other embodiments, for example a carriage 10 designed to travel relatively fast along the axis of the cable 200, may not include a hinged door 22, and, instead, will have at least a portion of the housing 20 that is permanently open. In the embodiment shown, the housing 20 is made from steel, however, it will be appreciated by a person of ordinary skill in the art and familiar with this disclosure that the material (and thickness) of the housing 20 may vary. For example, in a marine environment, composite materials may be used for resistance to corrosion from sea water.

Figure 10:
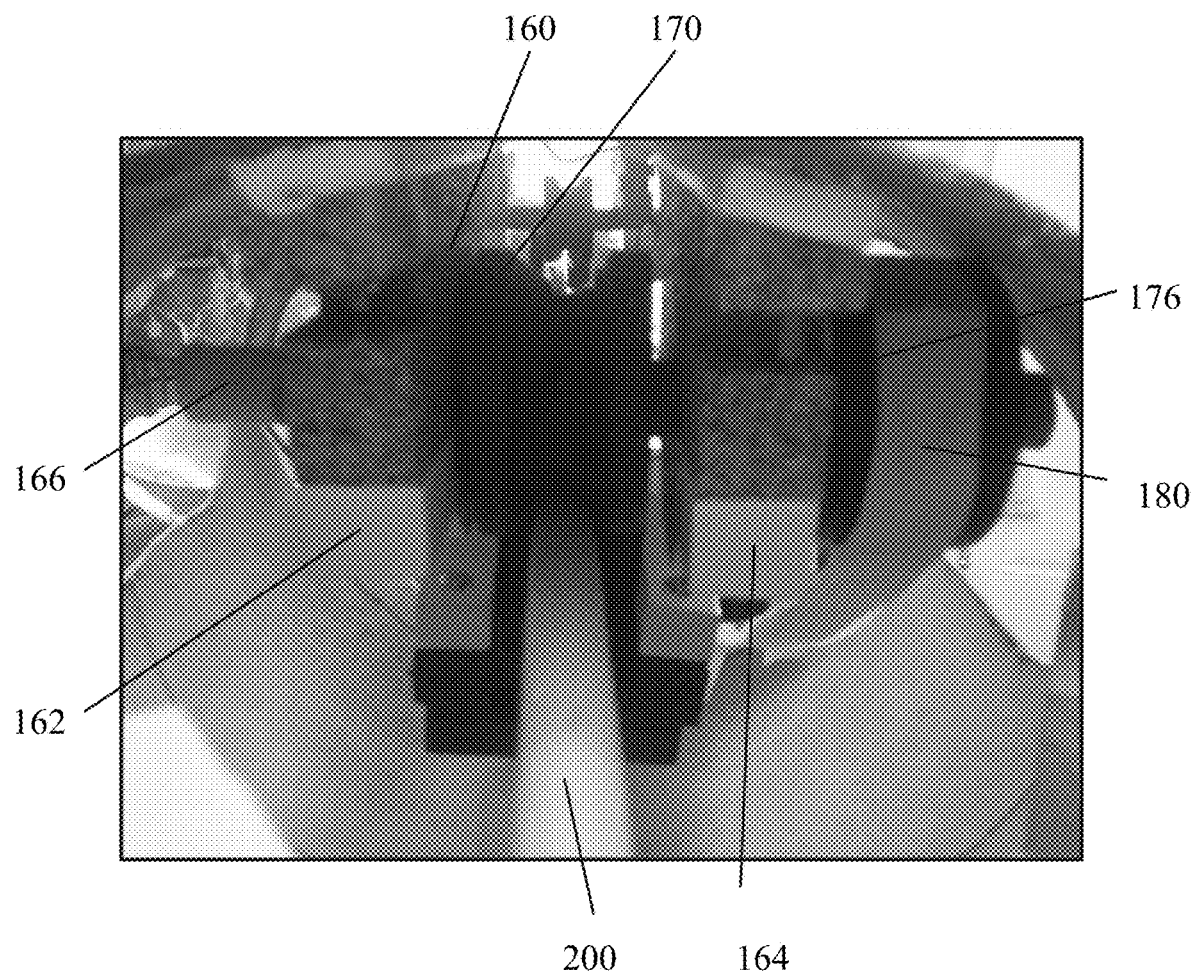
FIG. 10 illustrates a rear view of the carriage shown in FIG. 2, according to aspects of the present disclosure.
Figure 11:
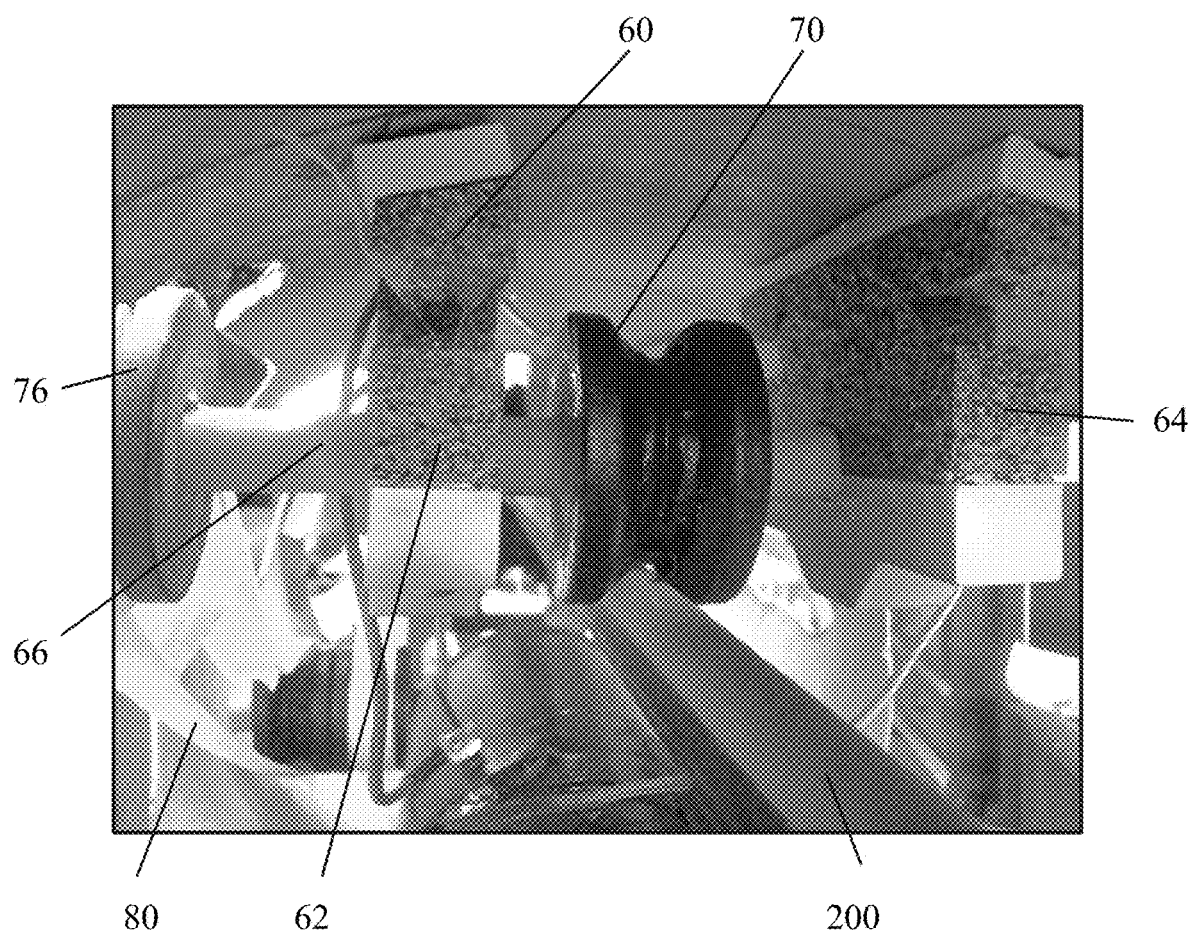
FIG. 11 illustrates a front view of the carriage shown in FIG. 2, according to aspects of the present disclosure.

In references to FIGS. 10 and 11, a first bogie 60 and a second bogie 160 are disposed in the housing 20 proximate to the front end 50 and the rear end 150 of the housing 20, respectively. The bogies 60, 160 (also referred to as trucks) suspend the carriage 10 from the cable 200 and drive the carriage 10 along the cable 200. In reference to FIG. 11, the first bogie 60 comprises first and second supports 62, 64. The supports 62, 64 are coupled to an inside surface of the housing 20 and fix the first bogie 60 in the housing 20. An axle 66 passes through the first and second supports 62, 64. In the disclosed embodiment, the axle 66 is rotatable relative to the supports 62, 64. The portion of the supports 62, 64 through which the axle 66 passes may include one or more bearings for (not shown in the FIGS.) for facilitating rotation of the axle 66 relative to the supports 62, 64. In some embodiments, the bearings comprise ball bearings, and in yet further embodiments the bearings comprise angular contact bearings.

In reference to FIG. 11, the first bogie 60 includes a first wheel 70 fixed on the axle 66 between the first support 62 and the second support 64. The first wheel 70 defines a channel on an outside circumferential surface thereof. The channel is configured to receive at least a portion of the cable 200. It should be understood that the depth of the channel may vary based on the diameter of the cable 200, among other factors. The first wheel 70 is rotatable relative to the first and second supports 62, 64. The first wheel 70 can rotate along the top surface of the cable 200. The first bogie 60 includes a second wheel 76 coupled to the axle 66. The second wheel 76 is outside the first support 62 and second support 64. The second wheel 76 is fixed to the axle 66 and is coplanar to the first wheel 70. The second wheel 76 is configured to receive at least portion of a first belt 80 about at least portion of the circumference along an outside surface of the second wheel 76. During operation of the carriage 10, the first belt 80 is driven by the electric motor (discussed in detail below). The first belt 80 rotates the second wheel 76, which rotates the axle 66. The rotation of the axle 66 rotates the first wheel 70 to drive the carriage along the cable 200. It will be understood by a person having ordinary skill in the art and familiar with this disclosure that the configuration of the first bogie 60 can vary to account for operation conditions and performance specifications, among other factors.

In reference to FIG. 10, the second bogie 160 comprises first and second supports 162, 164. The supports 162, 164 are coupled to an inside surface of the housing 20 and fix the second bogie 160 to the housing 20. The second bogie 160 is proximate to the rear end 150 of the carriage 10. An axle 166 passes through the first and second supports 162, 164. In the disclosed embodiment, the axle 166 is rotatable relative to the supports 162, 164. The portion of the supports 162, 164 through which the axle 166 passes may include one or more bearings for facilitating rotation of the axle 166 relative to the supports 162, 164. In some embodiments, the bearings comprise ball bearings, and in yet further embodiments the bearings comprise angular contact bearings.

The second bogie 160 includes a first wheel 170 fixed on the axle 166 between the first support 162 and the second support 164. The first wheel 170 defines a channel extending along an outside surface of the circumference thereof. The channel is configured to receive at least a portion of the cable 200 and hang there from. It should be understood that the depth of the channel may vary based on the diameter of the cable 200, among other factors. The first wheel 170 is rotatable relative to the first and second supports 162, 164. The first wheel 170 can rotate along the top surface of the cable 200. The second bogie 160 includes a second wheel 176 coupled to the axle 166. The second wheel 176 is outside the first support 162 and second support 164. The second wheel 176 is fixed to the axle 166 and is coplanar to the first wheel 170. The second wheel 176 is configured to receive at least portion of a second belt 180 about at least a portion of the circumference along an outside surface of the second wheel 176. During operation of the carriage 10, the second belt 180 is driven by the electric motor (discussed in detail below). The second belt 180 rotates the second wheel 176, which rotates the axle 166. The rotation of the axle 166 rotates the first wheel 170 which drives the carriage 10 along the cable 200. It will be understood by a person having ordinary skill in the art, and familiar with this disclosure, that the configuration of the second bogie 160 can vary to account for operation conditions and performance specifications. It should also be understood that the carriage 10 in accordance with the present disclosure is not limited to having two bogies (for example, the first bogie 60 and the second bogie 160), and the carriage 10 may include more than two bogies, or only a single bogie.

Referring again to FIGS. 2 and 8, the carriage 10 includes first and second stabilizers 90, 190 to inhibit rotation of the carriage 10 about the cable 200. During operation of the carriage 10, forces may act upon the carriage so as to cause the carriage to rotate about the cable due to loading conditions and other operating conditions. The stabilizers 90, 190 prevent the carriage 10 from rotating off of the cable 200. In reference to FIG. 2, the first stabilizer 90 is shown. The first stabilizer 90 includes a first arm 92 and a second arm 96. The first arm 92 is fixed to an inside surface of the housing 20 and the second arm 96 is fixed to an inside surface of the housing 20. The first stabilizer 90 is positioned proximate the front end 50 of the carriage 10. The first and second arms 92, 96 extend inward toward the cable 200 from opposing sides of the housing 20. A first roller 93 is disposed on the first arm 92 and a second roller 97 is disposed on the second arm 96. The rollers 93, 97 contact the cable 200 and roll along the cable when the carriage 10 is moving relative to the cable. The rollers 93, 97 inhibit rotation of the carriage 10 relative to the cable 200 during operation thereof and bias the carriage in an upright position. The rollers 93, 97, and the first and second arms 92, 96 are retractable such that they can disengage from the cable 200. In some embodiments, not specifically disclosed in the FIG., a suspension system may be provided to bias the rollers 93, 97 toward the cable 200 during use. In other embodiments, a hydraulic system may be employed. In some embodiments, the rollers 93, 97 may be made from an insulating material to inhibit conducting electrical energy from the cable 200 through the first stabilizer 90.

In reference to FIG. 8, the second stabilizer 190 is shown. The second stabilizer 190 is similar to the first stabilizer 90. The second stabilizer 190 includes a first arm 192 and a second arm 196. The first arm 192 is fixed to an inside surface of the housing 20 and the second arm 196 is fixed to an inside surface of the housing 20. The second stabilizer 190 is positioned proximate the rear end 150 of the carriage 10. The first and second arms 192, 196 extend inward toward the cable 200 from opposing sides of the housing 20. A first roller 193 is disposed on the first arm 192 and a second roller 197 is disposed on the second arm 196. The rollers 193, 197 contact the cable 200 and roll along the cable when the carriage 10 is moving relative to the cable. The rollers 193, 197 inhibit rotation of the carriage 10 relative to the cable 200 during operation thereof and bias the carriage toward an upright position. The rollers 193, 197, and the first and second arms 192, 196 are retractable such that they can disengage from the cable 200. In some embodiments, not specifically disclosed in the FIG., a suspension system may be provided to ensure that the rollers 193, 197 stay in contact with the cable 200 during use. In other embodiments, a hydraulic system may be employed. In some embodiments, the rollers 193, 197 may be made from an insulating material to inhibit conducting electrical energy from the cable 200 through the first stabilizer 90. Although the disclosed embodiment includes a first stabilizer 90 and a second stabilizer 190, the present disclosure is not limited in this regard because the number of stabilizers may vary. For example, a carriage in accordance with the present disclosure may include no stabilizers, one stabilizer, two stabilizers, or more than two stabilizers.

Figure 7:
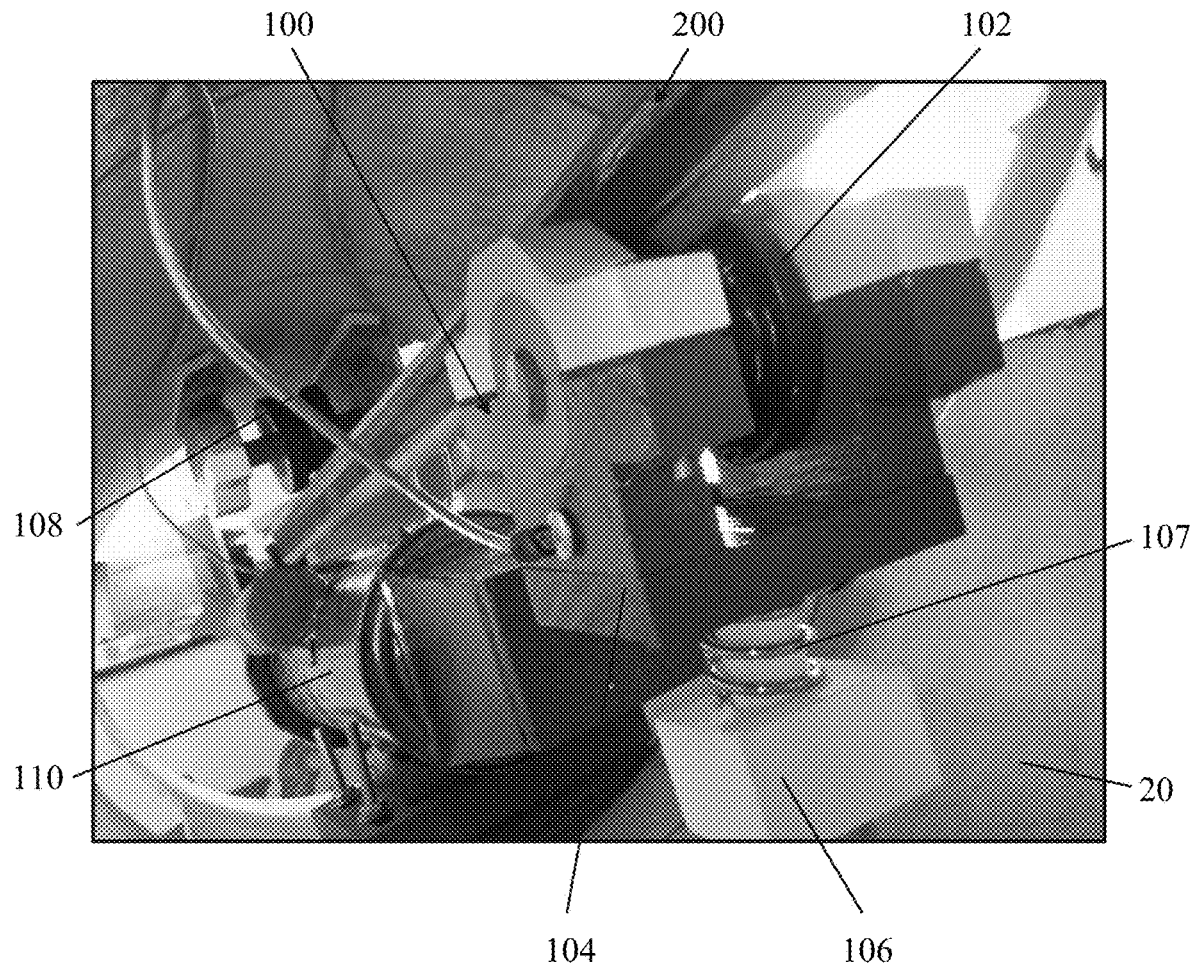
FIG. 7 illustrates a rear view of the inside of the carriage shown in FIG. 2, according to aspects of the present disclosure.

As illustrated in FIG. 7, and discussed in more detail below, the cable 200 provides electric power for operating the carriage 10. The carriage 10 includes at least one conductor 100 for conducting electric power from the cable 200. In the embodiment shown in FIG. 7, the carriage 10 includes a first conductor 100. The first conductor 100 comprises one or more conducting wheel 102, a bracket 104, and a post 106. The one or more conducting wheel 102 is rotatably disposed in the bracket 104. The bracket 104 is fixed to a distal end of the post 106. An opposite end of the post 106 is fixed to an inside surface of the housing 20. In the embodiment shown, the one or more conducting wheel 102 is electrically insulated from the bracket 104. During operating of the carriage 10, the one or more conducting wheel 102 rolls on an underside of the cable 200 and conducts electricity there from. The one or more conducting wheel 102 is in electric communication with a motor 110 via an insulated wire 108. In the embodiment shown, the first conductor 100 includes a spring 107 to bias the one or more conducting wheel 102 against the cable 200. In the embodiment shown in the FIG., the first conductor 100 can be rotated away from the cable 200 to facilitate installation of the cable in the carriage 10 and maintenance of the carriage 10. Although only a first conductor 100 is shown in the FIG. 7, it is preferred that the carriage 10 includes at least two conductors to ensure a continuous flow of electric power between the cable 200 and the motor 110. A transportation system may require the carriage to change from one line to another. Having two points (i.e., conductors such as conductor 100) to pick up power will ensure that the system will always have uninterrupted power for the motor or motors. If more than one motor is used, when hauling a heavy load for example, there will be an insulated cable connecting each of the motors together, electrically. When the carriage crosses over from a first line (i.e., an electrified-cable system) to a second line, a first motor of the more than one motors may lose power, temporarily, for the transition. Because a second motor of the more than one motors has power, and an insulated cable connects the first and second motors together, power will not be lost for any of the motors.

Figure 9:
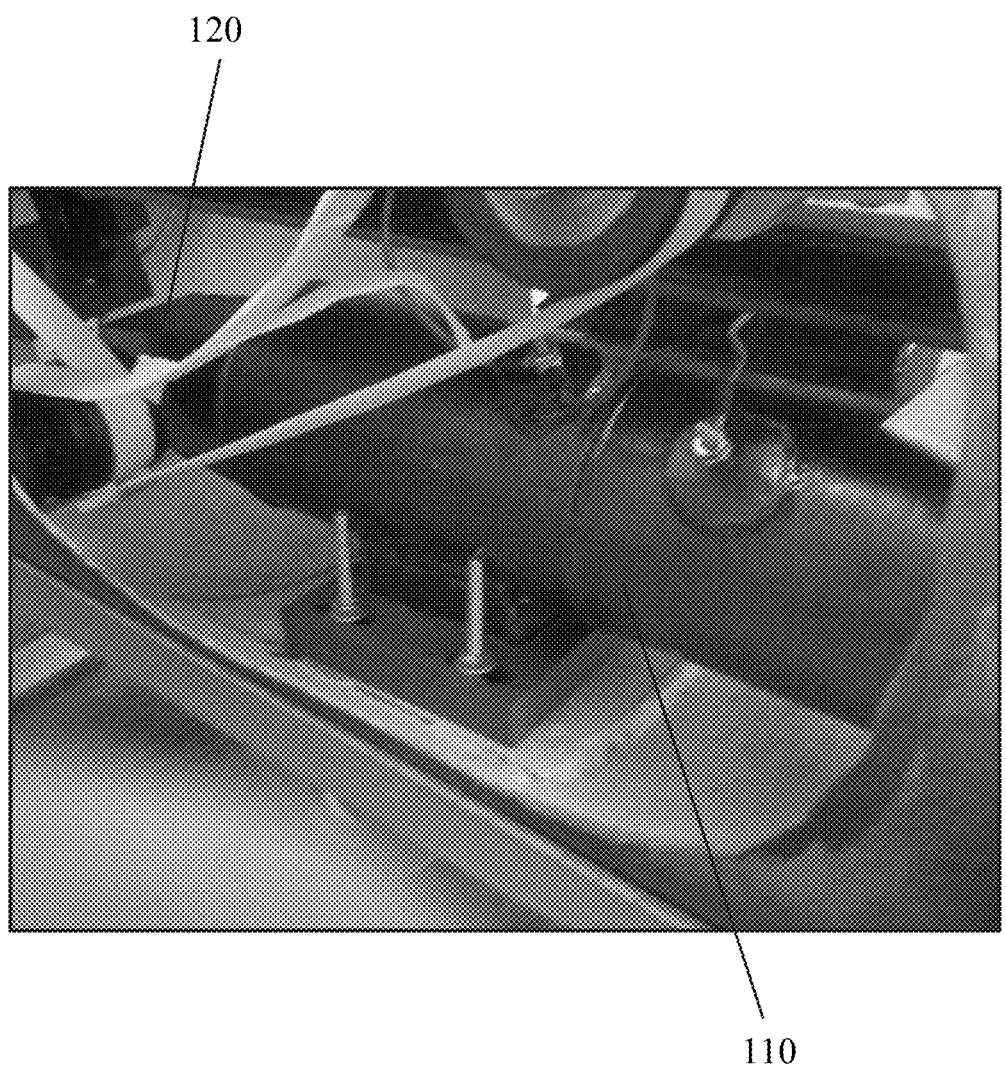
FIG. 9 illustrates another side view of the carriage shown in FIG. 2, according to aspects of the present disclosure.

Referring now to FIGS. 7 and 9, the carriage 10 includes a motor 110. As can be seen in FIG. 9, for example, the electric motor 110 may be disposed inside the housing 20 of the carriage 10. In other embodiments, the electric motor 110 may be located external to the housing 20. The electric motor 110 may be fixed to a bottom inside surface of the housing 20. The electric motor 110 converts the electric power received from the one on more conductors 100 to mechanical energy. Specifically, the electric motor 110 uses the electric power to rotate a shaft (not shown in the FIGS.) that is parallel to cable 200. It will be understood by a person of ordinary skill in the art and familiar with this disclosure that the size, type, and configuration of the motor or motors disposed inside the carriage may vary according to the size of the particular carriage and its specified use (e.g., the position of the motors may allow the carriage to be, for example, tall and thin or short and wide, depending on operational requirements). For example, the motor 110 in a carriage designed to lift and move an industrial size truck will likely be different than a motor 110 in a carriage designed to carry a single person. A gearbox 120 is in mechanical communication with the rotating shaft of the motor 110. The gearbox 120 is configured so that it rotates a second shaft (not shown in the FIGS.) that is perpendicular to that of the electric motor 110. In some embodiments, the gear box 120 may further include a transmission and/or clutch for controlling the transfer of mechanical energy to the first and second bogies 60, 160. In some embodiments, one or more shafts may be rotated with a pulley in communication with a motor (such as motor 110). In other embodiments, a motor may be directly coupled to one or more shafts.

In reference to FIGS. 6, 10, 11 and 18, a first gear wheel 122 and a second gear wheel 124 are coupled to the second shaft of the gear box 120. The first gear wheel 122 is connected to the second wheel 76 of the first bogie 60 by the first belt 80. The second gear wheel 124 is connected to the second wheel 176 of the second bogie 160. The first and second belts 80, 180 are driven by motor 110 via the gear box 120. As discussed above, the first and second belts 80, 180 drive the first and second bogies 60, 160, thereby enabling the movement of the carriage 10 along the axis of the cable 200. Although belts 80, 180 are shown in the FIG., the disclosure is not limited in this regard, and other means, such as mechanical gears or chains, may be used to drive the first and second bogies 60, 160. In other embodiments, a motor (such as motor 110) may be directly coupled to one or more of the bogies (such as bogie 60, 160).

More specifically, according to aspects of the present disclosure, rotational motion of the motor 110 is transferred to the first and second gear wheels 122, 124 via the gear box 120. The first and second gear wheels 122, 124 transfer rotational motion to the second wheels 76, 176 of the first and second bogies 60, 160 via the first and second belts 80, 180, respectively. The second wheels 76, 176 of the first and second bogies 60, 160 are in communication with and rotate the first wheels 70, 170 of the first and second bogies 60, 160 via respective axles 66, 166. The first wheels 70, 170 of the first and second bogies 60, 160 are in communication with the cable 200 and the rotation of the first wheels 70, 170 enables movement of the carriage 10 along the axis of the cable 200.

Figure 12:
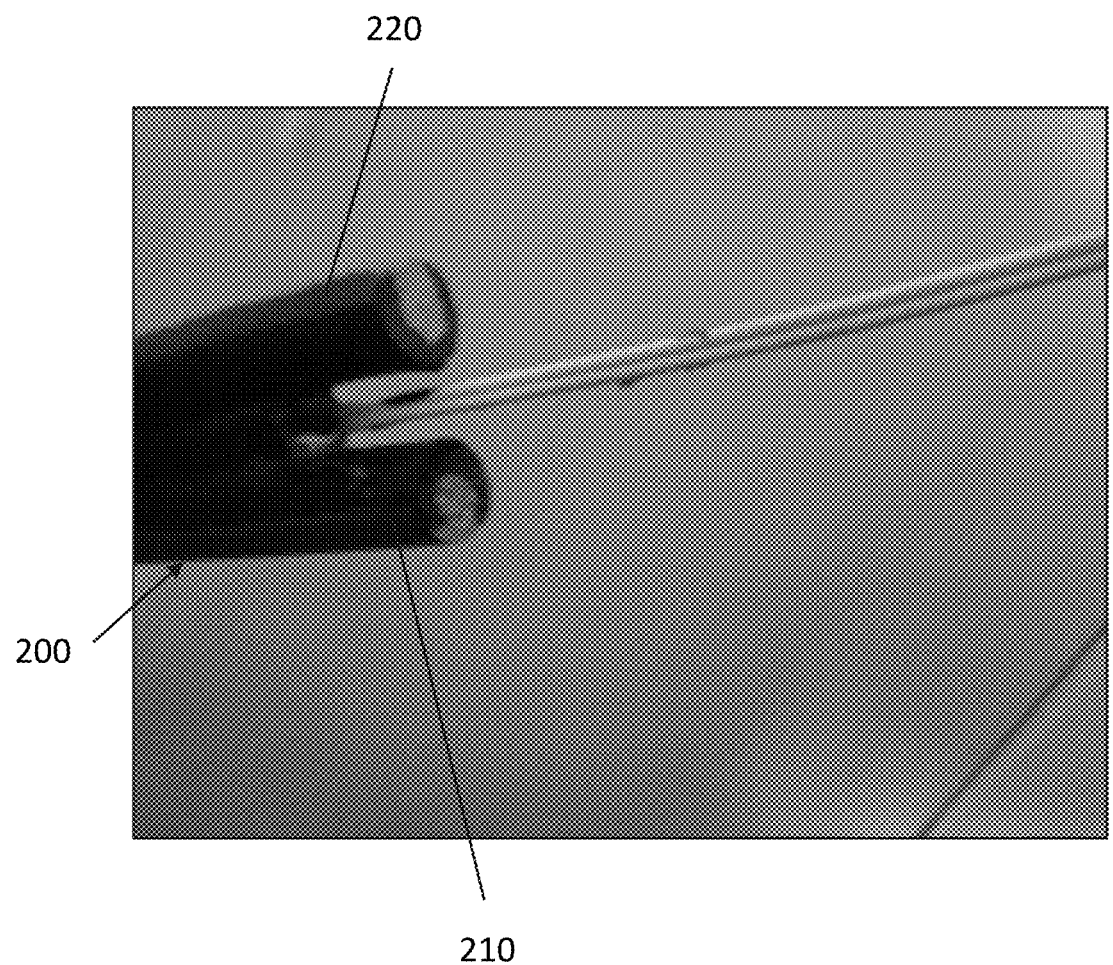
FIG. 12 illustrates an exemplary embodiment of a portion of an electrified cable for supporting a carriage, according to aspects of the present disclosure.
Figure 21A:
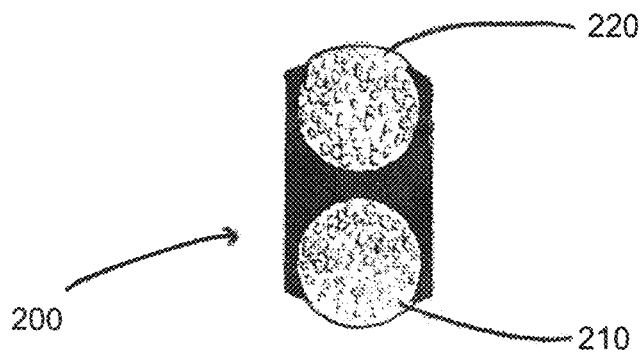
FIG. 21A illustrates a cross-sectional side view of the cable shown in FIG. 12, according to aspects of the present disclosure.
Figure 21B:
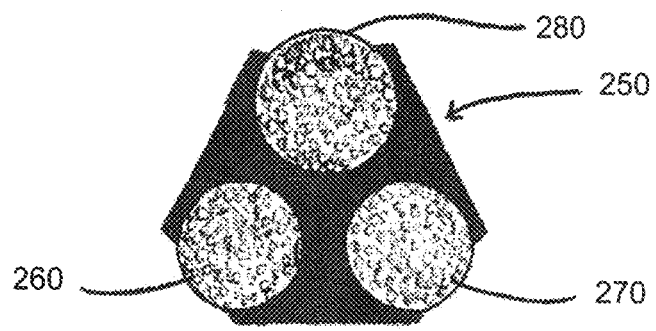
FIG. 21B illustrates a cross-sectional side view of the cable shown in FIG. 15, according to aspects of the present disclosure.

As illustrated by FIGS. 12 and 21, a two-phase cable 200 is shown. The cable 200 in accordance with aspects of the present disclosure may comprise at least one source of electric power extending along the axis of the cable and a ground extending along the axis of the cable. The cable 200 comprises a first insulated wire 210 for providing a source of electric energy and a second insulated wire 220 for completing the circuit. Alternatively, the second insulated wire 220 may provide a source of electrical energy and the first insulated wire 210 may complete the circuit. In the disclosed embodiment, both the first and second insulated wires 210, 220 are steel, and may be steel braided. One or both of the first and second insulated wires 210, 220 may also be copper. However, the first insulated wire 210, which provides the electric power, may be constructed like a typical high wire transmission line. The first insulated wire 210 may also comprise galvanized steel wound around aluminum stranded wire (or aluminum braided core). In embodiments, at least one of the insulated wires (for example, the first and second insulated wires 210, 220) of a cable (for example, cable 200) may comprise a braided outer layer configured to provide a higher degree of friction and, thus, permit a carriage 10 to ascend or descend the cable 200 at greater angles than would otherwise be possible.

In other embodiments, the first and second insulated wires 210, 220 may comprise any suitable material for electrical conduction. The first insulated wire 210 carries the load of the current. The second insulated wire 220 may also be made of steel. In some embodiments, not shown in the FIG., the second insulated wire 220 has a larger diameter than the first insulated wire 210 because the second insulated wire 220 is configured to substantially support the load of the carriage 10. In other embodiments, the first insulated wire 210 may have a larger diameter than the second insulated wire 220 because the first insulated wire 210 is configured to substantially support the load of the carriage. The first insulated wire 210 and the second insulated wire 220 are coupled together and are electrically insulated about at least a portion of the circumference of each respective first and second insulated wire 210, 220. In one embodiment, as illustrated in FIG. 12, a bottom portion of the first insulated wire 210 and a top portion of the second insulated wire 220 are bare so as to facilitate conduction of electric energy from the first insulated wire 210, through the electrical components of the carriage 10 (as will be discussed in further detail), and to the second insulated wire 220 to complete the circuit.

Referring to FIGS. 3-5, 7, 10, and 11, in the illustrated embodiment, electrical current enters the carriage 10 through the one or more conducting wheel 102, in conductive communication with the first insulated wire 210. Electrical current is transferred to the bracket 104 and then to the motor 110, via the insulated wire 108. To complete the circuit of electric current, current flows from the motor to the first wheels 70, 170 of the first and second bogies 60, 160, respectively, via insulated wires 108 (not shown) and the first supports 62, 162, and then to the second insulated wire 220. The first wheel may be insulated to enhance the integrity of the circuit. Embodiments of the present disclosure include carriage 10 and cable 200 configurations using AC or DC electrical power of various voltages and currents. Use of AC or DC power may be based on size and speed considerations of the carriage 10 or location of the associated cable 200.

Referring to FIGS. 7, 10-12 and 21, the cable 200 is a two-conductor cable and the first and second insulated wires 210, 220 have been stripped away to allow access to the power via the conducting wheels 102 (i.e., pulleys). In other embodiments, a bar sliding along the first or second insulated wires 210, 220 may be used to access power for carriage 10 operation. The first wheels 70, 170, resting on the cable 200, have two functions: carrying the weight of the carriage 10 and completing the electrical circuit between the first and second insulated wires 210, 220. The conducting wheels 102 (alternatively, a sliding bar) is pressing against the first insulated cable 210 to pick up power, allowing completion of an electrical circuit on a single cable 200. A heating cable may be embedded in the cable 200 to prevent ice formation on the cable 200. Additionally, one or more communication wires 230 may also be embedded in the cable 200 to allow communication with the carriage 10 (as will be discussed in further detail below), or to allow communication signals (e.g., fiber optic, coaxial, network (e.g., cat6 cable), telephone, etc.) to be transmitted from one point to another along the cable 200. It will also be understood by a person of ordinary skill in the art and familiar with this disclosure that there are many different types of wire that may be embedded in the cable 200 for reasons not listed here.

The cable 200 may include a communication wire 230 that extends along the length of the cable 200. The communication wire 230 may transmit operating instructions and communications along the cable 200. In some embodiments of the present disclosure, the carriage 10 includes a transducer or other means for receiving information from the communication wire 230 as the carriage 10 traverses the cable 200. In some embodiments, the instructions for controlling the motor 110 are received at the control interface 300 and transmitted along the communication wire 230. It should be understood to a person having ordinary skill in the art and being familiar with this disclosure, that the communication wire 230 is optional and is not required to transmit instructions to the carriage 10. For example, the instructions may be transmitted, wirelessly, to the carriage 10 by remote control or control interface 300. In other embodiments, the remote control or control interface 300 may be hard-wired to the carriage 10 for security purposes. The carriage 10 may also be controlled by an on-board computer or controller configured to use one or more of map-based, GPS, or visual navigation or may navigate based on proximity to a tower (e.g., fixed point 202, 204) signal to reach its final destination.

Figure 13:
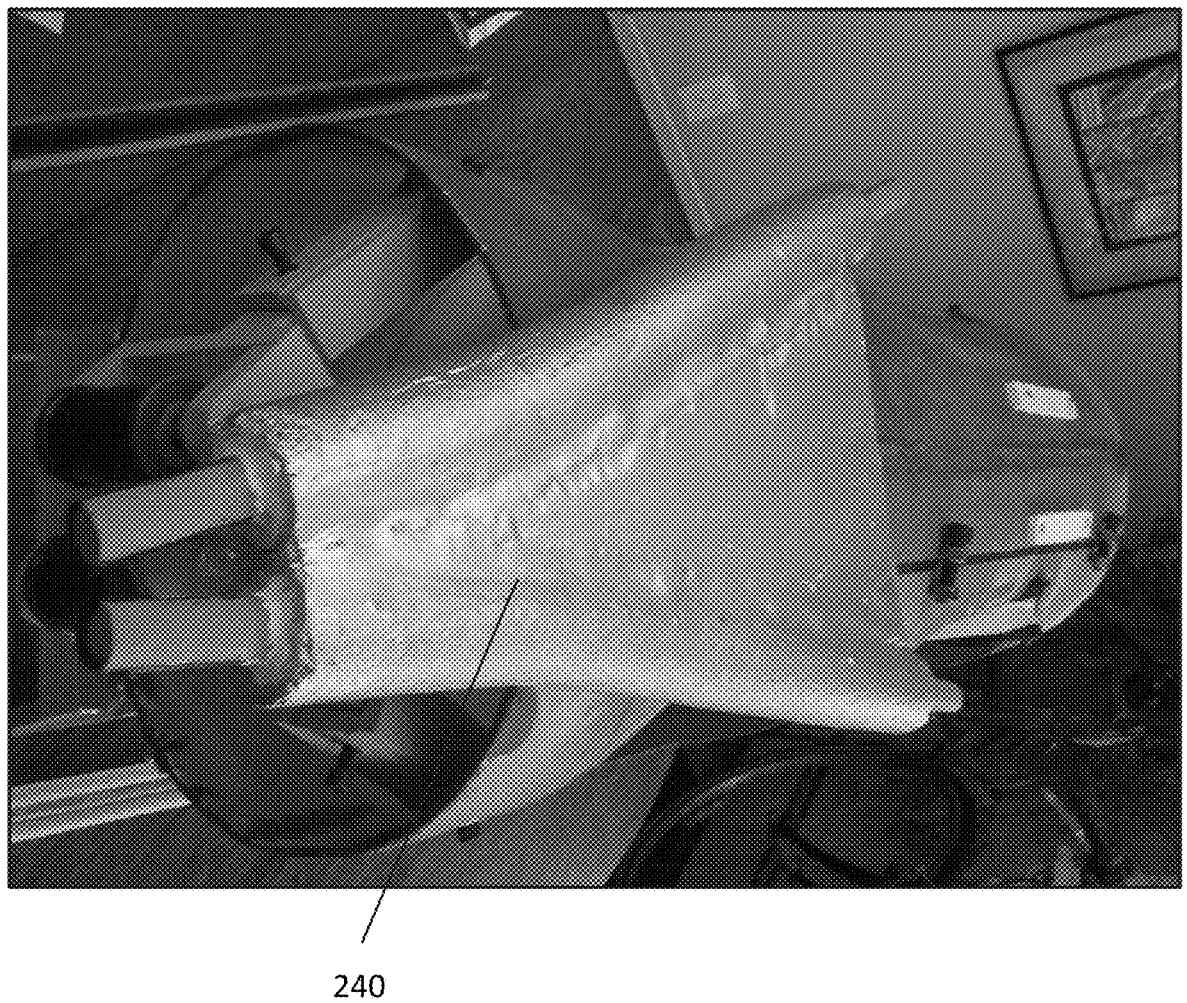
FIG. 13 illustrates a perspective view of an exemplary stabilizer, according to aspects of the present disclosure.
Figure 14:
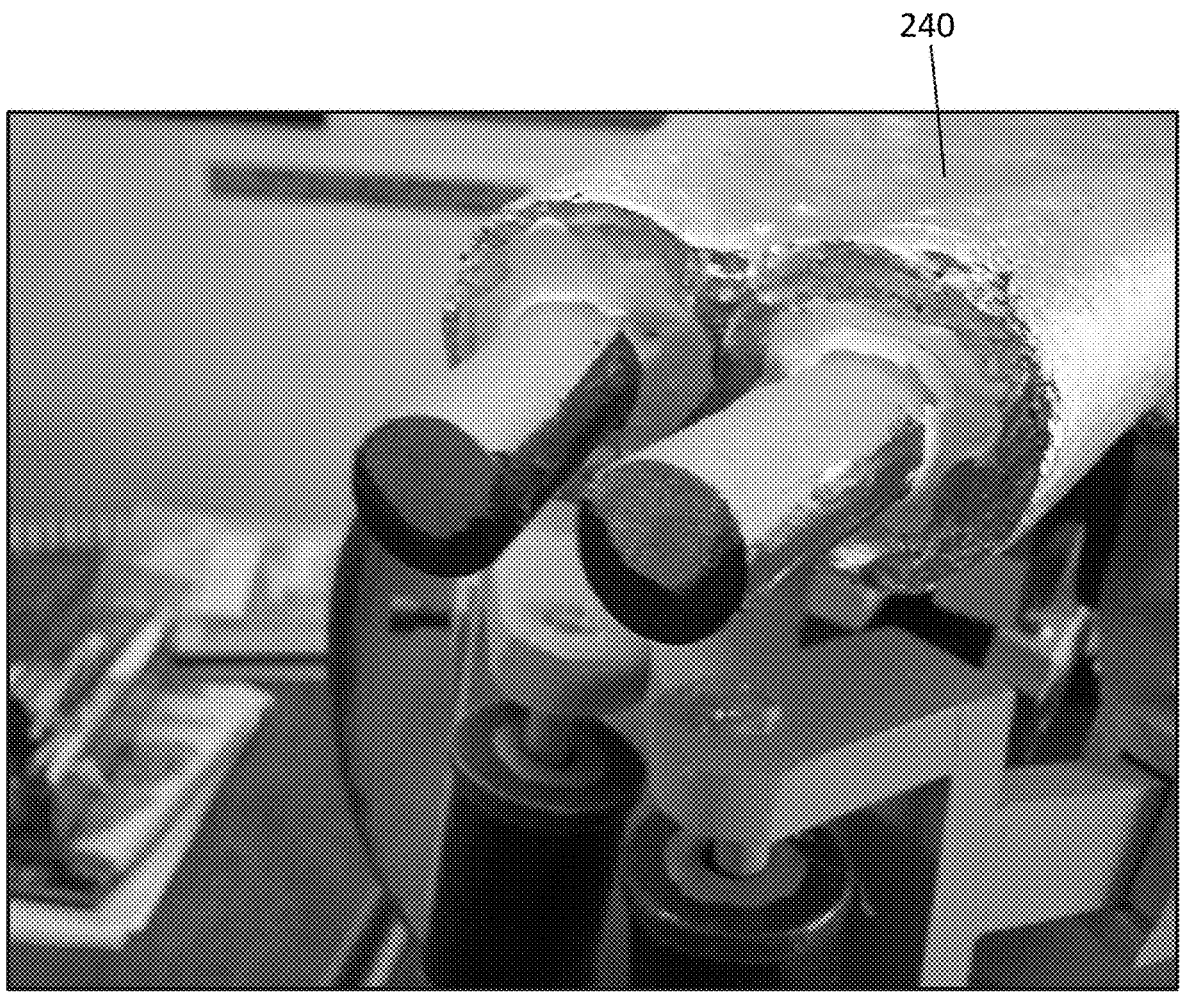
FIG. 14 illustrates another perspective view of the stabilizer shown in FIG. 13, according to aspects of the present disclosure.

In reference to FIGS. 13 and 14, a stabilizer 240 for the cable 200 is shown. The stabilizer 240 is used to fix the cable 200 at, for example, the first point 202 or the second point 204. The stabilizer may be electrically insulated and may enable separation of the first insulated wire 210 from the second insulated wire 220 while maintaining rigidity in the cable 200.

Figure 15:
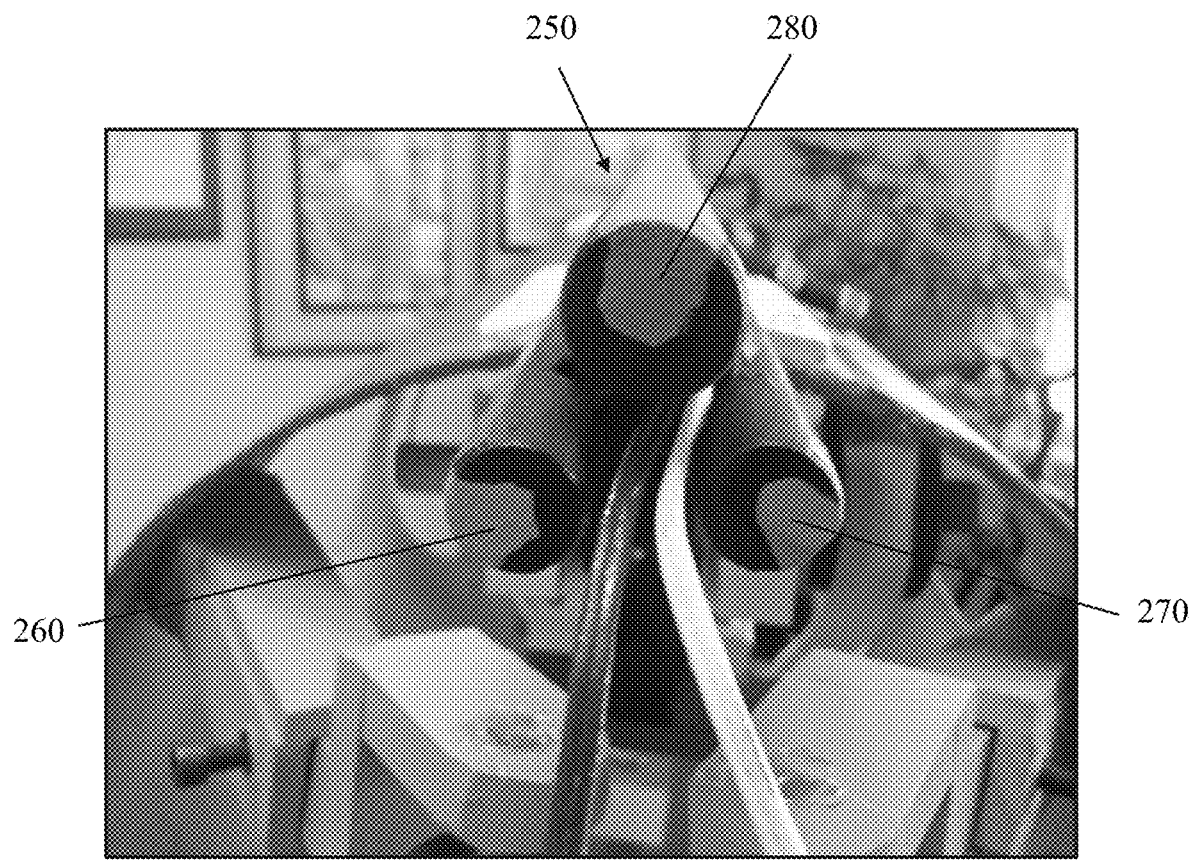
FIG. 15 illustrates a side view of an exemplary embodiment of a cable for supporting a carriage, according to aspects of the present disclosure.
Figure 16:
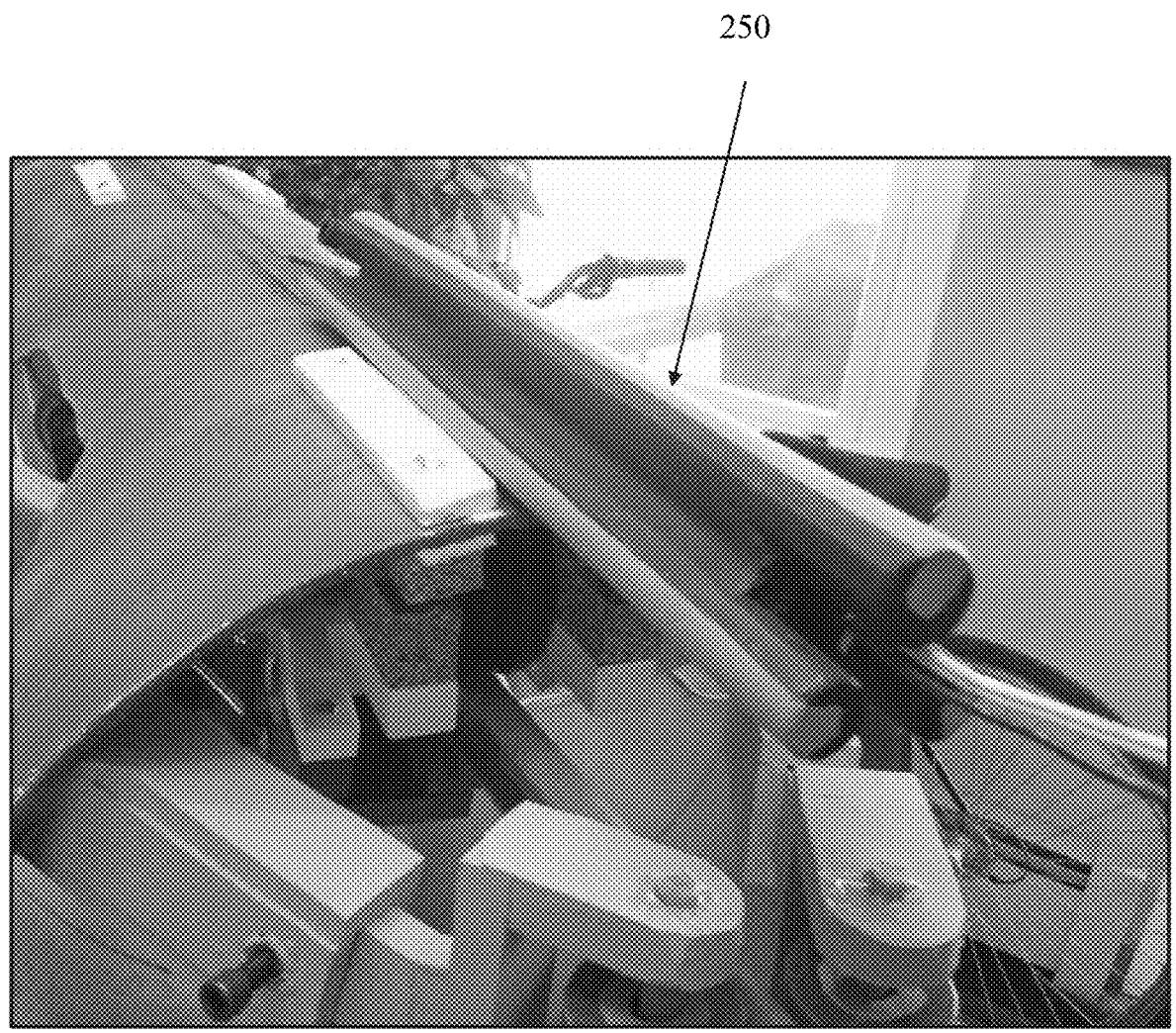
FIG. 16 illustrates a perspective view of the cable shown in FIG. 15, according to aspects of the present disclosure.
Figure 17:
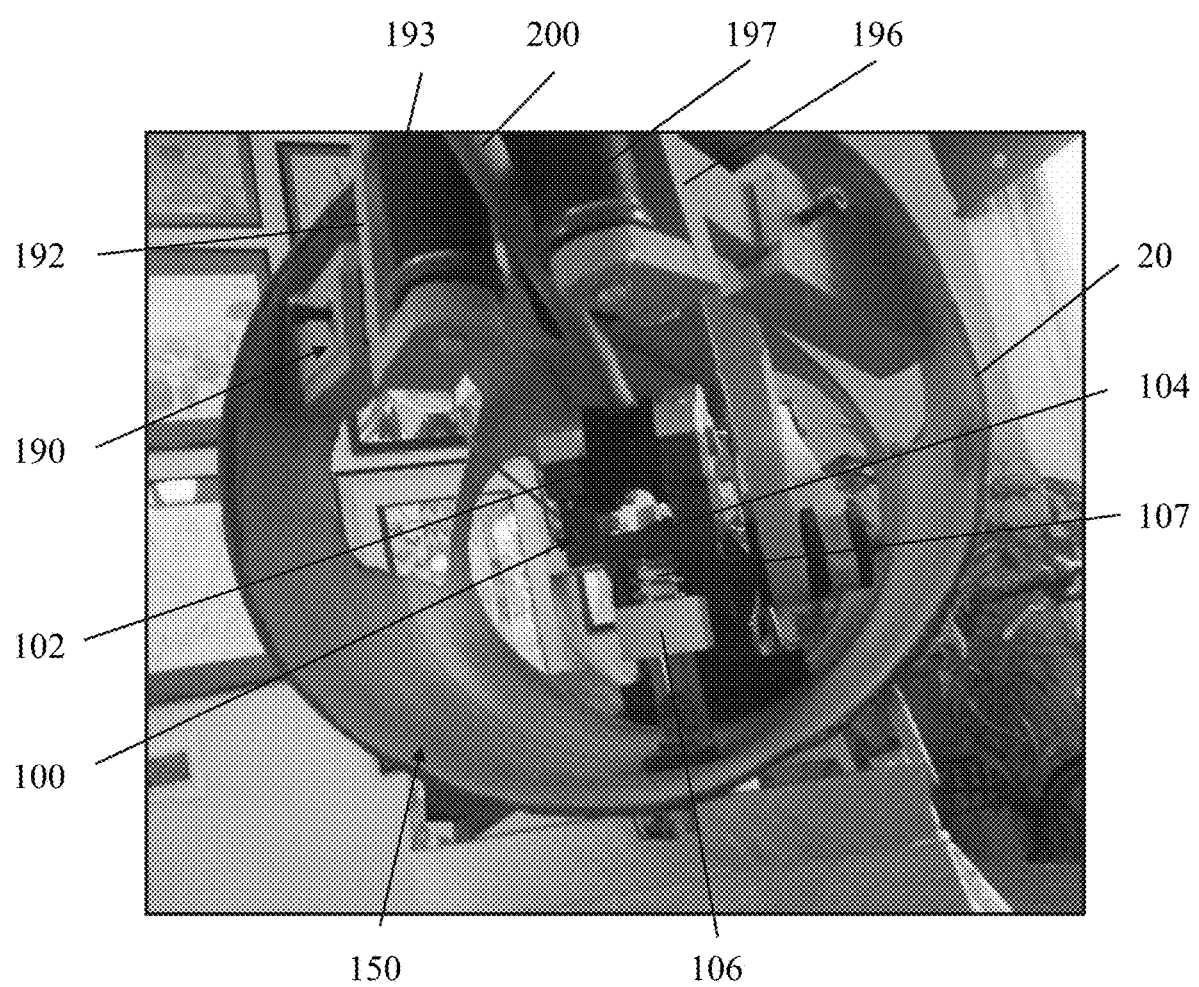
FIG. 17 illustrates another rear view of the carriage shown in FIG. 2, according to aspects of the present disclosure.

FIG. 15 illustrates a second embodiment of a cable, cable 250 according to aspects of the present disclosure. Cable 250 may be referred to as a three-phase cable. The cable 250 may be used for transporting larger loads compared to cable 200, for example, cable 250 may be used for moving 80,000-pound container cars, because it can provide sufficient energy to drive the necessary motors and support the increased weight. All three of the wires 260, 270, 280 of the cable 250 may carry current. The cable 250 comprises a first insulated wire 260 for providing a source of electric energy, a second insulated wire 270 for providing a second source of electrical energy, and a third insulated wire 280 for providing a third source of electric energy. Cable 250 can be similar to the first embodiment of the cable 200 in all other material aspects. As shown in FIG. 15, the wires 280, 260, 270 of cable 250, each have approximately one-third of their insulation stripped away to allow access to the electrical current; similar to cable 200. Similar to the cable 200, a heating cable may be embedded in the cable 250 to prevent ice formation on the cable 250. Additionally, one or more communication wires 230 may also be embedded in the cable 250 to allow communication with the carriage 10 (as will be discussed in further detail below), or to allow communication signals (e.g., fiber optic, coaxial, network, telephone, etc.) to be transmitted from one point to another along the cable 250. In some embodiments, the carriage 10 may have a computer on board and scanners (such as optical or laser scanners for tracking and scanning the cable 200 & 250. The carriage 10 may scan the cable, for example, to search for problems such as breaks, a "birdcage distortion" or protrusion of inner wire strands, or crushed or flattened rope on lower layers at crossover points in multi-layer coiling configurations, and schedule appropriate maintenance or repairs. Further, some embedded cables (such as communication wire 230) may send tones to assist the optics in scanning the cable 200 and 250. It should be understood to a person having ordinary skill in the art and being familiar with this disclosure that different sizes of wire may be used in cable 200, 250 depending on the weight load, electrical current requirements, or other factors. In embodiments, the wires (for example, the first and second insulated wires 210, 220) of a cable (for example, cable 200) have a diameter of about 0.1 inches to about 5 inches, or about 0.2 inches to about 2 inches, or about 0.3 inches to about 1 inch.

Figure 28A:
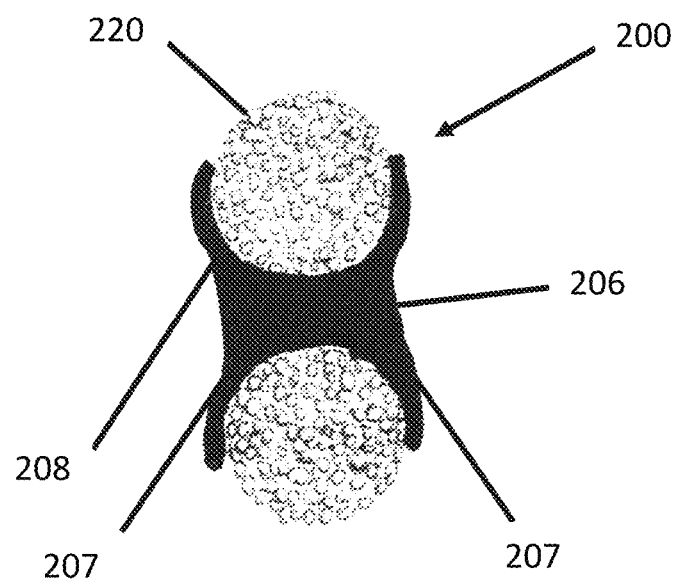
FIG. 28A illustrates a cross-sectional view of an exemplary embodiment of an electrified cable, according to aspects of the present disclosure.
Figure 28B:
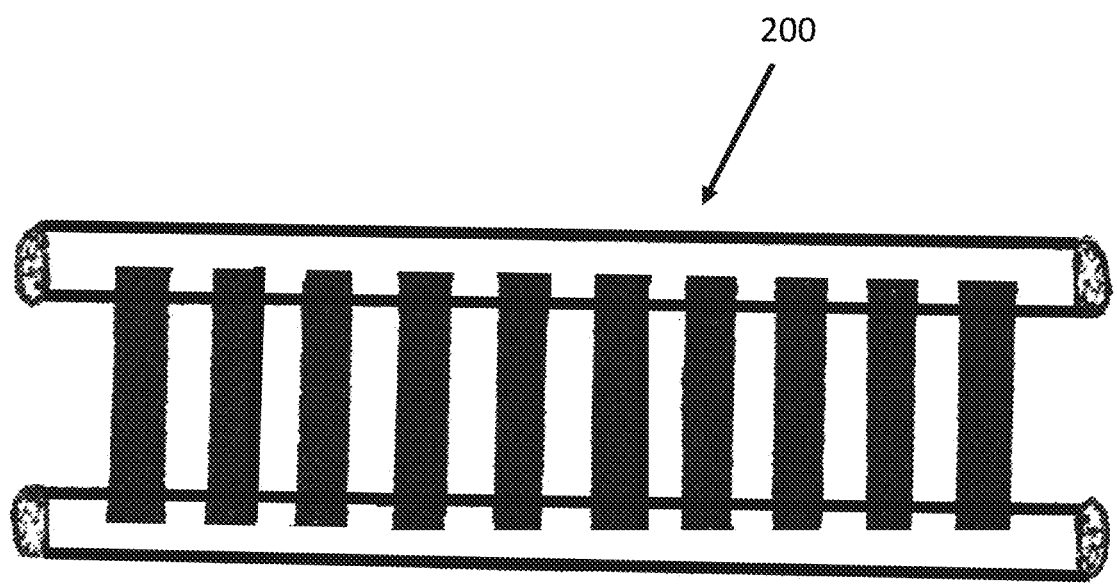
FIG. 28B illustrates a side view of the electrified cable shown in FIG. 28A, according to aspects of the present disclosure.
Figure 30:
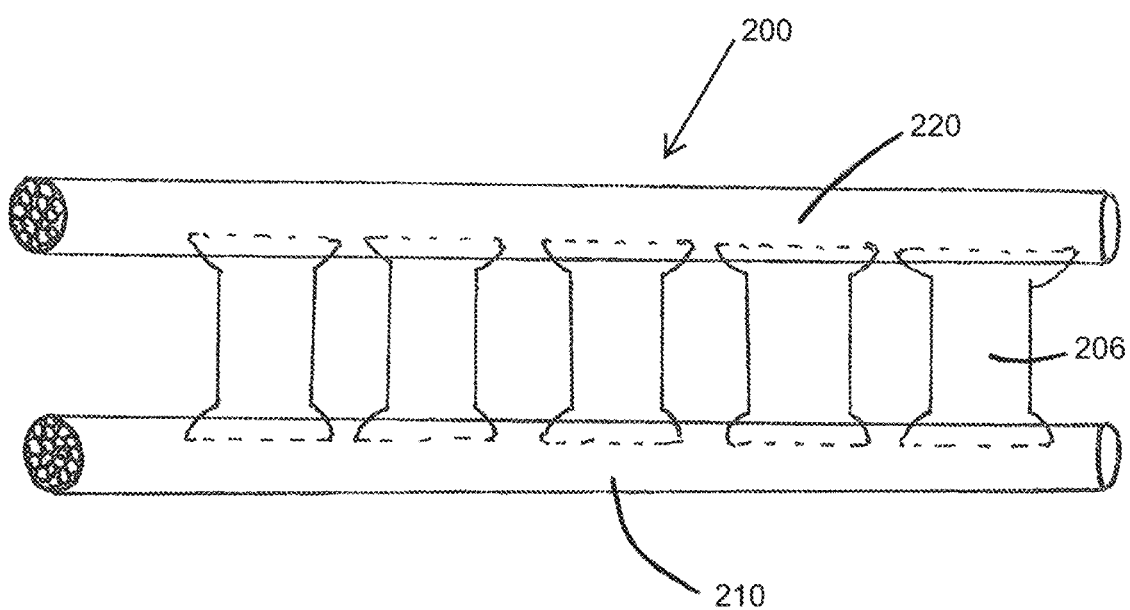
FIG. 30 illustrates a side view of an exemplary embodiment of an electrified cable, according to aspects of the present disclosure.

Referring to FIGS. 28A and 28B, in embodiments, the first and second insulated wires 210, 220 of, for example cable 200, may be coupled to one another with an insulating connector 206. The insulating connector 206 may extend and couple the first and second insulated wires 210, 220 substantially the length of the cable 200. In other embodiments, a plurality of insulated couplings (such as insulated coupling 206) may couple the first and second insulated wires 210, 220 at varying points along the length of the cable 200 (see, for example, FIG. 30). The uninsulated region of the first insulated wire 210 may be oriented substantially opposite the uninsulated region of the second insulated wire 220 by the insulating connector 206, or alternatively, the uninsulated regions of the first and second insulated wires 210, 220 may be oriented in any other direction as is operationally required. The insulating connector 206 may be plastic, rubber, or any other suitable electrically insulating material.

In some embodiments, the insulating connector 206 may further include at least one receiving ring 208 having a convex side, coupled to the insulating connector 206, and a concave side configured to receive at least a portion of the insulated region of a wire, for example, the first or second insulated wire 210, 220. The at least one receiving ring 208 may allow a wire to be quickly coupled to the insulating connector 206 during manufacturing or to be easily removed and/or inserted as a result of maintenance or repairs. The at least one receiving ring 208 may be plastic or any other suitable material sufficiently rigid to allow a wire to be "snapped" into and retained within the at least one receiving ring 208. The receiving ring 208 may extend substantially the length of the cable 200, 250. In other embodiments, a plurality of receiving rings 208 may couple wires, such as the first and second insulated wires 210, 220, to the insulating corrector 206 at varying points along the length of the cable 200.

In some embodiments, the cable 200, 250 may further include a plurality of outer connectors 207. An outer connector 207 of the plurality of outer connectors 207 may be positioned adjacent the insulating connector 206 and further couple the wires of the cable 200, 250 to one another, for example, an outer connector 207 positioned adjacent the insulating connector 206 may couple the first insulated wire 210 (or the retaining ring 208 retaining the first insulated wire 210) to the second insulated wire 220 (or the retaining ring 206 retaining the second insulated wire 220). Additional outer connectors 207 may be used, for example, a cable (such as cable 200, 250) may include two outer connectors 207 with one outer connector 207 located on each side (as shown in FIG. 28). The plurality of outer connectors 207 may further function to cover exposed metal of, for example, the at least one retaining ring 208. One or more of the plurality of outer connectors 207 may extend substantially the length of the cable 200, 250. In other embodiments, one or more of the plurality of outer connectors 207 may be non-continuous along the length of the cable 200, 250. The plurality of outer connectors 207 may be plastic, rubber, or any other suitable electrically insulating material. In still other embodiments, two or more of: the insulating connector 206, one or more of the plurality of outer connectors 207, and one or more of the at least one receiving ring 208 may be unitary. In some cases, the insulating connector 206, the outer connectors 207 and the receiving rings 208 comprises are unitary, i.e. are formed as a one-piece component.

Figure 23A:
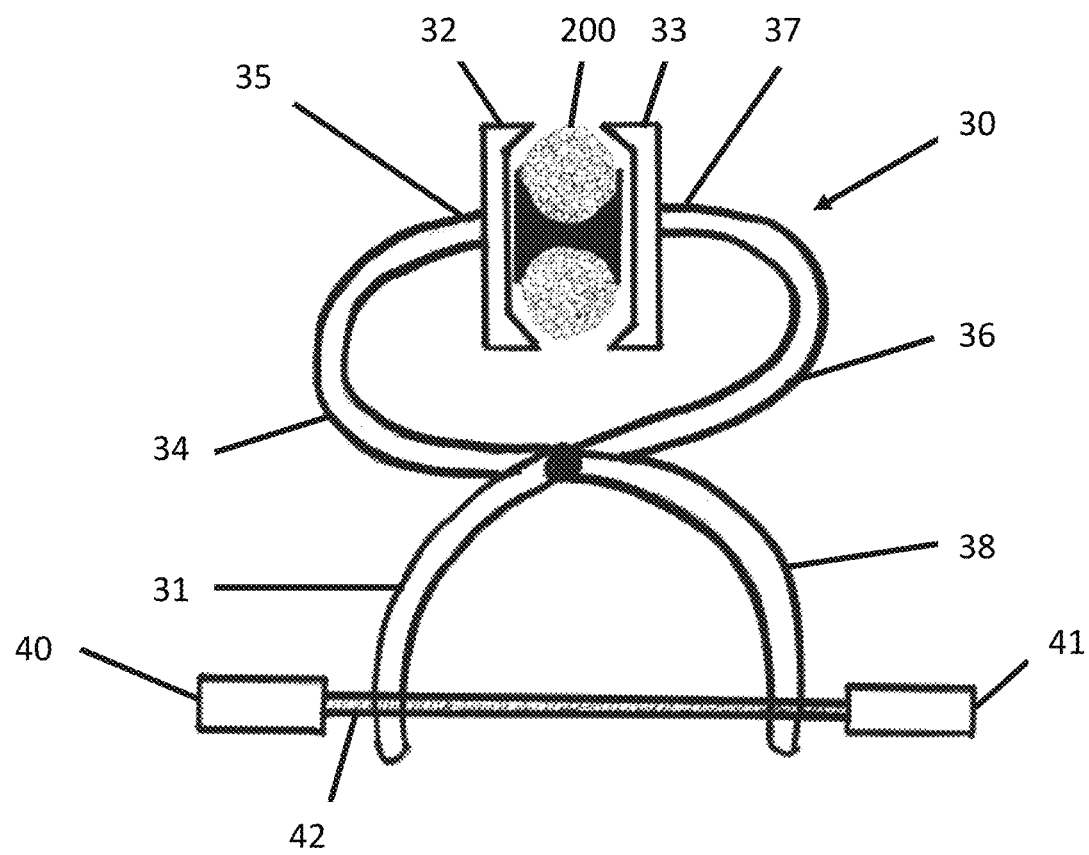
FIG. 23A illustrates a side view of an exemplary braking system of a carriage, according to aspects of the present disclosure.
Figure 23B:
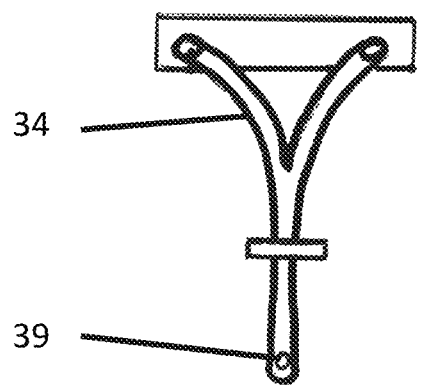
FIG. 23B illustrates one of the composite arms of the braking system with a threaded aperture.
Figure 24:
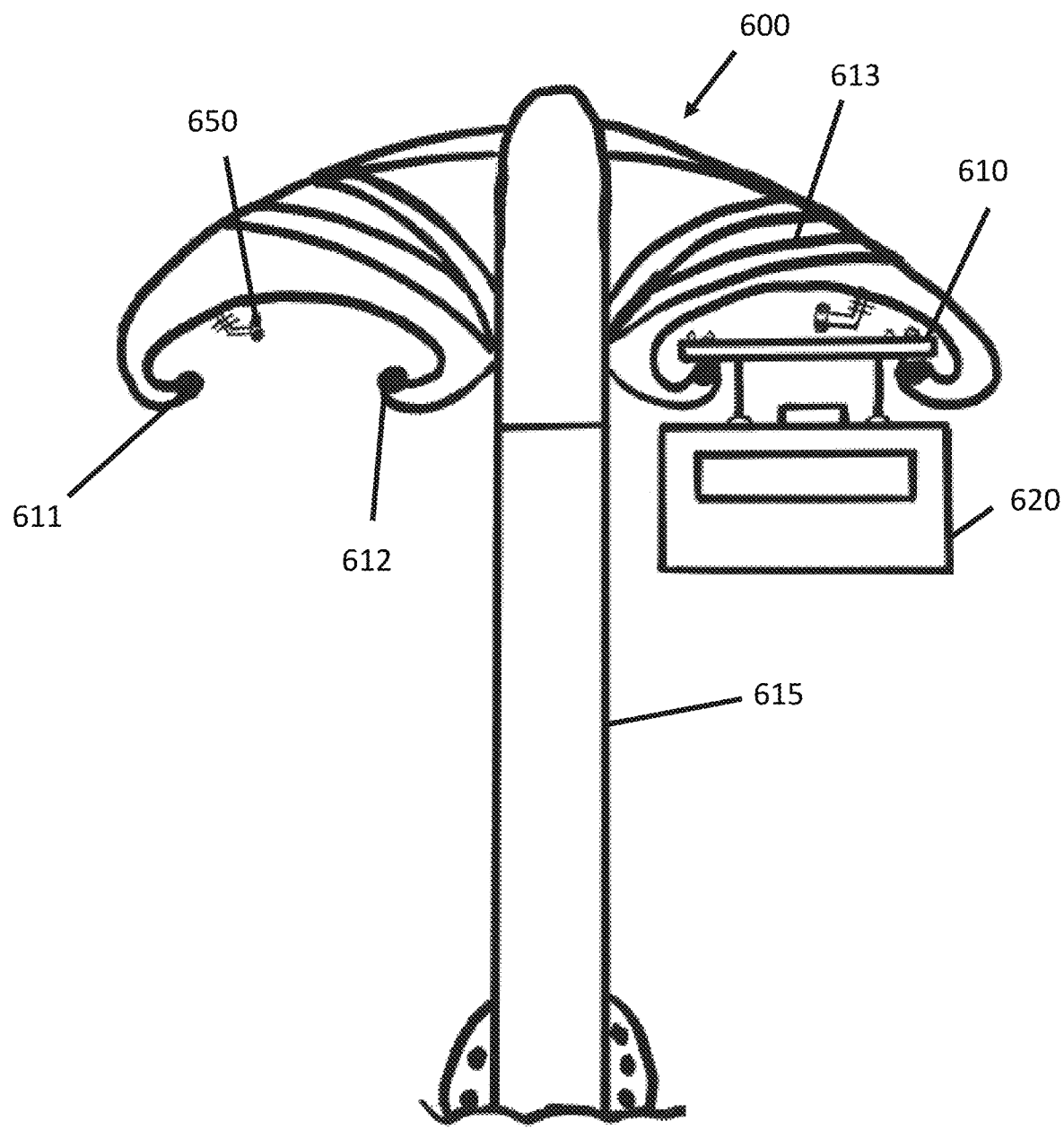
FIG. 24 illustrates a perspective view of an exemplary embodiment of an electrified-cable system, according to aspects of the present disclosure.
Figure 25:
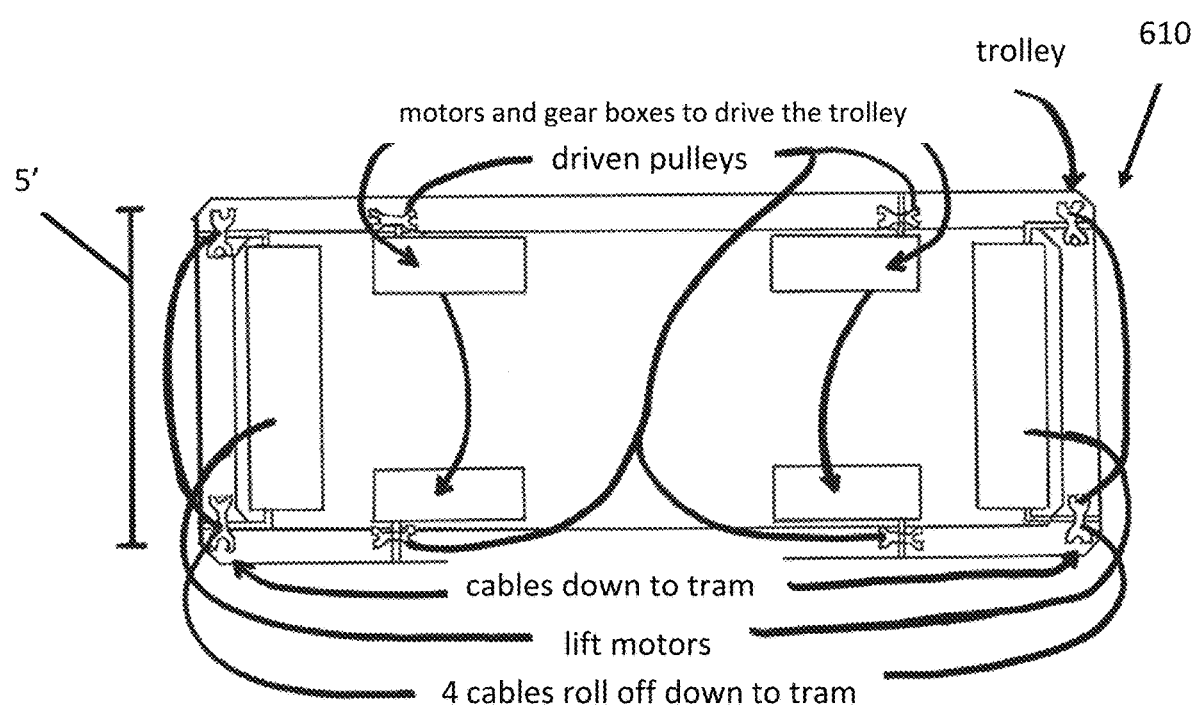
FIG. 25 illustrates a top view of an exemplary embodiment of a carriage, according to aspects of the present disclosure.
Figure 26:
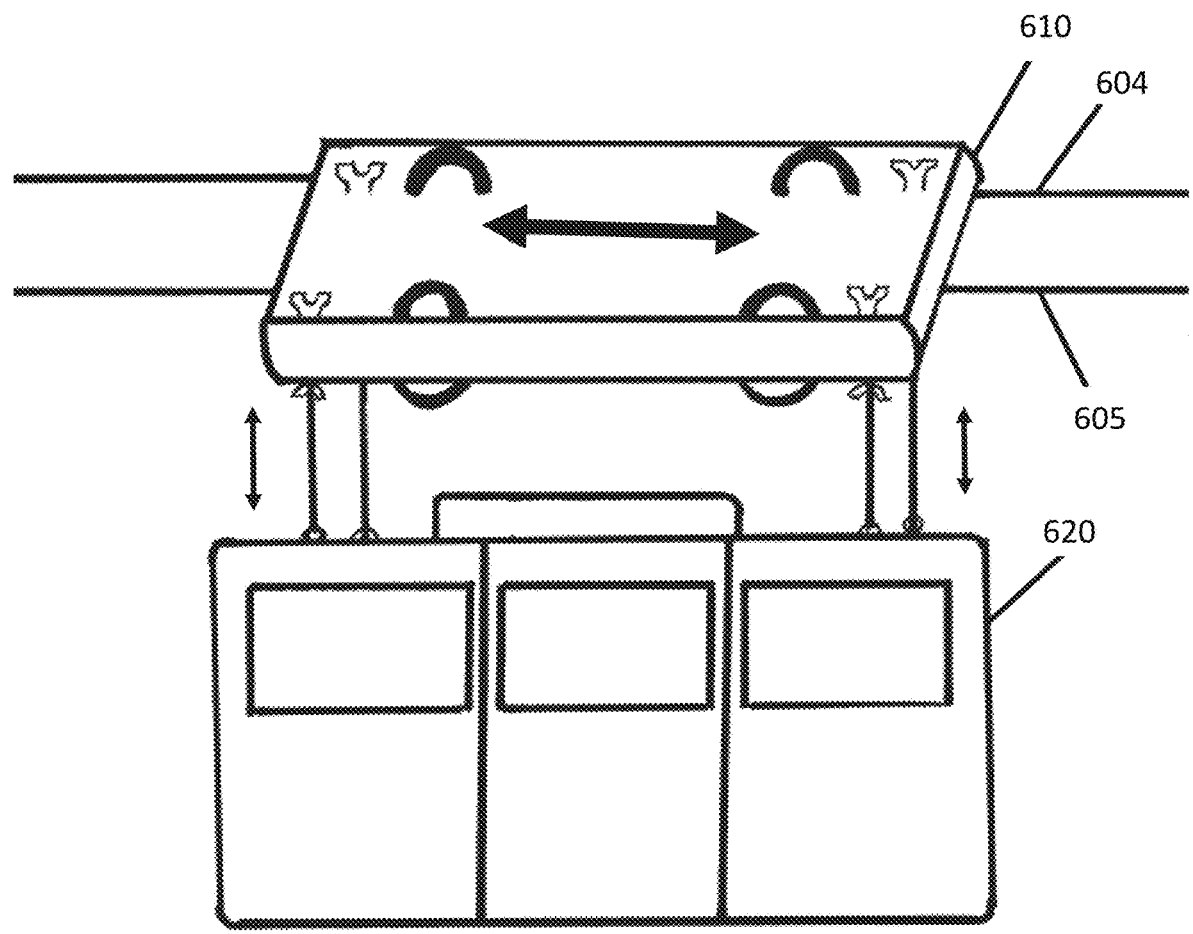
FIG. 26 illustrates a side view of an exemplary embodiment of a carriage, according to aspects of the present disclosure.

As illustrated in FIGS. 23A, 23B, in some embodiments, the carriage 10 may further comprise a braking system 30. The braking system 30 may be configured to slow or stop motion of the carriage 10 along the cable 200, 250 by applying frictional force to the cable 200 (alternatively cable 250). The braking system 30 may comprise one or more pairs of first and second first and second composite arms 34, 36. The first and second composite arms 34, 36 may be substantially similar to one another in size and shape. The first and second composite arms 34, 36 include first ends 34E1, 36E1 and second ends 34E2, 36E2. Each first end 34E1, 36E1 includes a braking pad 32 configured to mate with the cable 200 when braking force is required. The braking pad 32 may be rubber or any other suitable material for producing sufficient braking force when applied to the cable 200, 250. Each second end 34E2, 36E2 includes a threaded aperture 34A, 36A (threaded aperture 36A not shown). Each threaded aperture 34A, 36A is configured to mate with a threaded rod 42 having multi-directional threading. For example, the portion of the threaded rod 42 in communication with threaded aperture 34A may have right-handed thread while the portion of the threaded rod 42 in communication with threaded aperture 36A may have left-handed thread. Thus, as the threaded rod 42 is rotated (as will be discussed), the opposingly faced braking pads 32 of the first and second composite arms 34, 36 will move in opposing directions (as can be seen in FIG. 23A), thus applying or releasing braking force to/from the cable 200. The threaded rod 42 may be rotated by one or more motors 40. In other embodiments, for example, an individual threaded rod with right-handed thread may be rotated by a motor 40 and in communication with a threaded aperture (such as threaded aperture 34A) of composite arm 34, while another individual threaded rod with left-handed thread may be rotated by another motor 40 and in communication with a threaded aperture (such as threaded aperture 36A) of composite arm 36.

The carriage 10 and cable 200, 250 in accordance with aspects of the present disclosure can be used to provide transport and support in a number of different of applications. The examples provided below are intended to illustrate just some of the benefits and applications of the embodiments described herein.

In one example, the carriage 10 and cable 200, 250 may be used in a warehouse to transport goods. In this example, a remote-controlled device can control the carriage. Specific software designed for this warehouse will allow a remote-controlled device to operate the carriage in a very specific way using radio signals. In this embodiment, a small module is mounted on the motor so the computer can issue commands to the motor. In this embodiment, warning lights may be included at each end and along the able to warn people that the carriage is being used.

In another embodiment, the carriage 10 and cable (such as cable 200, 250) may be configured as a high-speed ride, for example at an amusement park. In such an embodiment, the computer may have pre-set commands and follow pre-set ride instructions.

In other embodiments, the carriage 10 and cable 200, 250 may be used for military applications, or in sports arenas to control the location of a camera relative to a playing field. A computer with specific software may control a plurality of carriage 10 and cable 200, 250 systems, thereby allowing a user to move that camera using just visible observations. In some embodiments of the present disclosure, the carriage 10 may include one or more weapons (see FIG. 29, for example).

To illustrate one example of transportation using a carriage (such as carriage 10), assume a Chicago company purchases a freight-load of beef and hamburger products from a processing plant in Texas. A carriage picks up a freight car and is sent, by automation, to a Chicago distribution center just outside Chicago. This giant football size freezer was designed and built for an automated carriage. The only drivers on forklifts are the ones who load and un-load the freight cars. They do not go into the freezer at all. All hamburger pads are moved out and placed at the entrance door of the freezer. Carriages take over and re-locate all the pads of hamburger patties. Using a smart grid on the ceiling carriages tracks all inventory (quantities, location, high usage and low usage products and retrieval methods all automated no more people in the freezer any more). The two tons of patties have been set aside. Carriages may be pre-programmed to follow a specific plan. The freight car will be loaded in a specific order along with the patties by the fork lift operator. A tractor will move the freight car back to the loading zone where a carriage will pick it up and deliver to a drop zone on the outskirts of Cleveland. A local business man who has contracts with this chain of stores is waiting to hook up to the freight car because he knows the exact time it arrives. He will make the rounds to six different stores delivering the meat products; three of those stores get the hamburger patties assuming these stores are in a commercial district in downtown Cleveland. Door to door delivery will happen when the warehouses are located outside a large city or in rural areas.

Figure 22:
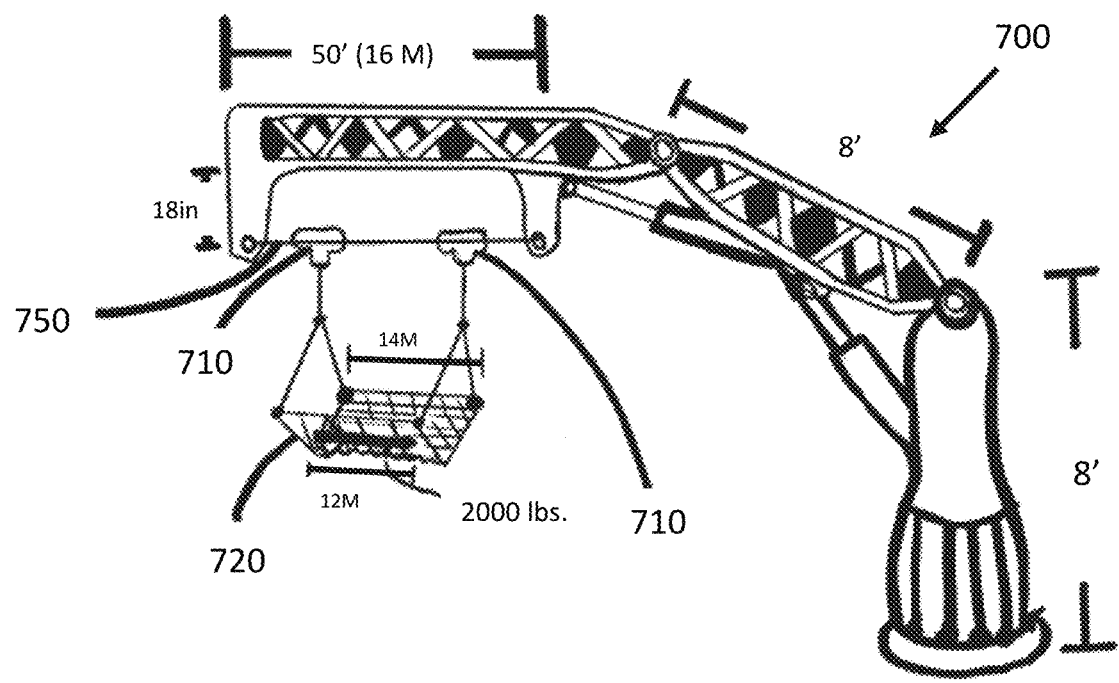
FIG. 22 illustrates a perspective view of an exemplary embodiment of an electrified-cable system, according to aspects of the present disclosure.

As illustrated in FIG. 22, in embodiments an electrified cable 750 may be suspended from an adjustable cable suspension system 700. The cable suspension system 700 may be adjusted by hydraulics or other suitable means to change the position of the cable 750 in any of six degrees of freedom (i.e., the cable 750 position is moved up or down, left or right, forward or backward, swiveled left or right, tilted forward or backward, or pivoted side to side). A carriage 710 or multiple carriages 710 may transit the cable 750, similarly to the carriage 10 and cable 200, 250 discussed above. One or more carriages 710 may carry a platform 720 configured to retrieve underwater systems. This embodiment is particularly useful, for example, as a crane on a ship to retrieve autonomous underwater vehicles or personnel who have fallen overboard.

In embodiments, the system can be configured to replace freight haulers and/or local delivery vehicles. In embodiments, existing electrical towers that carry transmission lines with support towers can be replaced/upgraded. The towers are configured to carry the weight of tractor trailer trucks. In a non-limiting example, on the replacement towers there can be two three-inch cables, one on each side of the tower, forty feet off of the ground, to allow freight to move through the air on them. Above the three-inch cables the transmission lines can be positioned, and above the transmission lines the cellular and wireless companies can install equipment.

In embodiments, drivers are not required as the system is fully automated. A second system can be built on the same right of way, and the carriages can be configured to carry two cars below, as well as passengers on the second story of a rapid transit car. Any drivers (if used) and their passengers can ride on the second floor with the other non-drivers. As the vehicles load, the non-drivers also can load.

In embodiments, the system is incorporated into electric forklifts in warehouses, or can be used to replace forklifts. In other cases, the system is used to move people in public areas, such as national parks, or incorporated into amusement park rides. In some cases, the system can be used to pick up individuals who are unable to walk and put them into swimming pools.

Figure 31:
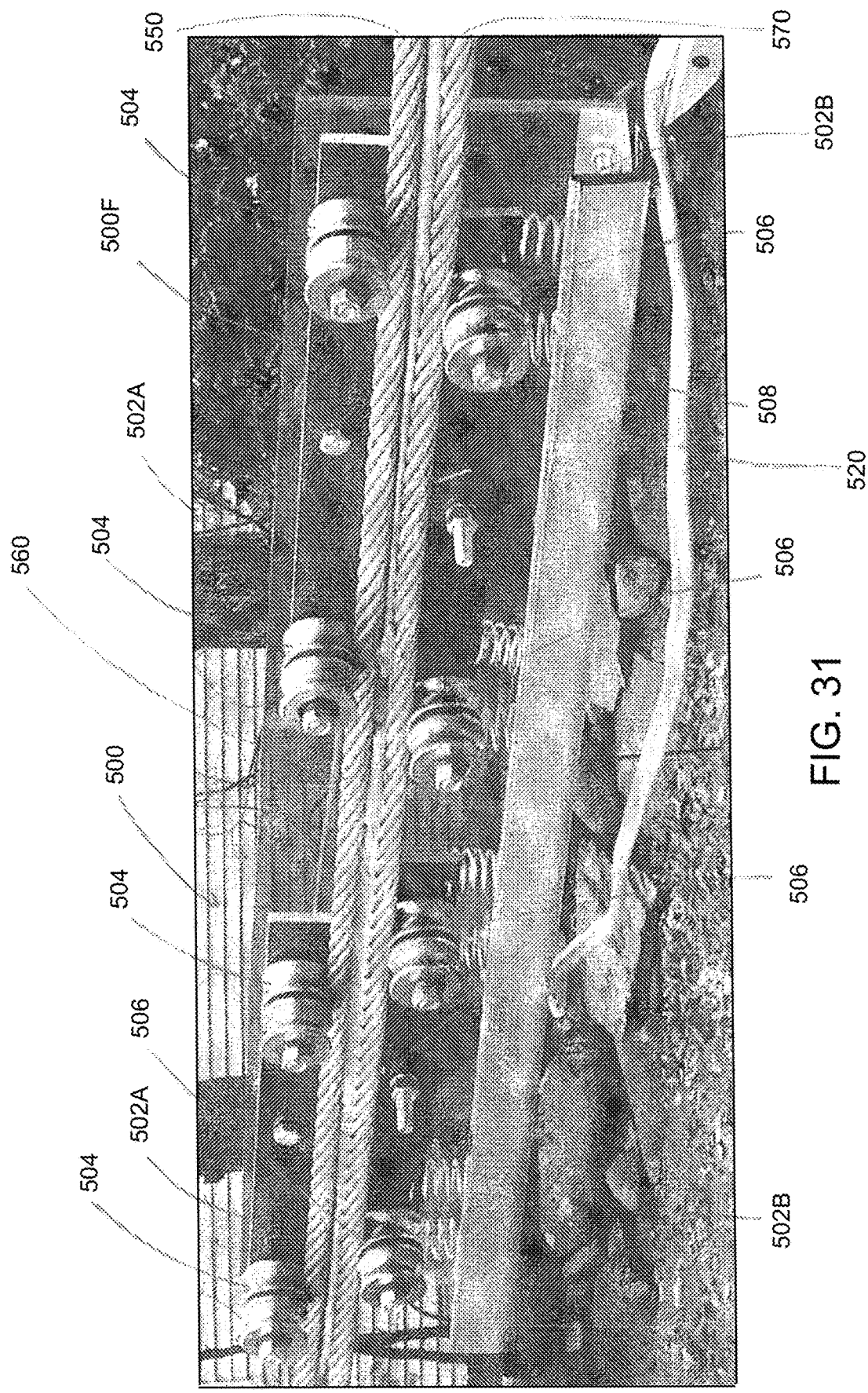
FIG. 31 illustrates a perspective view of an exemplary embodiment of a transconnector, according to aspects of the present disclosure.
Figure 32:
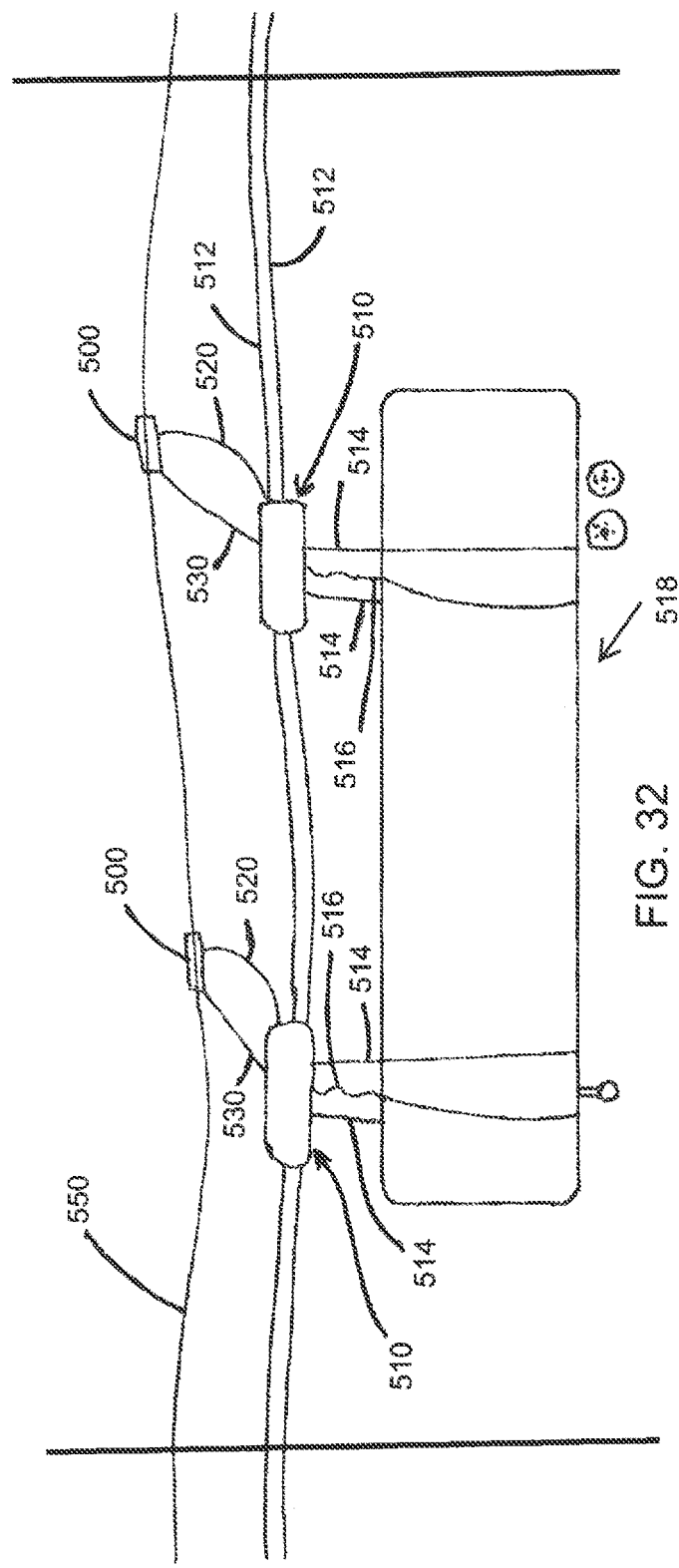
FIG. 32 illustrates a perspective view of an exemplary electrified-cable system, according to aspects of the present disclosure.

As illustrated in FIGS. 31, 32, in some embodiments, a transconnector 500 (i.e., a "power take off") may be used to provide electrical current to the motor of a carriage. The transconnector 500 may be used when moving heavy loads, for example, cargo or groups of people. In some embodiments, a carriage may transit two or more cables (i.e., static cables) for stability (e.g., to prevent the carriage from swaying side to side).

For example, a carriage 510 may transit one or more static cables 512. The static cables 512 are load bearing and are not electrified. An electrified cable 550, (which may be similar to cables 200, 250) is independent of and runs substantially parallel to the one or more static cables 512. The transconnector 500 transits the cable 550 and is tethered to a respective carriage 510 by, for example, tether 530. Various configuration can be used to support the transconnector on the cable. In embodiments, the cable 550 (or, for example, 200, 250) is supported at each elevated fixed point in a manner similar to the support of a gondola attached to a haul rope, for example, at a ski resort. The transconnector 500 provides electrical current from the cable 550 to the one or more motors of the carriage 510, thus allowing the carriage 510 to transit the one or more static cables 512. The carriage 510, in turn, pulls or pushes the transconnector 500 along the cable 550 as the carriage 510 transits the one or more static cables 512.

In the embodiment shown in FIGS. 31-32, the transconnector 500 comprises one or more pairs of bars mounted to the transconnector 500 frame 500F, wherein a pair of bars further comprises a first bar 502A and a second bar 502B. In an embodiment, the first bar 502A comprises one or more first pulley wheels 504 in communication with one of the insulated wires of the cable 550, for example, the first insulated wire 560. The second bar 502B comprises one or more second pulley wheels 506 in communication with another one of the insulated wires of the cable 550, for example, the second insulated wire 570. In this example, springs 508 mounted between the transconnector 500 frame 500F and the second bar 502B ensure that the one or more second pulley wheels 506 remain in communication with the second insulated wire 570. The frame 500F may be made from a nonconductive material in order to ensure that the first bar 502A and the second bar 502B are electrically insulated from one another. The first bar 502A and second bar 502B may also be insulated from one another through any other suitable method.

The transconnector 500 provides electrical current to the motor of the carriage 510 by creating an electrical circuit between, for example, the first insulated wire 560 the motor of the carriage 510 and the second insulated wire 570. More specifically, the first pulley wheels 504 are in electrical communication with the first insulated wire 560. Electrical current is conducted to the motor of the carriage 510 via the first bar 502A and an insulated wire 520. The electrical circuit is completed as current flows from the motor of the carriage 510 to the second insulated wire 570 via the insulated wire 520, second bar 502B and second pulley wheels 506 which are in electrical communication with the second insulated wire 570. It is noted that the first and second bars 502A, 502B can be arranged in any suitable configuration. For example, the first pulley wheels 504 of the first bar 502A can be in communication with either of the first or second insulated wires 560, 570 of cable 550 and the second pulley wheels 506 of the second bar 502B can be in communication with the other of the first or second insulated wires 560, 570 of cable 550. Additionally, a third bar and associated pulley wheels can be used with a three-phase cable (similar to cable 250.

Figure 27:
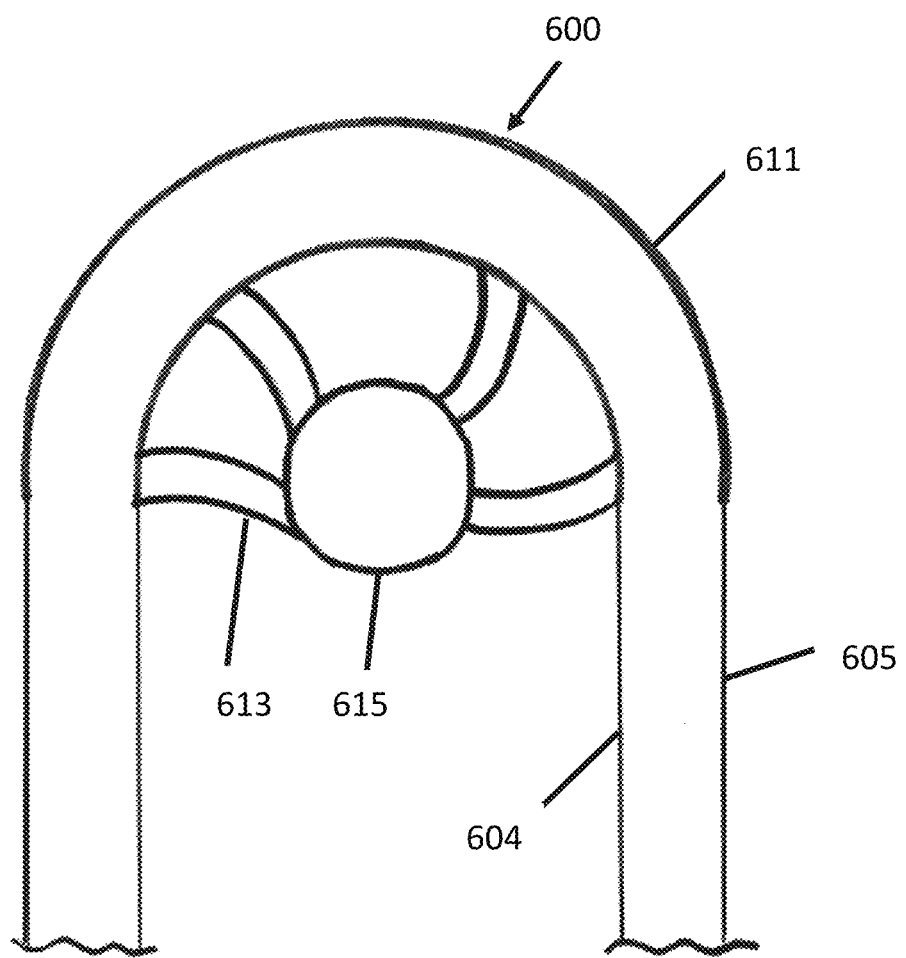
FIG. 27 illustrates an overhead view of an exemplary embodiment of an electrified-cable system, according to aspects of the present disclosure.

In another embodiment, for example FIGS. 24-27, the system is used as an urban transportation system 600 for commuters, residents and tourists. The system uses an aerial cable system that allows self-propelled, electrically powered vehicles to run on a pair of static cables 604 elevated over existing landscapes. Carriages (also known as "trolleys") 610 incorporate an ultra-light infrastructure and follow city streets, quickly and quietly moving people to the destinations. In one configuration, transportation stations are located at ground level to facilitate access by all individuals. Each carriage 610 may carry a tram 620 configured to carry passengers. The carriage 610 follows the route of the electrified cable 650 and can turn, as well as climb or descend, as the cable and infrastructure follow the contours of the landscape. In the embodiment of FIG. 27, rails 611 function to provide a turning interface for a path of carriage 610 transit. In the exemplary embodiment shown in FIG. 27, the carriage 610 transitions from the pair of static cables 604 to the rails 611, completes a turn, and then transitions from the rails 611 to another pair of static cables 604. This exemplary embodiment illustrates a "U-turn" (i.e., a 180-degree turn), however, rails 611 may be configured for turns of greater or lesser angles. The rails 611 may also be configured for a plurality of turns as required to properly direct a carriage 610, for example, an "s" shape may be used. Rails 611 comprising a plurality of angles may be necessary, for example, to guide a carriage 610 through a tunnel. The rails 611 may also be configured for carriage 610 transit to higher or lower elevations. Supports 613 function to secure the rails 611 to a tower 615. Depending on the operational characteristics (e.g., weight) of a particular carriage system, additional towers 615 may be necessary to provide support for the rails 611. The rails 611 and supports 613 may be steel, or any other suitable material. In some embodiments, the rails 611 may be coupled to cables, such as cable 650, instead of static cables 604. In these embodiments, the supports 613 may be electrically insulated from the tower 615.

Figure 29:
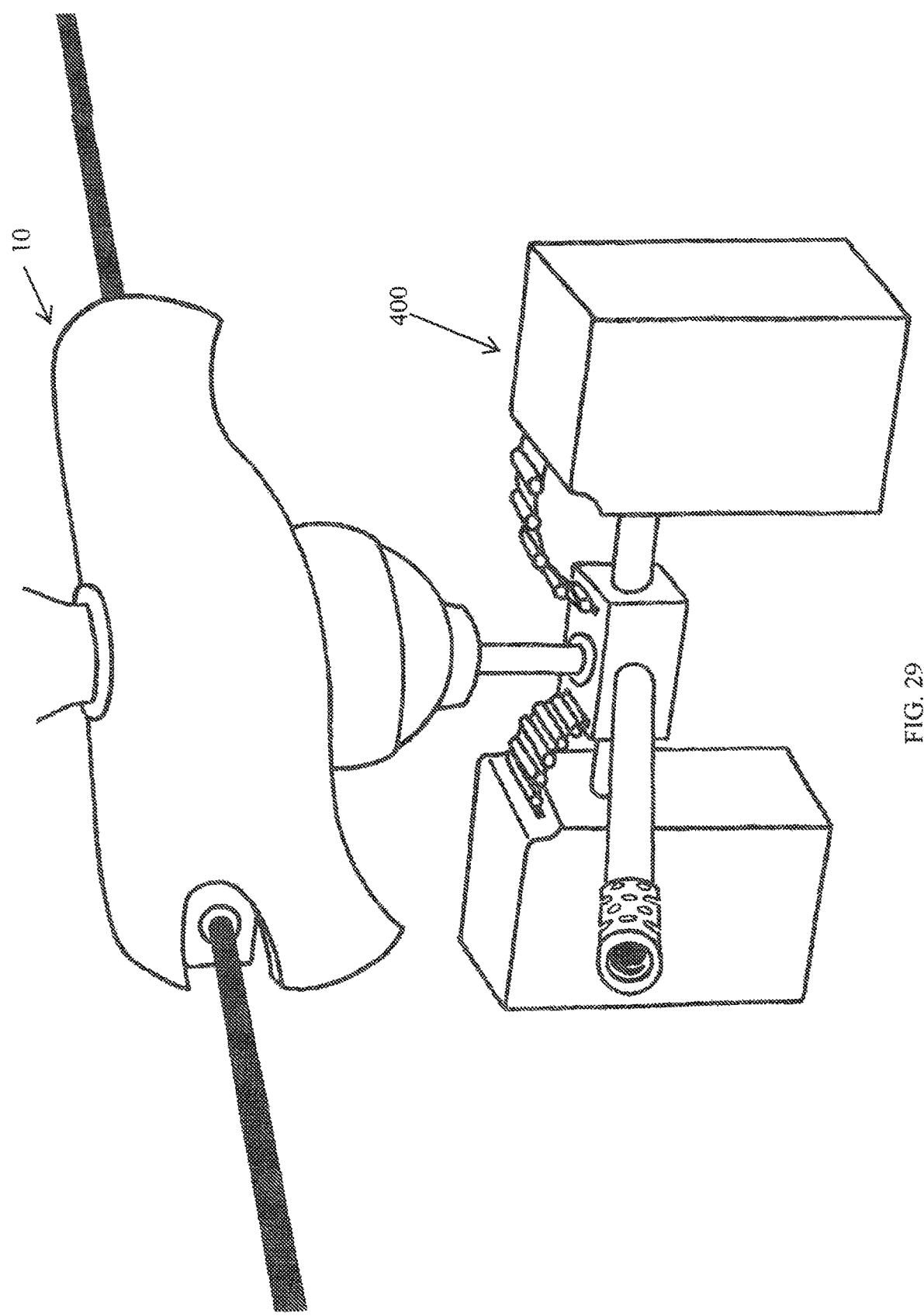
FIG. 29 illustrates a perspective view of an exemplary embodiment of a carriage including a weapon system, according to aspects of the present disclosure.

As illustrated by FIG. 29, in other embodiments, the system is configured to acknowledge, detect, identify, locate, track and disable an enemy or non-friendly small unmanned aerial system (SUAS). A carriage (such as carriage 10) is configured to carry a weapon system 400 and can be located along the border of a country or any other location to secure a perimeter. In embodiments, the weapon system is controlled locally, or from a remote location.

FIGS. 33-58 illustrate a system in which a "carriage" designates a container for an electrical drive system, and a "cabin" designates a container for goods or passengers that can be connected to but separate from the carriage that contains the electrical drive system in order to permit vertical movement of the cabin relative to the carriage. In some cases, the carriage is connected to the cabin and the cabin does not move vertically relative to the carriage.

The transport system may also be described as a mobile elevator system used for public transportation in conveying people in an urban environment. The transport system has motors that are electrically powered and run along a pair of static cables overhead. The transport system also has a built-in elevator system that has a cabin attached. This cabin can be raised and lowered like any elevator and this gives the system a great advantage as it allows for stops anywhere along the cable route and eliminates the need for large terminals. The transport system can turn in the air at the poles, travel long distances, travel in any cold or hot environments, change from an East to West direction to a North to South direction and any direction in between.

The poles or pylons that are erected can have an express lane on one side of the pylon while the other side of the pylon is a local lane. The transport system is an all-electric system and can receive its power from a single cable overhead that completes a circuit. The electrical energy transport device is known as a transconnector and is described in U.S. Pat. No. 10,347,401 B2 which is incorporated in its entirety here by reference, receives electricity from an electrified cabling system, somewhat like the third rail system for a subway car, but here the transconnector is movable with the cabin. An electrical connection is made from the transconnector to the cabin, thus providing electrical power to the carriage or cabin. The transconnector is tethered to the cabin and is towed along by the cabin as it transits the static cable system that supports the cabin. Each cabin of the transport system has a power distribution panel on board. With this power, each cabin of the transport system can operate its engine and elevator systems. The transconnector also provides electrical power to the cabin that is attached to the static cable system. With electrical power provided to the cabin, electrically powered devices may be added such as climate controls, lights, audio, charging stations for phones and other electronic devices, video displays, Wi-Fi and other devices that require electrical power. While these enhancements are available in other forms of transport such as planes, trains, and automobiles, cabled transit systems such as are used at ski resorts and other public transportation venues do not have power available in the individual cabins or cars of the transit system.

The transport system may be constructed along current rights-of-way and transit methods such as roads and railroads. As the electrical power will be supplied from a large primary source and transmitted to the transport system, the carbon footprint of the transport system is reduced especially when compared to pollution admitting sources such as automobiles and buses.

Figure 33:
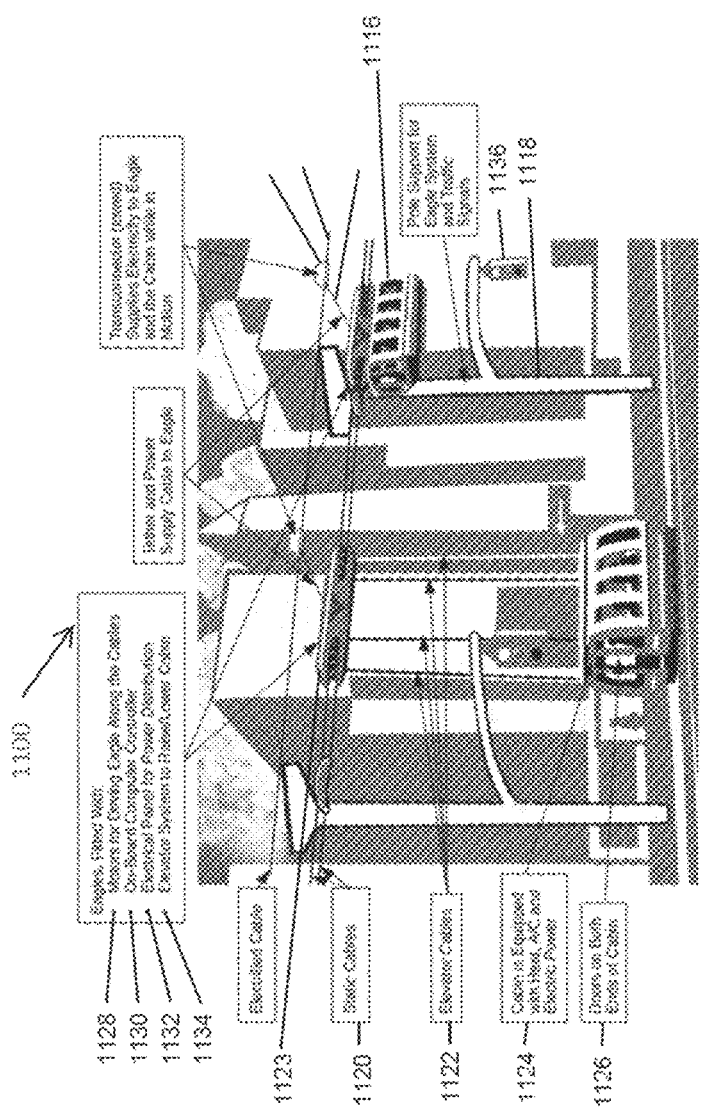
FIG. 33 illustrates a transport system with detail as to the cabling, transconnector and support structures, as well as the elevator capabilities, of the transit system.

FIG. 33 shows a new type of gondola transporting system that has electricity in the cabin while moving all the time, can be self-driving, has an elevator which raises and lowers the cabin, and has environmental controls for customer comfort and safety. Wi-Fi, charging stations and plugs can be included for use by customers. Cities are looking for mass transportation and are out of land and vast resources to build roads and bridges. This configuration allows it to be installed in an urban environment with minimal space required. No massive structures, can turn in the air, go long distances. This aerial transport system overlays existing city streets (does not require new land), and removes pollution and noise in the environment. In addition, it can reduce car traffic, people can walk to restaurants and all the cities activities can be displayed on an electronic screen inside the cabin. Everyone can ride this system. If the transport system is used, parking lots can move to the outside of the city.

The elevator system 1100, labelled "Eagle System" as is seen in FIG. 33, can be included as part of the transport system. The elevator system 1100 moves passengers without requiring the construction of raised platforms to allow passengers to enter and exit. The gondola cabin will go to ground level for passengers to enter and exit. This means that handicapped people will be able to enter and exit easily.

The elevator system 1100 in FIG. 33 includes an electrified cable 1110 that supports a transconnector 1112. A tether 1114 connects the transconnector 1112 to a cabin 1114. The transconnector 1112 supplies electricity to the transport system and a cabin 1116. A plurality of poles 1118 support the pair of static cables 1120 which in turn support a carriage 1123 (container for the electrical drive system) that is connected to, and positioned above, a cabin 1116. In order to move cabins 1114 up and down, a plurality of elevator cables 1122 can extend downwardly from the carriage 1123 and can then be retracted to lift the cabin 1114. Each cabin 1114 can be equipped with one or more of heat, air conditioning and electric power for electronic devices, etc., designated as 1124. Doors 1126 are included on both ends of the cabin 1114. This allows passengers to exit and enter safely.

In FIG. 33 the transport system is riding on a pair of static cables with a cabin attached between two poles in a downtown setting. The pylons or poles have traffic signal signs 1136 mounted below so as to regulate traffic flow in coordination with the transit of the transport system. The transport system's incorporated elevator components allow the transport system to overlay a city street and move passengers freely between the transport system and the city streets.

The transport system can be expanded by adding cabins to the transport system and adding new cables and pylons or poles to increase the system coverage area. The system can grow as a city grows. The transport system can be fitted with sensors so that the system knows where each carriage or cabin is located at any given time. These sensors include GPS, bar coding, and other identifying and geographically locating devices.

The transport system reduces accidents, and traffic congestion, and reduces a city's need for large financial resources to maintain roads and other transporting systems. The need for first responders (fire, police, ambulance hospitals) will be reduced.

In embodiments, a cabin can have an outer body with windows for passenger comfort.

Figure 34:
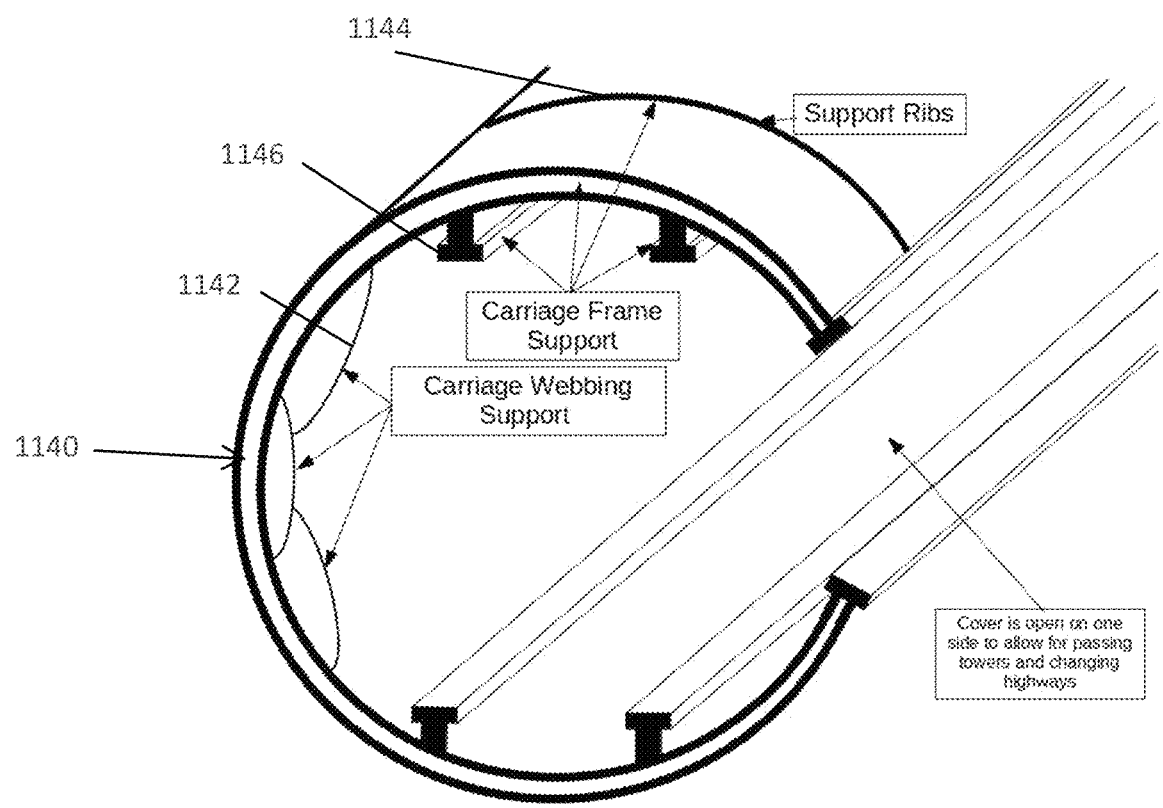
FIG. 34 illustrates a cutaway of the carriage chassis from an angled end view.

The illustration in FIG. 34 demonstrates that the chassis 1140 for the carriage is designed to be open on one side (cut-a-way). This configuration is designed to allow transport system to pass the towers. This configuration also allows the transport system to change from one highway to another. The edging is re-enforced to add structural integrity. The size of the cut-a-way in FIG. 34 with its edging is dependent on the load that transport system is carrying. A different carriage can be built for different applications. The carriage webbing support 1142, support ribs 1144, and carriage frame supports 1146 will change as the load the transport system is carrying increases or decreases.

Figure 35:
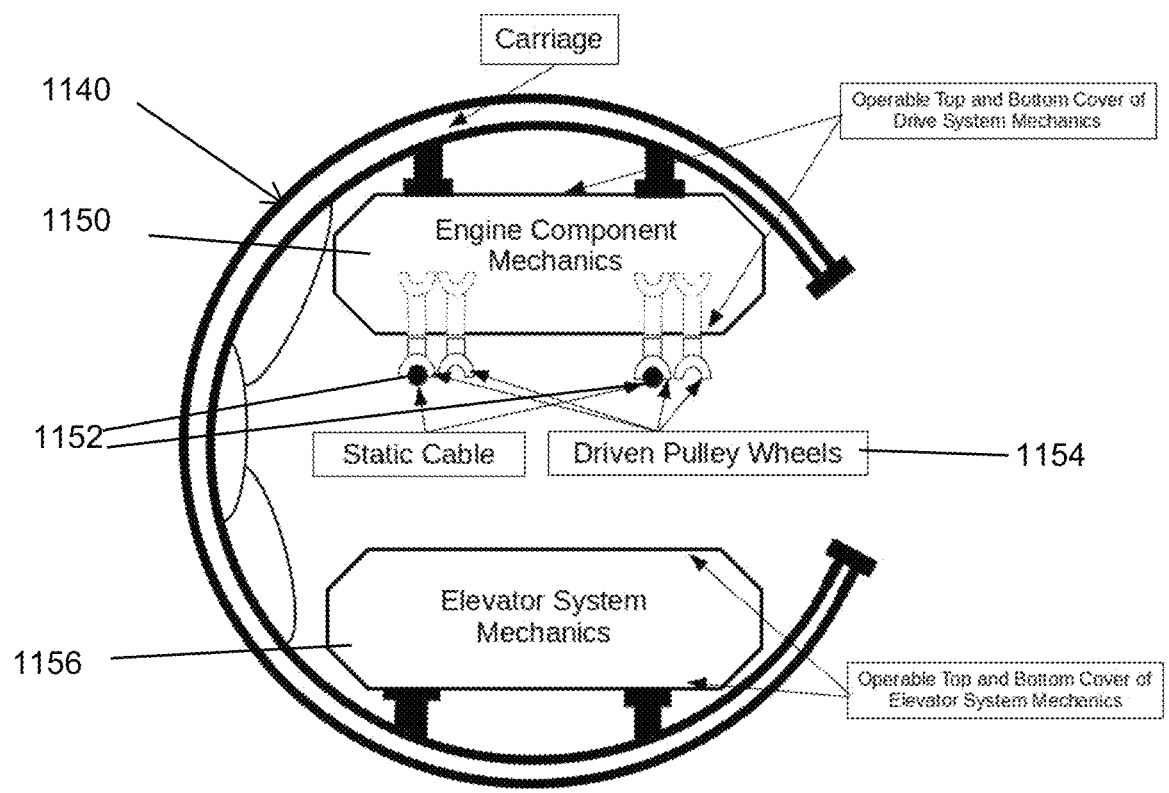
FIG. 35 illustrates a cutaway end view of the carriage chassis of the transport system.

FIG. 35 shows an end view of the carriage 1140. Inside the upper component is the driving system 1150. Also shown are the static cable 1152 and the driven pulley wheels 1154. The driving system 1150 moves the carriage 1140 along the rails (aerial highway). In the bottom section is the elevator machine, depicted as "elevator system mechanics 1156." It lifts the cabin or whatever the carriage is hauling.

Figure 36:
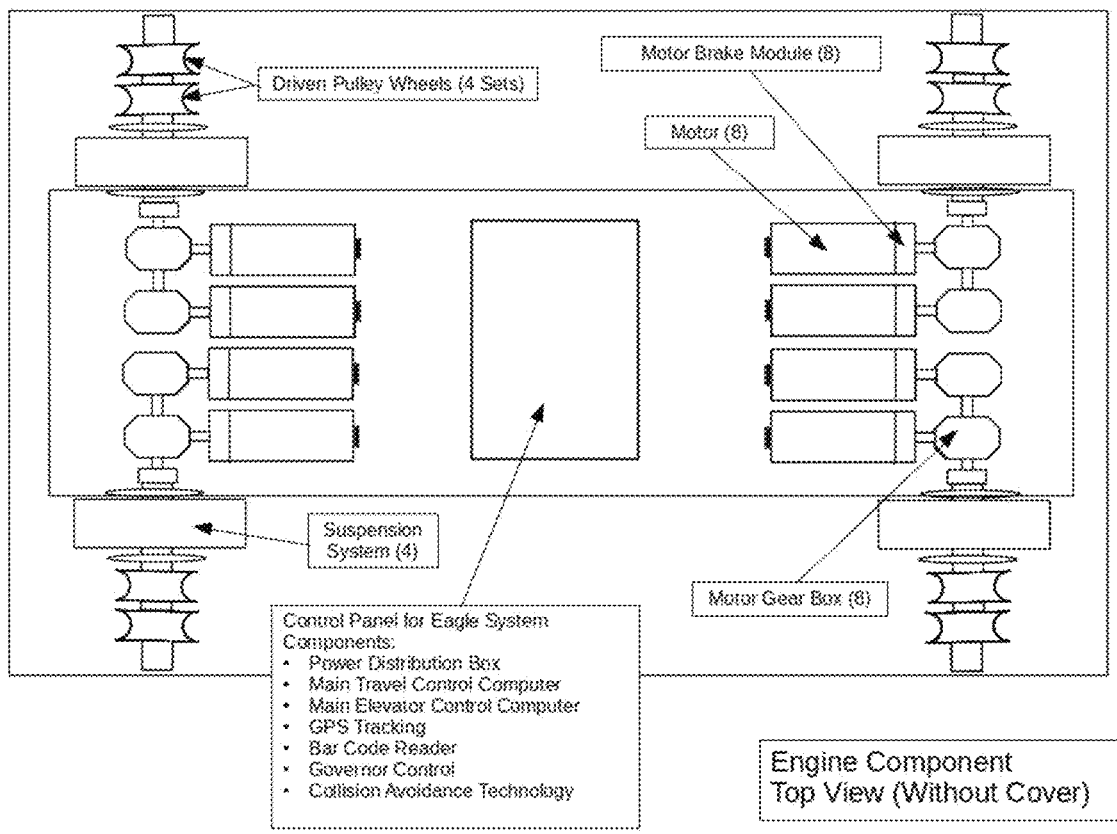
FIG. 36 illustrates an exposed top view of the transport system chassis without the top cover showing the multiple components that are utilized for the individual chassis of the transport system.

FIG. 33 and FIG. 36 illustrates the drive motors, gearboxes, and breaks for the transport system. The main control system may be housed in the carriage or cabin or may be located at a different location. The transport system will have redundancy and controls to ensure smooth operation.

Figure 37:
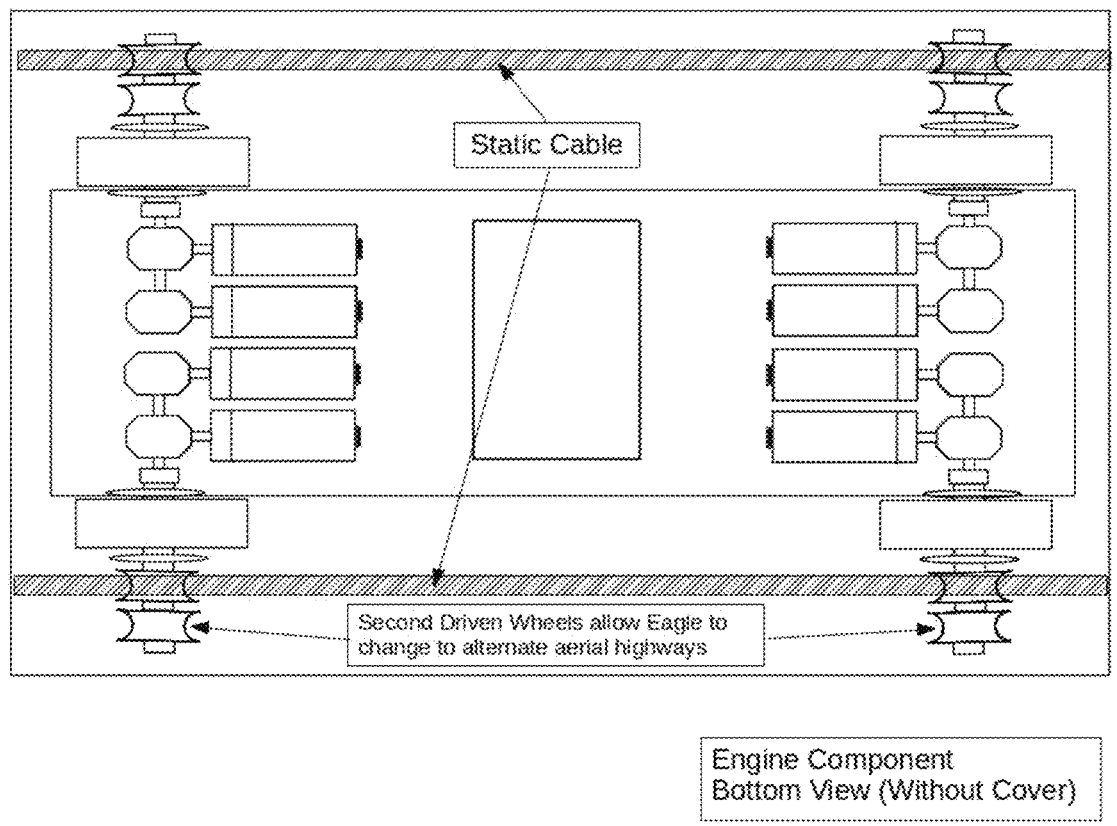
FIG. 37 illustrates the engine component and the static cables of the transport system chassis.

FIG. 37 shows the interaction of the static cable and the driving component. The inclusion of second driven drive wheels, forming a dual drive pulley system, allows a carriage to change to a different aerial highway.

Figure 38:
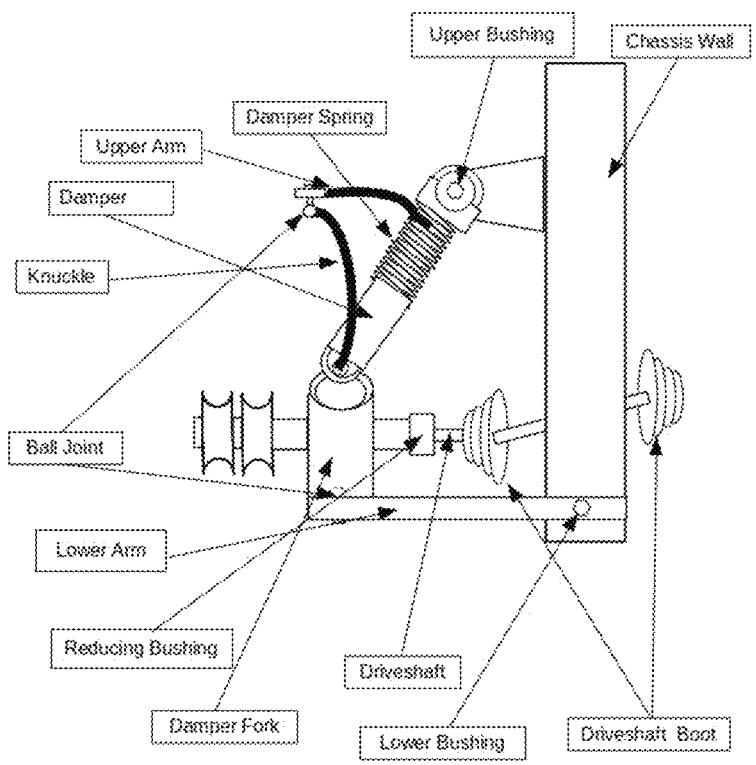
FIG. 38 illustrates a non-limiting example of a suspension system that may be used for the transport system.

FIG. 38 shows a suspension subsystem typical of what you may find on a carriage or cabin. The carriage or cabin may also be called a car. A suspension system is provided to assist in increasing speed for the transport system. This suspension subsystem is part of a larger suspension system that is a component of the transport system.

Figures 39, 40:
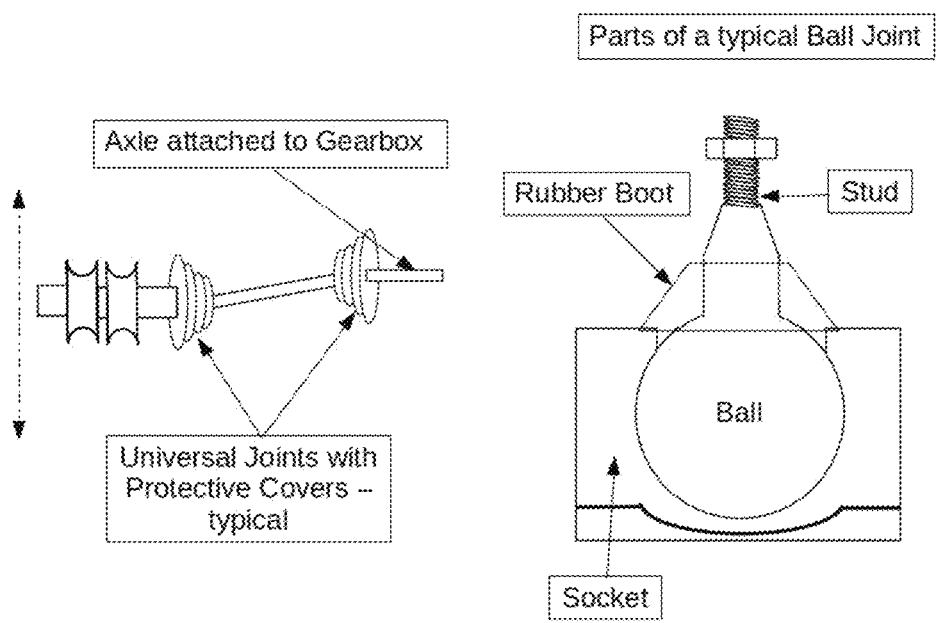
FIG. 39 illustrates a component of the suspension system for the transport system.
FIG. 40 illustrates another component of the suspension system for the transport system.

FIGS. 39-40 illustrates part of the suspension system in which a system of ball joints and axles is attached between the motors and the gearboxes.

Figures 41A, 41B:
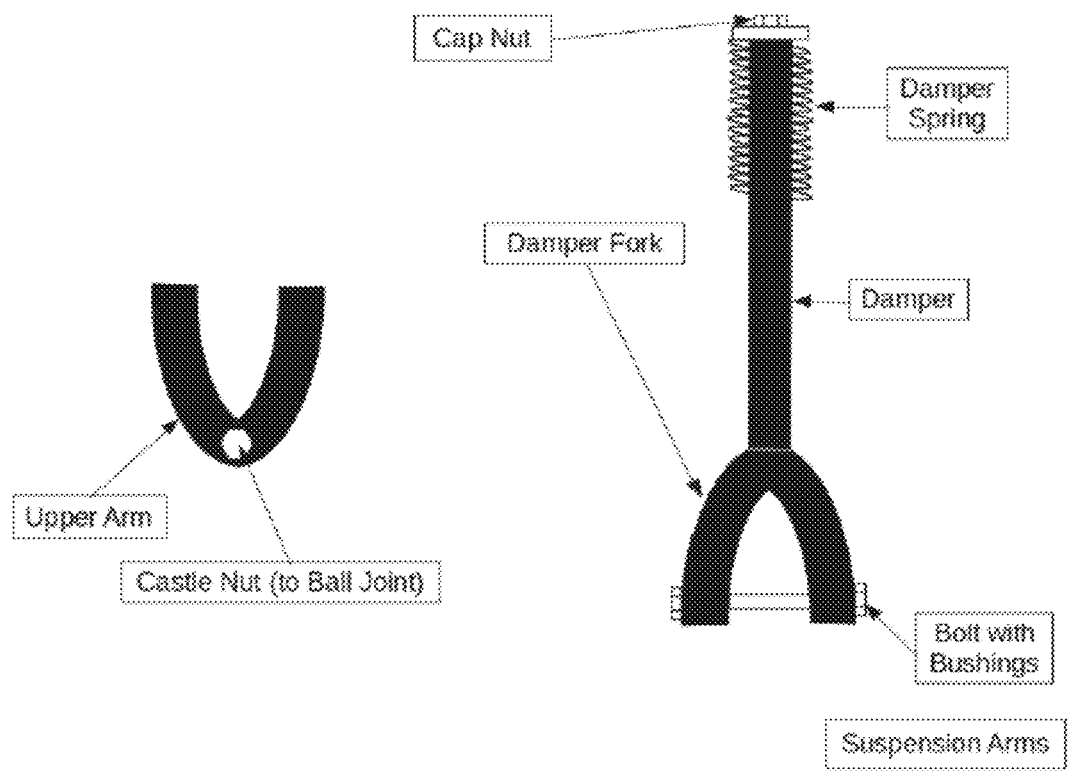
FIGS. 41A and 41B illustrate the construction and components of the suspension arms for the transport system.

The typical suspension arm, as shown in FIGS. 41A and 41B, may be composed of a damper and a damper spring subsystem.

Figure 42:
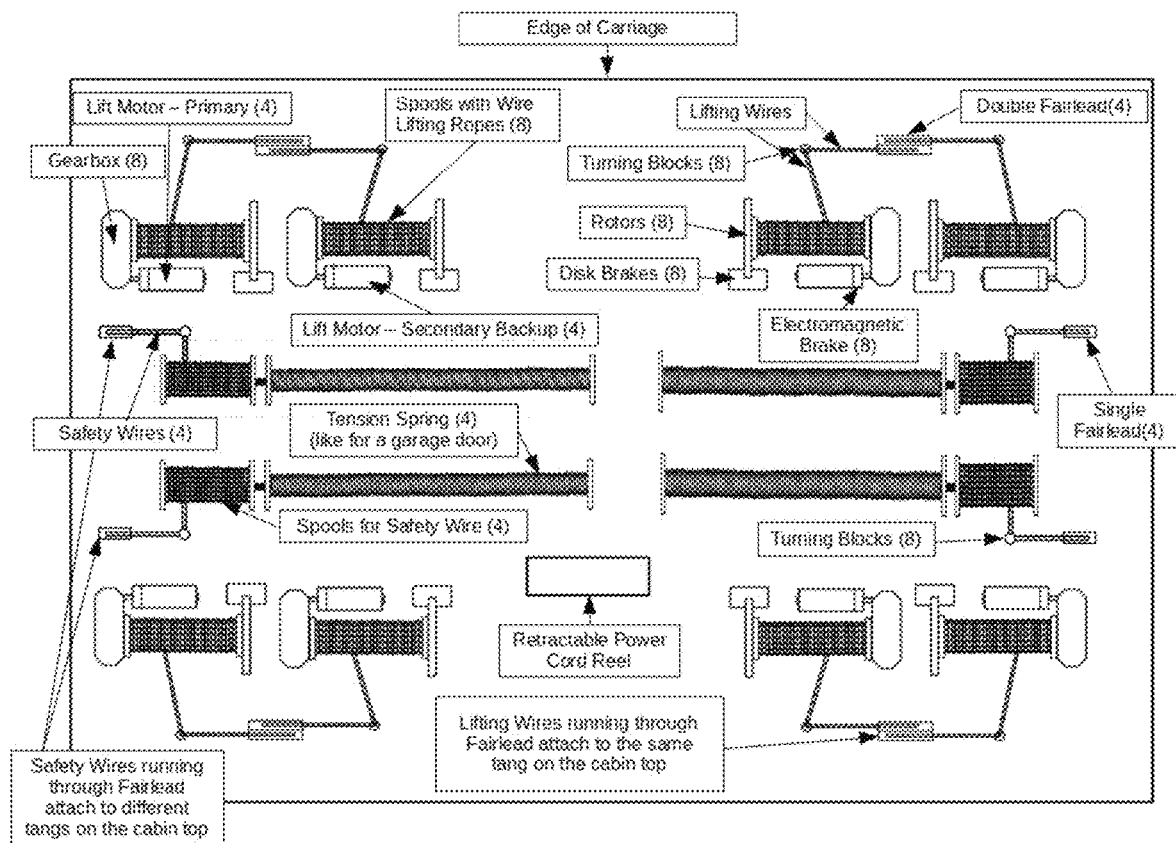
FIG. 42 illustrates a top view perspective of the elevator system that is incorporated into the carriage or cabin of the transport system.

The elevator system shown in FIG. 42 is incorporated into the carriage, cabin, or car of the transport system. There can be one primary system with (4) motors to drive it. A secondary system with (4) motors as a back up to the first system can also be utilized. Both primary and secondary systems are equipped with an electromagnetic brake system. The secondary system and electromagnetic brake system can be used to provide a backup to each of the other drive systems.

There is also a tension spring system, shown in FIG. 42, for another safety backup. Should the cables break, this tension spring system will lock up and keep the carriage, cabin, or car and its load from falling. The tension spring system also takes some of the load off the lifting system, similar to the way an overhead garage door system has springs to take some of the weight off the door.

Figure 43:
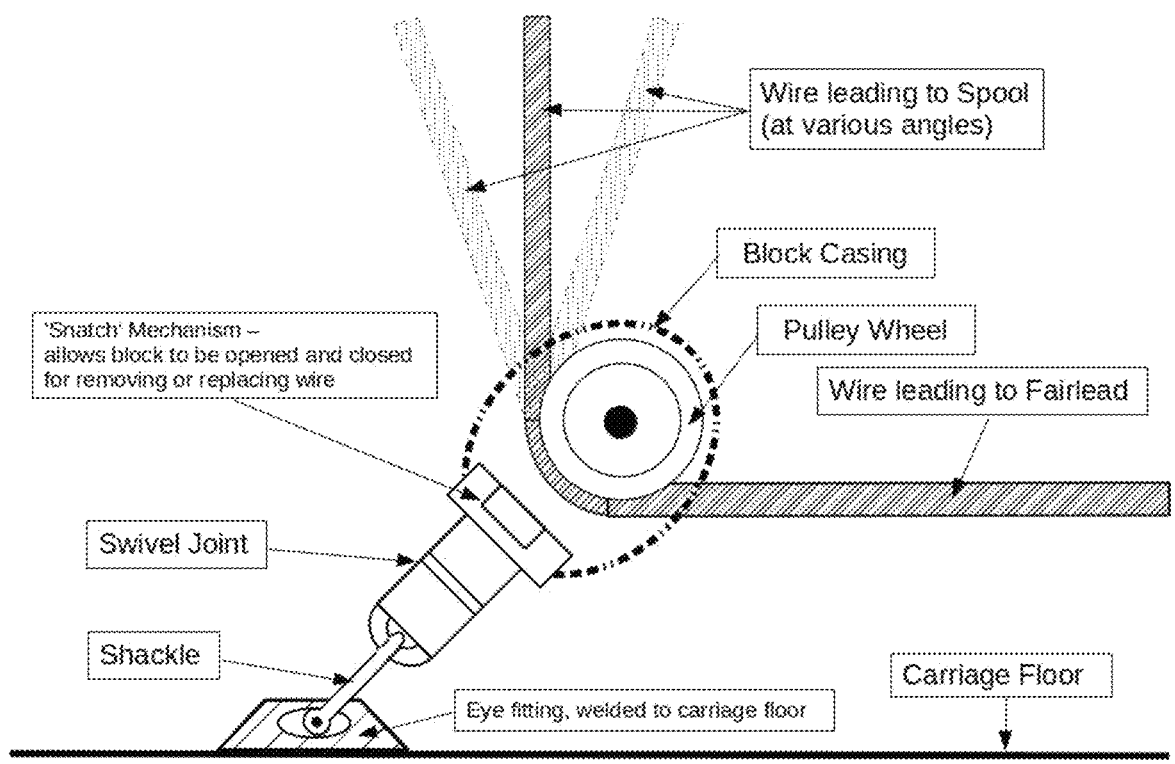
FIG. 43 illustrates a turning block for the transport system; the turning black is of the snatch type connection.

A turning block, as seen in FIG. 43, may be used to manipulate the cable and or wire system that is associated with the cable transport system.

Figure 44:
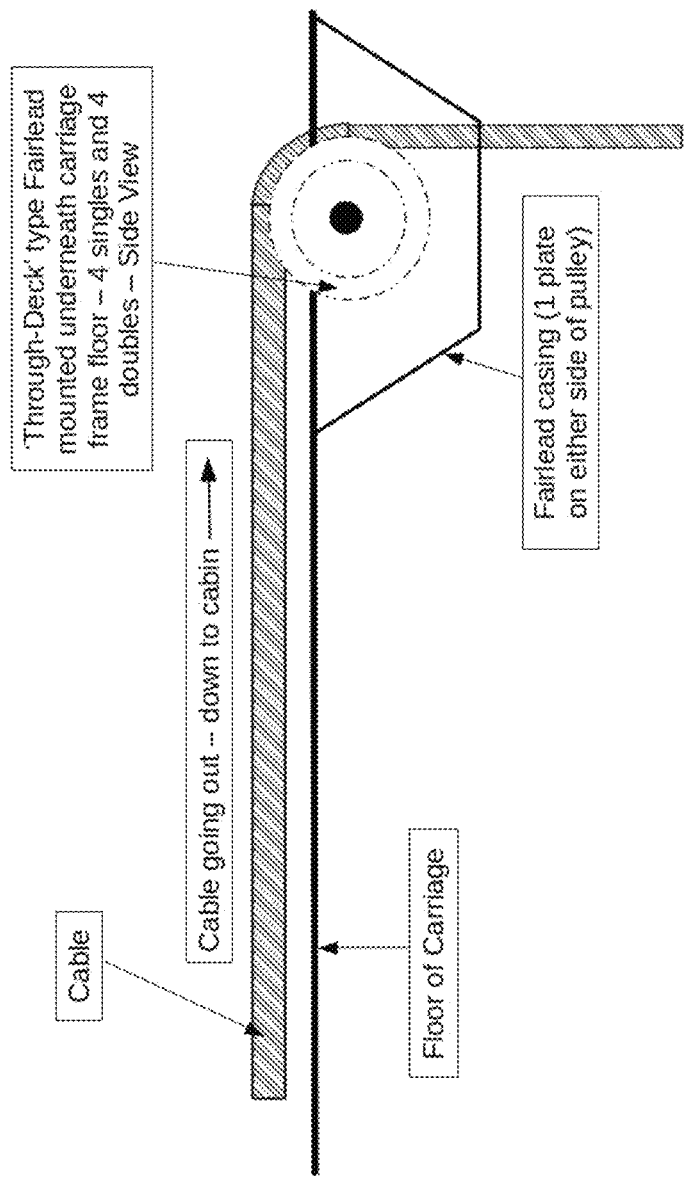
FIG. 44 illustrates a 'Through-Deck' type fairlead component of the cable subsystem of the transport system.

Another aspect of managing the cable system may be seen in FIG. 44 where the cable is brought through the deck of the carriage, cabin, or car.

Figure 45:
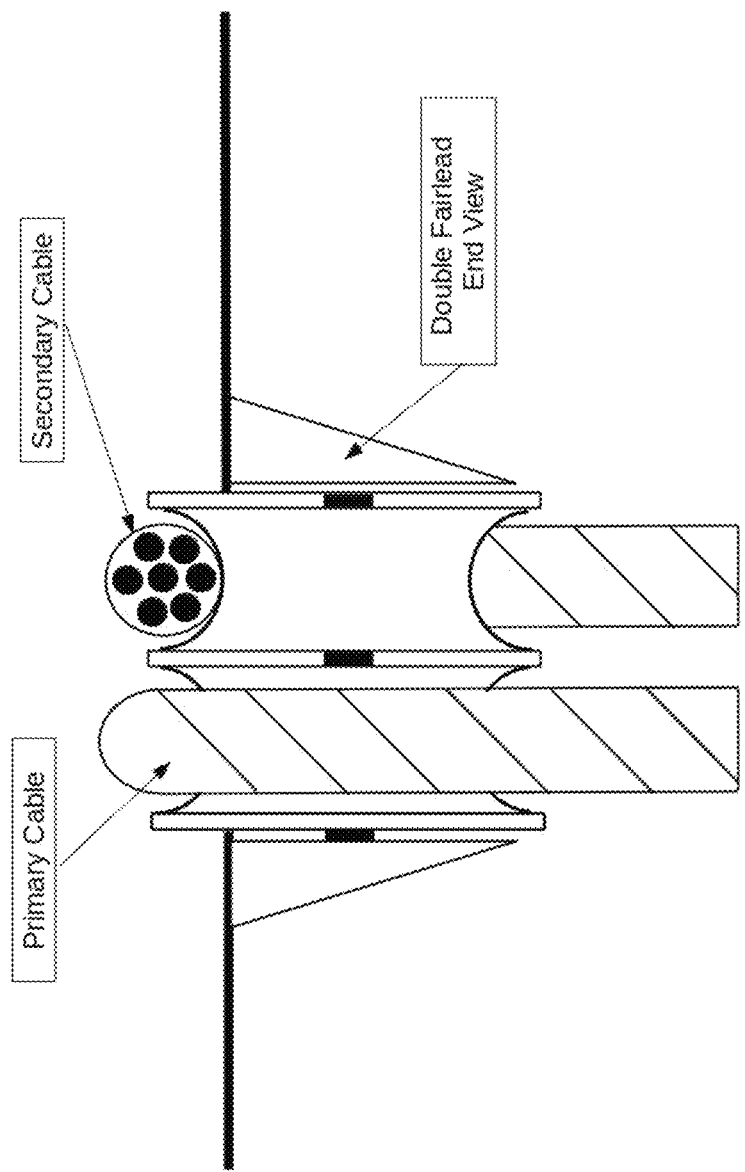
FIG. 45 illustrates a primary and secondary cable configuration for the transport system.

The primary cable and the secondary cable may run alongside each other utilizing a carrying system as seen in FIG. 45.

The transport system illustrated in FIG. 33 in accordance with aspects of the present disclosure can be used to provide transport and support in a number of different of applications. The examples provided below are intended to illustrate just some of the benefits and applications of the embodiments described herein.

In one example, the carriage system in FIG. 33 may be used in a warehouse to transport goods. In this example, a remote-controlled device can control the carriage, cabin, or car. Specific software designed for this warehouse will allow a remote-controlled device to operate the carriage in a very specific way using radio signals. In this embodiment, a small module is mounted on the motor so the computer can issue commands to the motor. In this embodiment, warning lights may be included at each end and along the able to warn people that the carriage is being used.

In another embodiment, the transport system as seen in FIG. 33 may be configured as a high-speed ride, for example at an amusement park. In such an embodiment, the computer controlling the travel of the transport system may have pre-set commands and follow pre-set ride instructions.

In other embodiments, the transport system as seen in FIG. 33 may be used for military applications, or in sports arenas to control the location of a camera relative to a playing field. A computer with specific software may control a plurality of carriage 10 and cable 200, 250 systems, thereby allowing a user to move that camera using just visible observations. In some embodiments of the present disclosure, the transport system may include one or more weapons.

To illustrate one example of transportation using a transport system as seen in FIG. 33, assume a Chicago company purchases a freight-load of beef and hamburger products from a processing plant in Texas. A carriage picks up a freight car and is sent, by automation, to a Chicago distribution center just outside Chicago. This giant football size freezer was designed and built for an automated carriage. The only drivers on forklifts are the ones who load and un-load the freight cars. They do not go into the freezer at all. All hamburger pads are moved out and placed at the entrance door of the freezer. Carriages take over and re-locate all the pads of hamburger patties. Using a smart grid on the ceiling carriages tracks all inventory (quantities, location, high usage and low usage products and retrieval methods all automated no more people in the freezer any more). The two tons of patties have been set aside. Carriages may be pre-programmed to follow a specific plan. The freight car will be loaded in a specific order along with the patties by the fork lift operator. A tractor will move the freight car back to the loading zone where a carriage will pick it up and deliver to a drop zone on the outskirts of Cleveland. A local businessman who has contracts with this chain of stores is waiting to hook up to the freight car because he knows the exact time it arrives. He will make the rounds to six different stores delivering the meat products; three of those stores get the hamburger patties assuming these stores are in a commercial district in downtown Cleveland. Door to door delivery will happen when the warehouses are located outside a large city or in rural areas.

The cable suspension system of the transport system as seen in FIG. 33 may be adjusted by hydraulics or other suitable means to change the position of the cable in any of six degrees of freedom (i.e., the cable position is moved up or down, left or right, forward or backward, swiveled left or right, tilted forward or backward, or pivoted side to side). A transport system as seen in FIG. 33 may transit the cable, similarly to the transport system discussed above. One or more carriages may carry a platform configured to retrieve underwater systems. This embodiment is particularly useful, for example, as a crane on a ship to retrieve autonomous underwater vehicles or personnel who have fallen overboard.

In embodiments, the system can be configured to replace freight haulers and/or local delivery vehicles. In embodiments, existing electrical towers that carry transmission lines with support towers can be replaced/upgraded. The towers are configured to carry the weight of tractor trailer trucks. In a non-limiting example, on the replacement towers there can be two three-inch cables, one on each side of the tower, forty feet off of the ground, to allow freight to move through the air on them. Above the three-inch cables the transmission lines can be positioned, and above the transmission lines the cellular and wireless companies can install equipment.

In embodiments, drivers are not required as the system is fully automated. A second system can be built on the same right of way, and the carriages can be configured to carry two cars below, as well as passengers on the second story of a rapid transit car. Any drivers (if used) and their passengers can ride on the second floor with the other non-drivers. As the vehicles load, the non-drivers also can load.

In embodiments, the system is incorporated into electric forklifts in warehouses, or can be used to replace forklifts. In other cases, the system is used to move people in public areas, such as national parks, or incorporated into amusement park rides. In some cases, the system can be used to pick up individuals who are unable to walk and put them into swimming pools.

Figure 46:
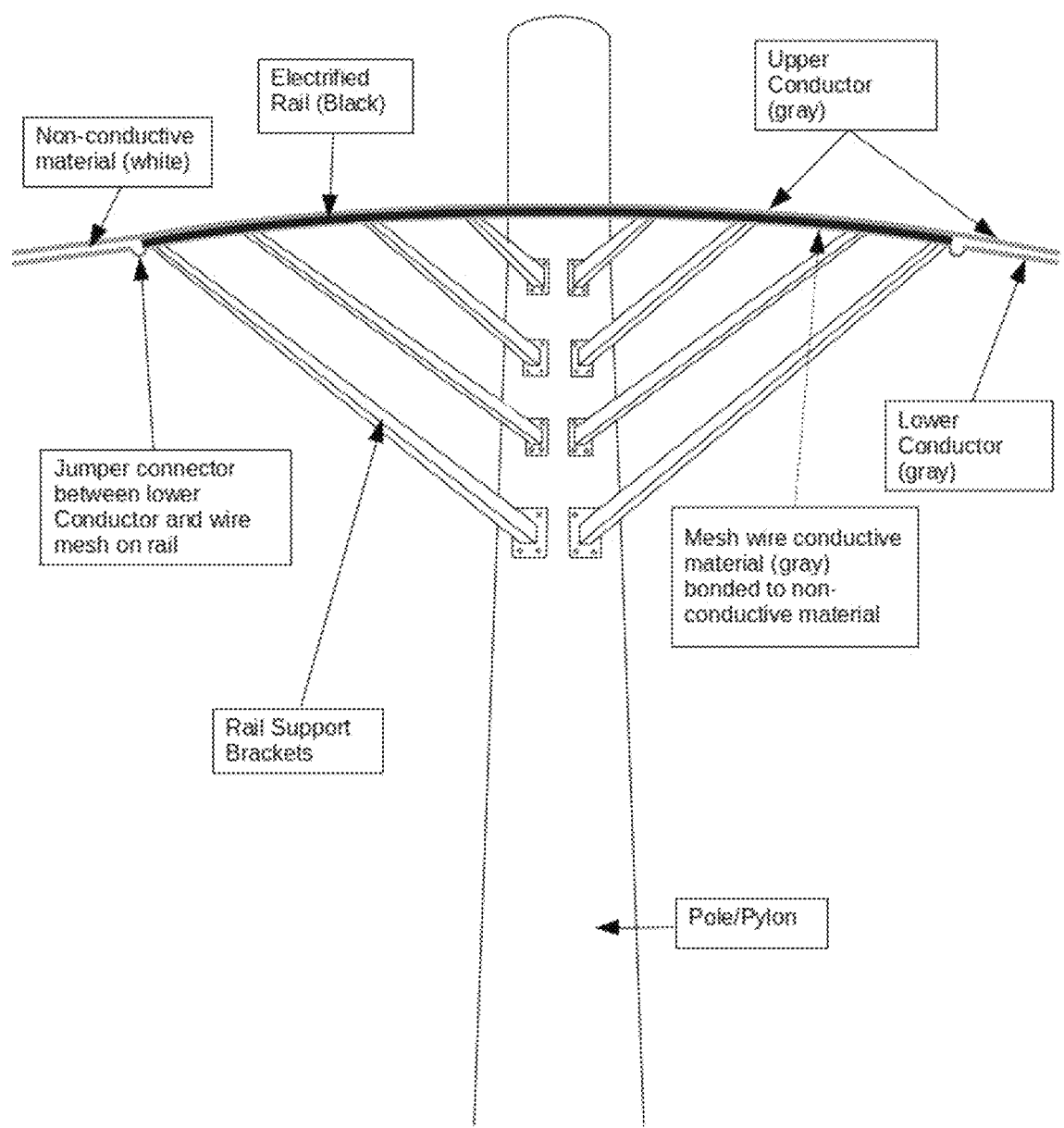
FIG. 46 illustrates an exemplary embodiment of a pylon of the overall embodiment where the pylon shows the electrified rail, the supports, and conductive and nonconductive components of the electrified rail.

FIG. 46 shows a front view of an electrical rail with the gondola system running underneath pylons. The electrified rail is slightly curved with the highest part of the curve in the middle. Use of this configuration enables the gondola cars to smoothly pass by the pylon. A plurality of brackets support the rail on the pylon.

Figure 47:
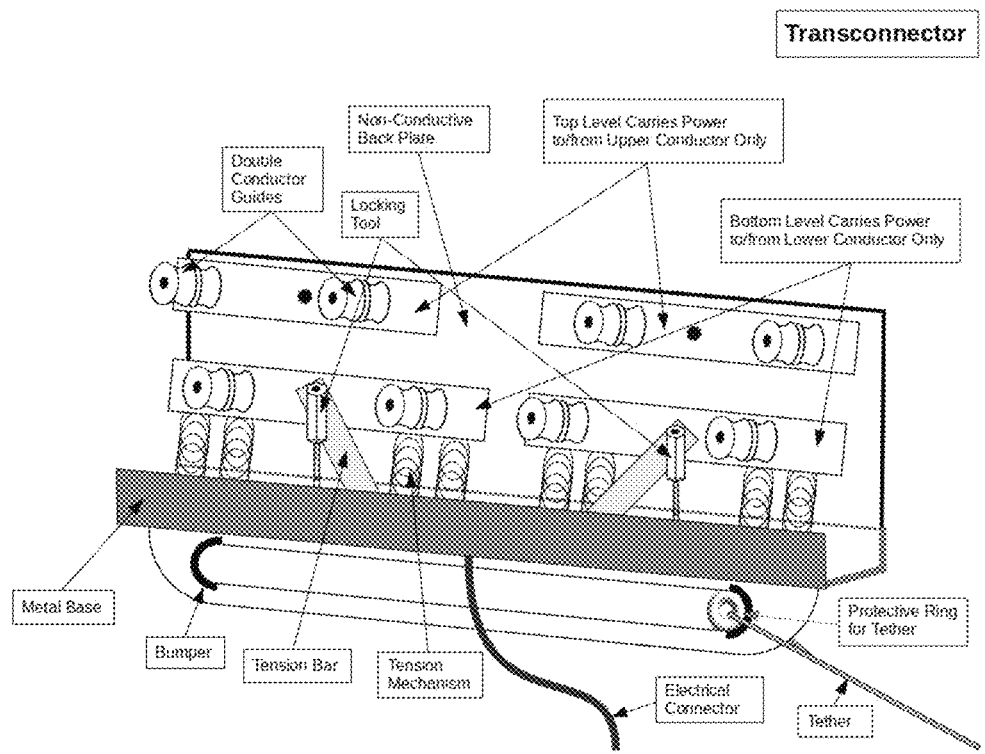
FIG. 47 illustrates another view of the transconnector showing the components in more detail.

As illustrated in FIG. 47-53, in some embodiments, a transconnector (i.e., a "power take off") may be used to provide electrical current to the motor of a carriage. The transconnector as seen in FIG. 47 may be used when moving all loads, whether light or heavy, for example, cargo or groups of people. In some embodiments, a carriage may transit two or more cables (i.e., static cables) for stability (e.g., to prevent the carriage from swaying side to side).

Figure 49:
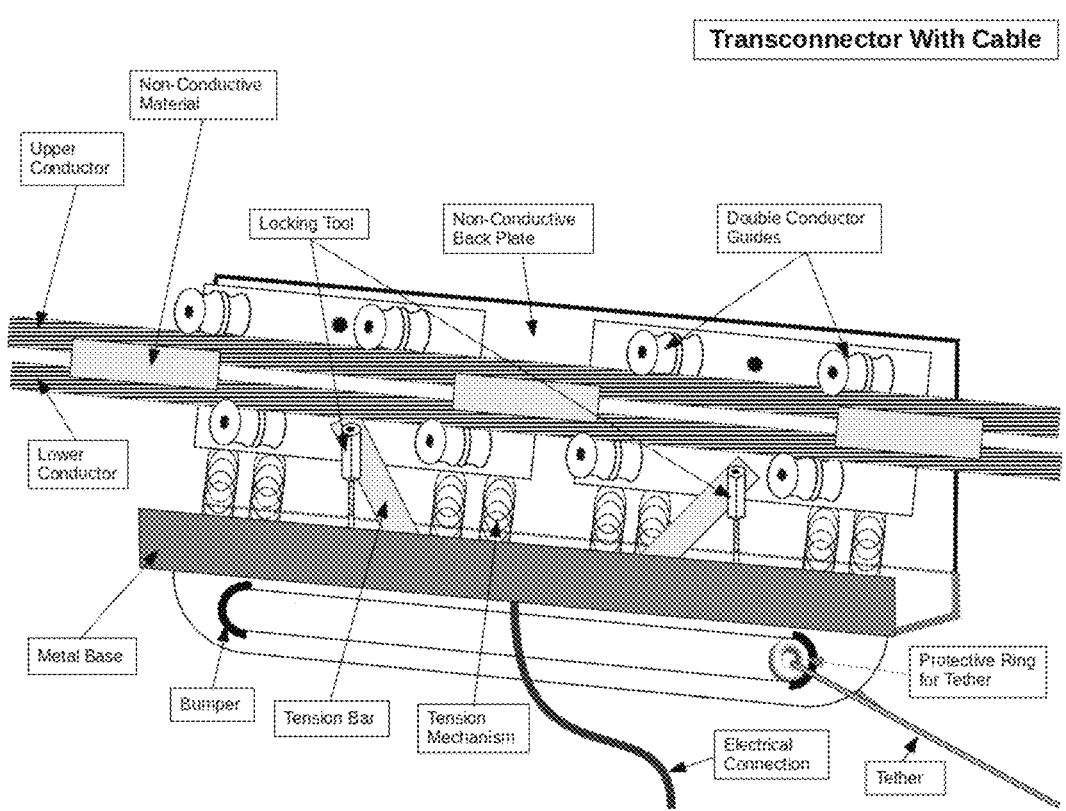
FIG. 49 illustrates the transconnector with the cable system and details about the components of the transconnector.
Figure 50:
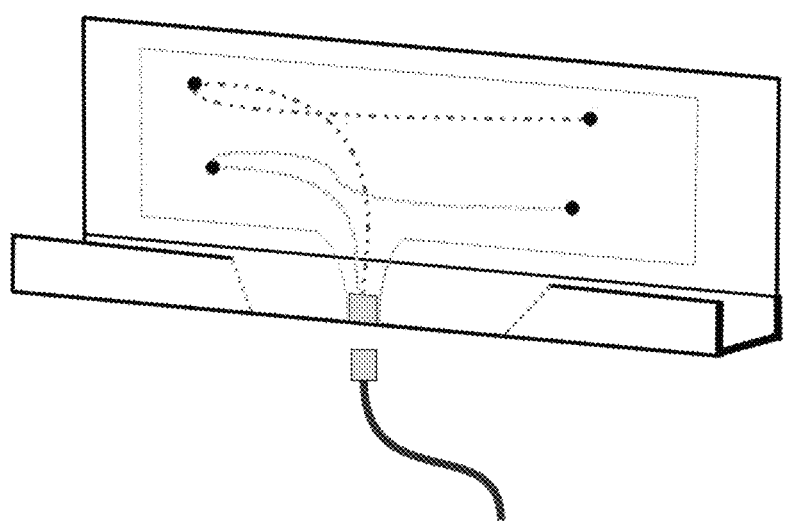
FIG. 50 illustrates the electrical connections for the transconnector.
Figure 51:
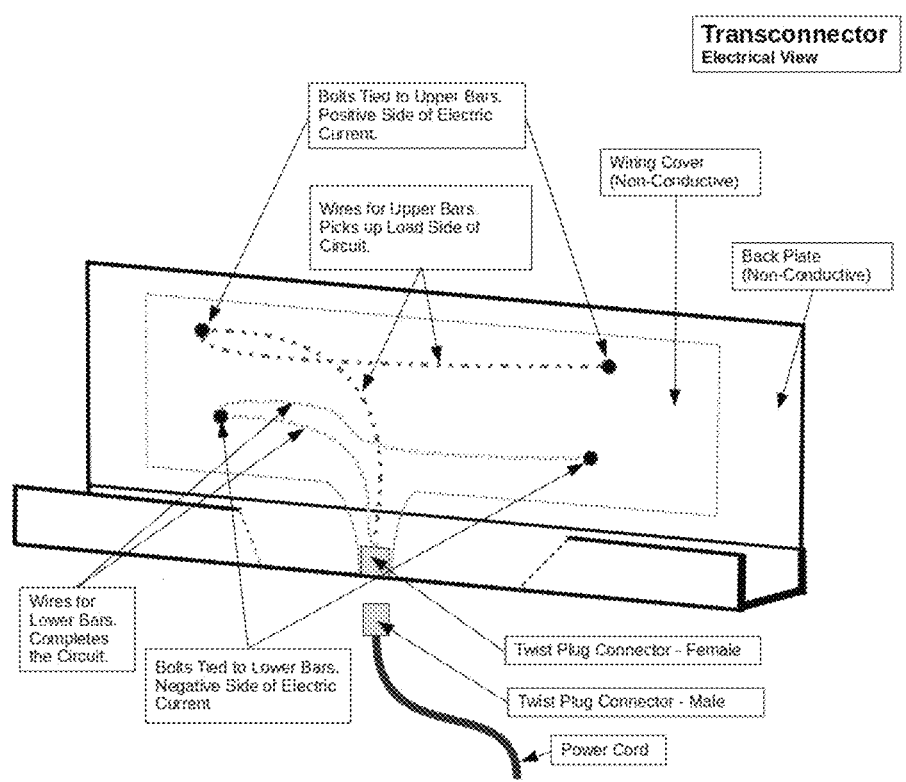
FIG. 51 illustrates a detailed view of the electrical connections for the transconnector.
Figure 52:
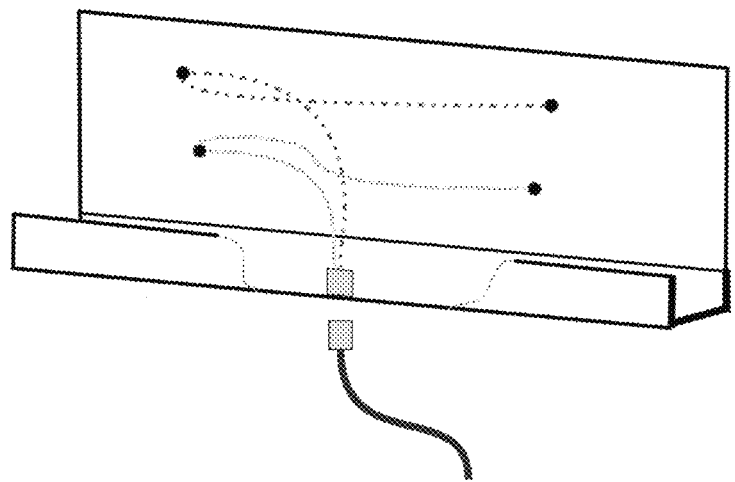
FIG. 52 illustrates a further wiring diagram of the transconnector.

For example, a transconnector may transit one or more electrified cables as seen in FIG. 33 and is independent of and runs substantially parallel to the one or more static cables supporting the carriage, cabin, or car of the transport system. The transconnector transits an electrified cable, as seen in FIG. 49, and is tethered to a respective carriage, again as seen in FIG. 49 by, for example, a tether. Various configuration can be used to support the transconnector on the cable. One example of this configuration is shown in FIG. 33. The transconnector provides electrical current from an electrified cable to the one or more motors of the carriage, cabin, or car of the transport system, thus allowing the carriage to transit the one or more static cables as is shown in FIG. 33. The carriage, in turn, pulls or pushes the transconnector along the electrified cable as the carriage transits the one or more static cables.

Figure 48:
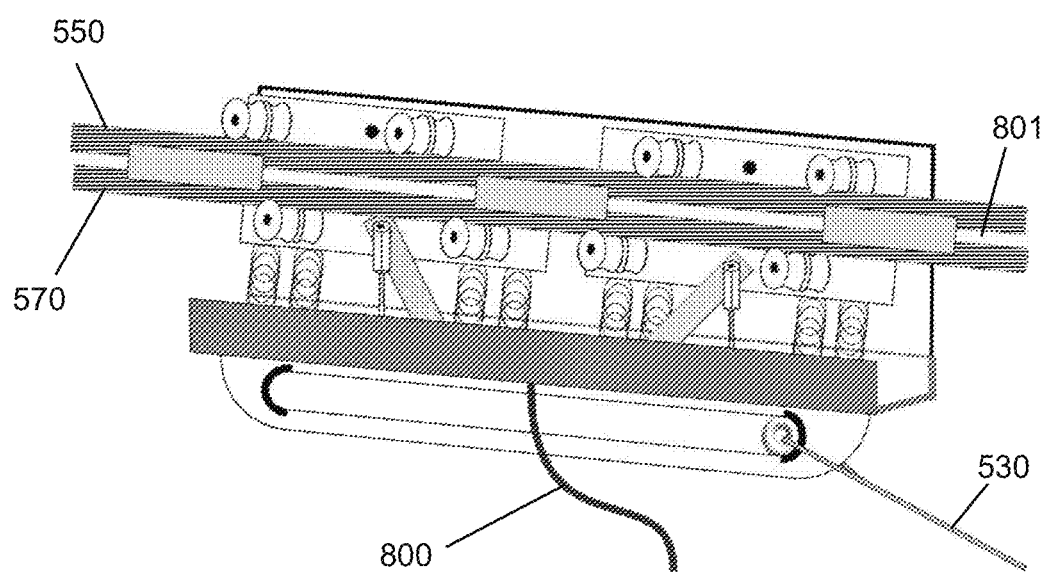
FIG. 48 illustrates the transconnector integrated with the cable system.

In the embodiment shown in FIG. 48, the transconnector comprises one or more pairs of bars mounted to the transconnector frame, wherein a pair of bars further comprises a first upper bar and a second upper bar. In an embodiment, the first upper bar comprises one or more first pulley wheels in contact with the upper conductor. The transconnector also comprises a pair of lower bars including a first lower bar and a second lower bar. In an embodiment, the first low bar comprises or or more first pulley wheels in contact with the lower conductor. An insulated material is between the upper conductor and lower conductor. As shown in FIG. 48, a transconnector may include an upper conductor 550, lower conductor 570, nonconductive material 801 between the upper conductor 570 and lower conductor 570, the tether 530 for the electrical transconnector, an electrical connector 800 and the rollers for transferring energy to and from the upper conductor and lower conductor.

The transconnector provides electrical current to the motor and other electronic and electrical components of the carriage, cabin, or car of the transport system. For instance, a heating, ventilating, and air conditioning (HVAC) system may be powered on the carriage, cabin, or car of the transport system. Also, surveillance cameras and other detection devices may also be powered by the transconnector.

The transconnector can also provide electrical power to the carriage, cabin, or car of the transport system to power devices such as video screens, telecommunications equipment, and computer terminals.

The transconnector may also be configured to provide other services to the carriage, cabin, or car of the transport system such as live electronic boards and gaming capabilities.

Figure 53:
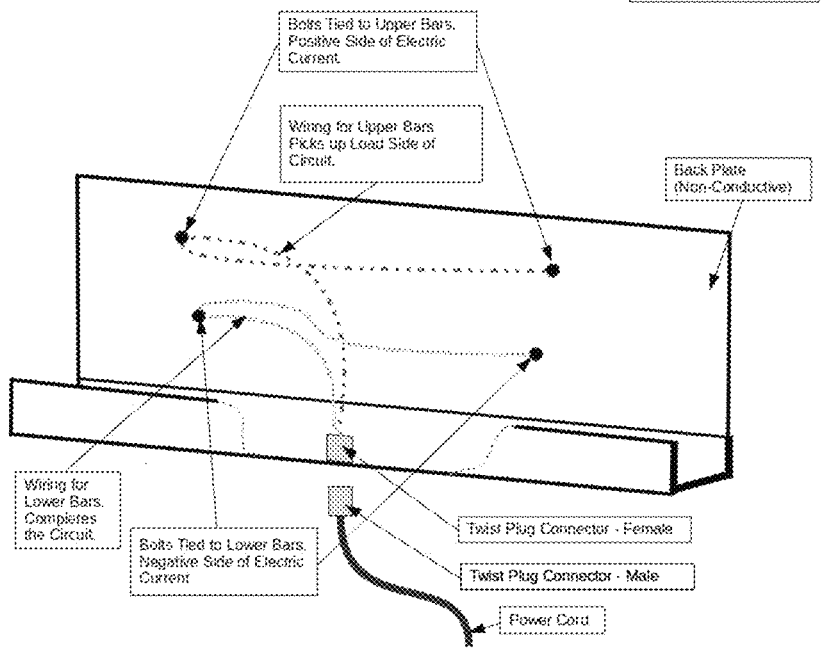
FIG. 53 illustrates further electrical and mechanical detail for the transconnector including a wiring diagram.
Figure 54A:
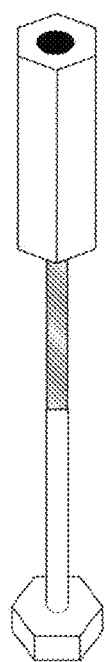
FIGS. 54A and 54B illustrate a locking mechanism for the transconnector.
Figure 54B:
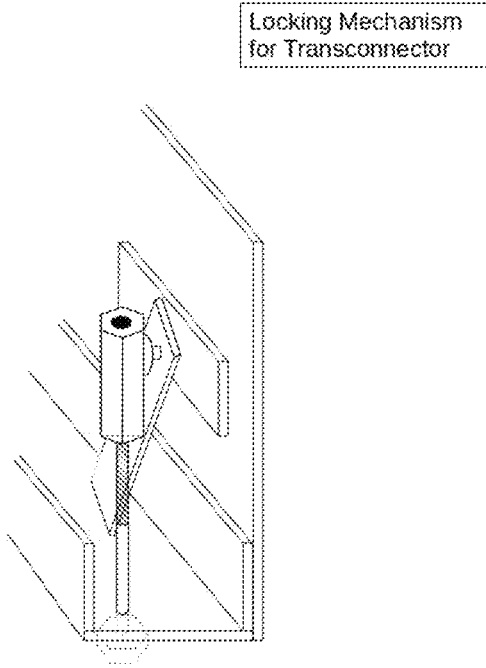
Figures 55A, 55B:
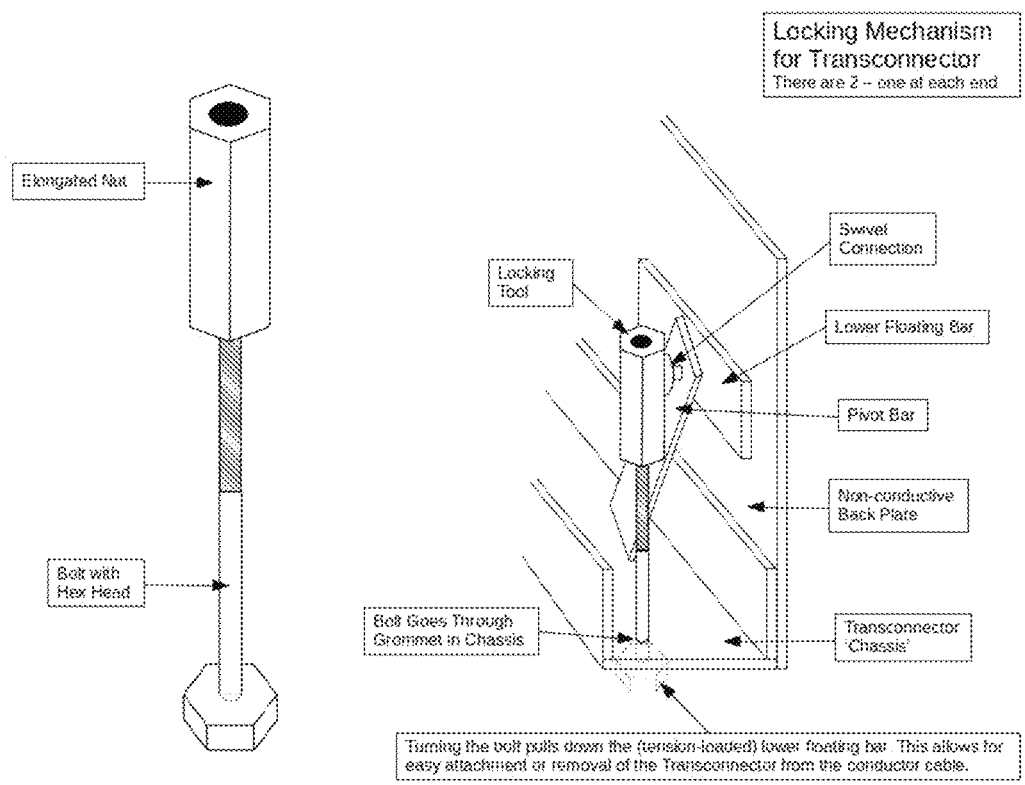
FIGS. 55A and 55B illustrate further detail for the locking mechanism for the transconnector and the means of easily removing the transconnector from the cable.

FIG. 53 shows a disconnect plug on the power cord from the transconnector. This figure also shows a first wire attached to the upper bars on the transconnector picking up the load side of the circuit, and a second wire attached to the lower bars to complete the circuit.

FIGS. 54A, 54B, 55A and 55B show a locking mechanism for the transconnector. More specifically, the lock disengages the lower pulley wheels from the cable, and this allows the transconnector to be removed from the cable easily. In embodiments, there is a locking mechanism at each end of the chassis. Each locking mechanism includes an elongated nut at one end and a bolt, which may have a hex head, at the other end. The blot and nut are separated by a shaft. There is a swivel connector between the chassis and the locking mechanism. The swivel connection includes a pivotable bar and a lower floating bar. The lower floating bar is connected to a non-conductive back plate mounted to the chassis. A locking tool can be used to turn the elongated nut, thereby turning the bolt. The action of turning the bolt pulls down the tension-loaded lower floating bar. The allows for easy attachment or removal of the transconnector from the conductor cable.

Figure 56:
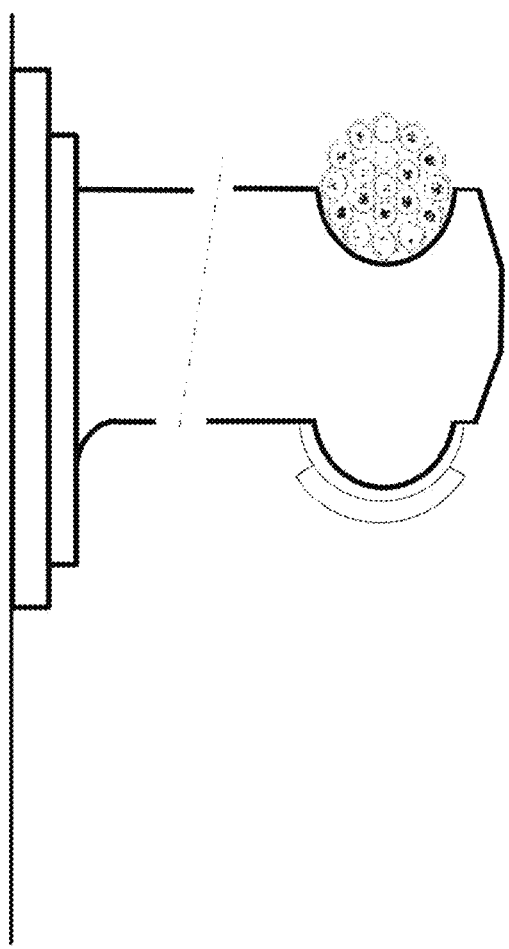
Figure 57:
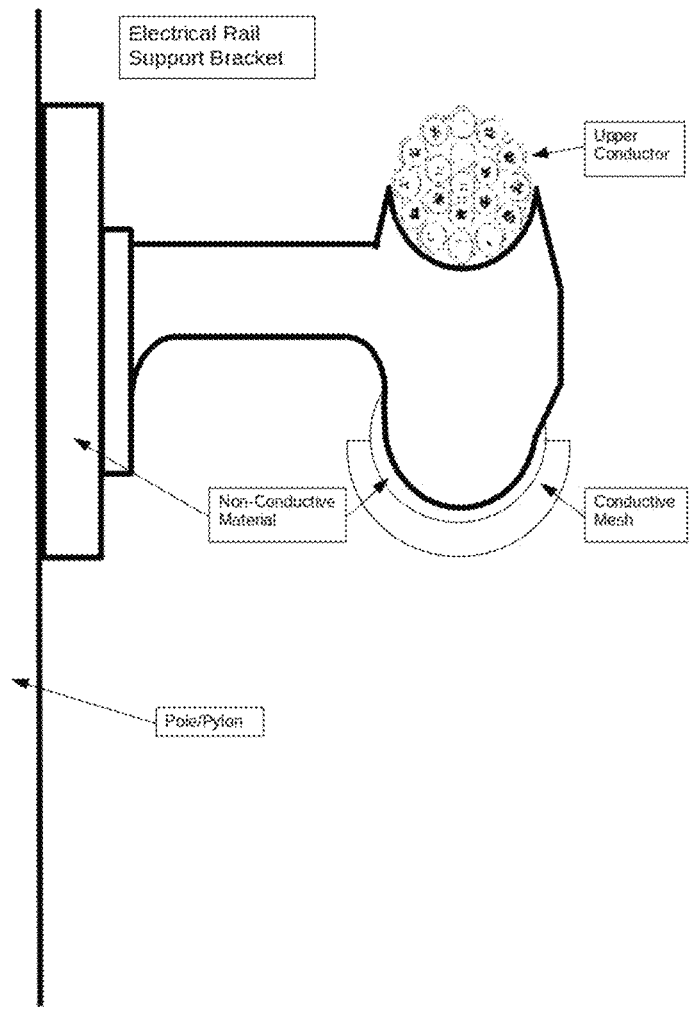
FIG. 57 illustrates an electrical rail support bracket with detail for the upper conductor in the lower conductor attached to the pylon and insulated with nonconductive material.

FIGS. 56-58 show the construction of the electrified static cable system at locations that are mounted to pylons. The transconnector cannot get over the tower unless it is gently curved instead of being a shape curve like the top of an A. If the full cable were used, the electrified static cable system would be very heavy. The jumper plus mesh is used to allow for a maximum height of the rigid supporting rail and to allow an uninterrupted circuit (electricity does not stop because of the cut lower conductor past each tower). Otherwise, the rail would be too small its side and bottom to support the cable. The size of the rail mimics the size of the cable in terms of height in order to allow transconnector to pass over it. Otherwise, the space between and top and bottom rollers in FIG. 48 would have to be adjustable when the transconnector passes the tower.

In order to support the electrified static cable system, the lower conductor is cut away and replaced with a mesh conductor. The mesh conductor is connected to the cut end of the lower conductor with a jumper. The central nonconductive material is cut in alignment with the lower conductor. The upper conductor is not cut. The brackets that support the electrified static cable system on the pylon are connected to the electrified rail. Depending on the length of the arm in FIG. 58, the rail and arm are two separate pieces and will be bolted together. Arms will vary in length depending on where it is attached to the rail. In embodiments, the rail is formed from a rigid conductive material which allows the rail to be formed into a customized shape. (curve to the right or left, go up or down or any direction required).

In embodiments, the rail is configured to mimic the electrified static cable system (FIG. 57). This allows the transconnector to go past the tower without interruptions. Rail (FIG. 57) comprises a nonconductive base plate (called nonconductive material—gray bar, in FIG. 58) between the rail arm and the pole. Upper portion of the rail comprises a track and the upper conductor of our electrified static cable system lies in the track (see FIG. 57). At the bottom of the rail, the lower conductor has been removed and replaced with the a mesh conductor curved to match the size and curvature of the pulley wheels on the transconnector (as viewed in the travel direction of the wheels. A non-conductive material is placed between the rail and the mesh conductor.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A transport system, comprising:
   an electrified static cable system,
   a carriage supported by a non-electrified static cable,
   an electrical drive system incorporated into the carriage, wherein the electrical drive system is utilized to move the carriage along the non-electrified static cable,
   a transconnector configured to supply electrical power to the carriage,
   a cabin mounted to the carriage with vertically extendable cables, and an elevator system incorporated into the carriage and configured to raise and lower the cabin using the vertically extendable cables.

2. The transport system of claim 1, wherein the non-electrified static cable comprises a pair of parallel non-electrified static cables.

3. The transport system of claim 1, wherein the cabin is configured to carry passengers, goods, materials, detection systems, weapon systems, or combinations thereof.

4. The transport system of claim 1, wherein the cabin contains a power distribution panel.

5. The transport system of claim 4, wherein the power distribution panel provides power to operate an engine of the transport system.

6. The transport system of claim 4, wherein the power distribution panel provides power to operate the elevator system.

7. The transport system of claim 4, wherein the power distribution panel provides power to at least one cabin accessory.

8. The transport system of claim 1, wherein the system includes a plurality of cabins individually mounted to a plurality of individual transconnectors.

9. The transport system of claim 1, further comprising a locking mechanism configured to prevent and permit removal of the transconnector from the electrified static cable system.

10. The transport system of claim 1, further comprising a slot configured to permit a tether to move from a first end of the transconnector to a second end of the transconnector.

11. The transport system of claim 10, further comprising first and second bumpers configured to soften contact of the tether with a tether support track.

12. The transport system of claim 1, further comprising a weight attached to the transconnector providing stability and maintaining vertical alignment with the electrified static cable system.

13. The transport system of claim 1, further comprising a double pulley system which allows the transconnector to change from one electrical highway to another to travel in a different direction.

14. The transport system of claim 1, further comprising a rail attached to a pole which in turn is attached to and supports the electrified static cable system.

15. The transport system of claim 1, wherein the cabin has a cutaway on only one side allowing it to pass by a pylon.

16. The transport system of claim 1, further comprising a dual driven pulley system that enables the system to change from one aerial highway to another.

17. The transport system of claim 1, wherein the cabin has a front door and a rear door.

* * * * *